United States Patent
Bruns et al.

(10) Patent No.: US 11,544,895 B2
(45) Date of Patent: Jan. 3, 2023

(54) SURROUND VIEW GENERATION

(71) Applicant: COHERENT LOGIX, INCORPORATED, Austin, TX (US)

(72) Inventors: Michael W. Bruns, Portland, OR (US); Martin A. Hunt, Austin, TX (US); Manjunath H. Siddaiah, Cedar Park, TX (US)

(73) Assignee: Coherent Logix, Inc., Austin, TX (US)

( * ) Notice: Subject to any disclaimer, the term of this patent is extended or adjusted under 35 U.S.C. 154(b) by 0 days.

(21) Appl. No.: 16/582,325

(22) Filed: Sep. 25, 2019

(65) Prior Publication Data

US 2020/0098164 A1    Mar. 26, 2020

Related U.S. Application Data

(60) Provisional application No. 62/737,050, filed on Sep. 26, 2018.

(51) Int. Cl.
*G06T 15/20* (2011.01)
*G06T 5/00* (2006.01)
*G06T 15/50* (2011.01)

(52) U.S. Cl.
CPC ............ *G06T 15/205* (2013.01); *G06T 5/006* (2013.01); *G06T 15/503* (2013.01); *G06T 2207/30252* (2013.01)

(58) Field of Classification Search
CPC ..... G06T 15/205; G06T 5/006; G06T 15/503; G06T 2207/30252; G06T 3/40;

(Continued)

(56) References Cited

U.S. PATENT DOCUMENTS

| 5,576,767 A | * | 11/1996 | Lee | H04N 19/96 |
| | | | | 375/E7.122 |
| 6,266,442 B1 | * | 7/2001 | Laumeyer | G06V 10/443 |
| | | | | 382/104 |

(Continued)

FOREIGN PATENT DOCUMENTS

| JP | 2012-227913 A | 11/2012 |
| JP | 2017-68826 A | 4/2017 |
| WO | 2018/102990 A1 | 6/2018 |

OTHER PUBLICATIONS

Hartley, Richard and Andrew Zisserman, Multiple View Geometry in Computer Vision, 2nd Ed. New York, Cambridge University Press, 2004, Sections 2 & 6, 36 pp.

(Continued)

*Primary Examiner* — Charles L Beard
(74) *Attorney, Agent, or Firm* — Muir Patent Law, PLLC

(57) ABSTRACT

Methods and systems for rendering an output image from a plurality of input images. The plurality of input images is received, and each input image is taken from a different first location. A view specification for rendering the output image is received, and the view specification includes at least a second location. The second location is different from each of the first locations. An output image is rendered based at least in part on the plurality of input images and the view specification, and the output image includes an image of a region as seen from the second location. The output image is displayed on a display.

20 Claims, 31 Drawing Sheets

(58) Field of Classification Search
CPC . G06T 11/40; G06T 2207/20101; G06T 5/20;
G06T 15/04; G06T 13/20; G06T 17/05;
G06T 207/30252; B60R 1/002; B60R
2300/607; B60R 2300/306; B60R
2300/307; B60R 2300/305; B60R
2300/602; B60R 1/00; G06F 3/04842;
G06F 2203/04806; G06F 3/04883; G06F
3/04817; G06F 3/04845; H04N 5/232945;
H04N 5/23238; G06K 9/00791; G06K
9/6252; B60W 50/14; B60W 2050/146;
G06V 10/48
See application file for complete search history.

(56) References Cited

U.S. PATENT DOCUMENTS

| | | | | |
|---|---|---|---|---|
| 6,323,934 B1* | 11/2001 | Enomoto | G06T 5/20 | 358/487 |
| 6,559,853 B1* | 5/2003 | Hashimoto | G06T 15/04 | 345/585 |
| 7,259,760 B1* | 8/2007 | Hashimoto | G06T 15/04 | 345/582 |
| 8,265,422 B1* | 9/2012 | Jin | H04N 5/3572 | 348/580 |
| 8,446,433 B1* | 5/2013 | Mallet | G06T 5/006 | 345/643 |
| 8,447,134 B1* | 5/2013 | Reader | G06T 1/60 | 345/647 |
| 8,760,515 B2* | 6/2014 | Abe | B60R 1/00 | 348/148 |
| 8,781,731 B2* | 7/2014 | Lo | B60R 1/00 | 382/104 |
| 9,142,129 B2* | 9/2015 | Satoh | G08G 1/167 | |
| 9,269,130 B2* | 2/2016 | Chen | G06T 5/006 | |
| 9,412,203 B1* | 8/2016 | Garcia, III | G06T 19/006 | |
| 9,479,740 B2* | 10/2016 | Moriyama | G06T 15/503 | |
| 9,591,280 B2* | 3/2017 | Shimizu | G06K 9/00791 | |
| 9,715,015 B2* | 7/2017 | Izumikawa | G01S 17/89 | |
| 9,900,522 B2* | 2/2018 | Lu | B60R 1/00 | |
| 10,008,027 B1* | 6/2018 | Baker | G06T 7/13 | |
| 10,015,499 B1* | 7/2018 | Hobbs | G06V 30/413 | |
| 10,076,997 B2* | 9/2018 | Quast | B60R 1/00 | |
| 10,127,463 B2* | 11/2018 | Fürsich | G06V 20/56 | |
| 10,169,678 B1* | 1/2019 | Sachdeva | G05D 1/0221 | |
| 10,262,466 B2* | 4/2019 | Guo | G02B 27/0172 | |
| 10,284,794 B1* | 5/2019 | Francois | H04N 5/3415 | |
| 10,298,910 B1* | 5/2019 | Kroeger | G06T 11/60 | |
| 10,474,898 B2* | 11/2019 | Watanabe | G06T 17/20 | |
| 10,523,865 B2* | 12/2019 | Appia | H04N 5/3572 | |
| 10,621,743 B2* | 4/2020 | Kiyota | G06T 3/0062 | |
| 10,687,068 B1* | 6/2020 | Barros Da Silva | H04N 19/147 | |
| 10,703,275 B2* | 7/2020 | Fujita | G08G 1/167 | |
| 10,728,513 B2* | 7/2020 | Koizumi | G06V 10/255 | |
| 10,787,127 B2* | 9/2020 | Yamashita | E02F 9/261 | |
| 10,793,067 B2* | 10/2020 | Ihlenburg | G06T 15/205 | |
| 10,863,154 B2* | 12/2020 | Ishii | H04N 9/3194 | |
| 10,896,335 B2* | 1/2021 | Herman | G06K 9/00805 | |
| 10,897,600 B1* | 1/2021 | Dabral | H04N 7/181 | |
| 10,909,668 B1* | 2/2021 | Naidu | G06T 5/006 | |
| 10,911,745 B2* | 2/2021 | Shivalingappa | B60R 1/00 | |
| 10,926,715 B1* | 2/2021 | Soler | B60K 35/00 | |
| 10,935,878 B2* | 3/2021 | Ishii | H04N 9/3194 | |
| 11,034,298 B2* | 6/2021 | Critchley | H04N 5/247 | |
| 11,043,023 B2* | 6/2021 | Ashley | B60W 30/06 | |
| 11,055,541 B2* | 7/2021 | Wallin | G06T 5/006 | |
| 2002/0140702 A1* | 10/2002 | Koller | G06T 15/04 | 345/582 |
| 2002/0167589 A1* | 11/2002 | Schofield | H04N 7/181 | 348/148 |
| 2003/0085999 A1* | 5/2003 | Okamoto | B60R 1/00 | 348/E7.086 |
| 2004/0260469 A1* | 12/2004 | Mizusawa | G06T 5/006 | 701/300 |
| 2005/0116964 A1* | 6/2005 | Kotake | G06T 15/205 | 345/629 |
| 2005/0154505 A1* | 7/2005 | Nakamura | G01C 21/365 | 701/1 |
| 2006/0093235 A1* | 5/2006 | Takarada | G06T 5/002 | 382/264 |
| 2006/0245666 A1* | 11/2006 | Petrosyan | G06T 5/20 | 382/275 |
| 2008/0002041 A1* | 1/2008 | Chuang | H04N 9/3185 | 348/241 |
| 2009/0087115 A1* | 4/2009 | Wong | G06T 5/006 | 382/303 |
| 2009/0190856 A1* | 7/2009 | Omori | H04N 5/217 | 382/275 |
| 2009/0295818 A1* | 12/2009 | Jin | G06T 3/0018 | 345/581 |
| 2010/0134325 A1* | 6/2010 | Gomi | B60R 1/00 | 348/148 |
| 2010/0194886 A1* | 8/2010 | Asari | G06T 7/85 | 348/148 |
| 2011/0032357 A1* | 2/2011 | Kitaura | G06T 3/0056 | 348/148 |
| 2011/0074916 A1* | 3/2011 | Demirdjian | H04N 5/2254 | 348/36 |
| 2011/0122298 A1* | 5/2011 | Takahashi | G06T 5/006 | 348/241 |
| 2011/0156887 A1* | 6/2011 | Shen | G06V 10/24 | 382/284 |
| 2011/0157361 A1* | 6/2011 | Wu | G06T 3/4038 | 348/148 |
| 2011/0234802 A1* | 9/2011 | Yamada | G03B 15/02 | 348/148 |
| 2012/0114262 A1* | 5/2012 | Yu | G06T 5/006 | 382/254 |
| 2012/0249725 A1* | 10/2012 | Corcoran | G06T 3/0062 | 348/36 |
| 2012/0249796 A1* | 10/2012 | Kinoshita | B60R 1/00 | 348/148 |
| 2012/0320190 A1* | 12/2012 | Natroshvili | G06T 7/85 | 348/135 |
| 2013/0033494 A1* | 2/2013 | Kiyota | B66C 13/16 | 345/420 |
| 2013/0034269 A1* | 2/2013 | Kiyota | G06T 15/205 | 382/103 |
| 2013/0054086 A1* | 2/2013 | Lo | B60R 1/00 | 701/36 |
| 2013/0222386 A1* | 8/2013 | Tannhauser | G06T 11/00 | 345/428 |
| 2013/0236118 A1* | 9/2013 | Takahashi | G06T 5/006 | 382/275 |
| 2014/0002439 A1* | 1/2014 | Lynch | G06T 3/4053 | 345/419 |
| 2014/0043473 A1* | 2/2014 | Gupta | H04N 17/002 | 348/135 |
| 2014/0055487 A1* | 2/2014 | Kiyo | B60R 1/00 | 345/629 |
| 2014/0063197 A1* | 3/2014 | Yamamoto | G06T 11/001 | 348/46 |
| 2014/0067333 A1* | 3/2014 | Rodney | G06T 19/00 | 703/1 |
| 2014/0111637 A1* | 4/2014 | Zhang | B60R 1/088 | 348/118 |
| 2014/0111672 A1* | 4/2014 | Seki | H04N 9/646 | 348/242 |
| 2014/0114534 A1* | 4/2014 | Zhang | B60R 1/02 | 701/42 |
| 2014/0118341 A1* | 5/2014 | Shimizu | G06T 15/205 | 345/419 |
| 2014/0125774 A1* | 5/2014 | Lee | G06T 15/205 | 348/47 |
| 2014/0247352 A1* | 9/2014 | Rathi | G06V 20/588 | 348/148 |
| 2014/0278065 A1* | 9/2014 | Ren | G06T 17/05 | 701/454 |
| 2014/0320658 A1* | 10/2014 | Pliefke | H04N 17/002 | 348/148 |

(56) References Cited

U.S. PATENT DOCUMENTS

| | | | | |
|---|---|---|---|---|
| 2014/0333729 | A1* | 11/2014 | Pflug | H04N 13/106 348/47 |
| 2014/0341434 | A1* | 11/2014 | Lin | B60R 1/00 382/104 |
| 2014/0347450 | A1* | 11/2014 | Han | G06T 3/0031 348/47 |
| 2014/0375812 | A1* | 12/2014 | Ehlgen | G06T 15/205 348/148 |
| 2014/0375845 | A1* | 12/2014 | Lee | G06T 5/003 348/241 |
| 2015/0049193 | A1* | 2/2015 | Gupta | H04N 17/002 348/148 |
| 2015/0086078 | A1* | 3/2015 | Sibiryakov | G06T 11/60 382/104 |
| 2015/0104757 | A1* | 4/2015 | Moncrief | G09B 9/05 434/38 |
| 2015/0110420 | A1* | 4/2015 | Li | G06T 15/20 382/285 |
| 2015/0131924 | A1* | 5/2015 | He | H04N 5/2624 382/284 |
| 2015/0178884 | A1* | 6/2015 | Scholl | G06T 7/33 382/104 |
| 2015/0178903 | A1* | 6/2015 | Maeno | G06T 5/006 382/275 |
| 2015/0187224 | A1* | 7/2015 | Moncrief | G09B 9/24 434/30 |
| 2015/0232031 | A1* | 8/2015 | Kitaura | G06T 3/4038 348/148 |
| 2015/0258936 | A1* | 9/2015 | Takaki | B60R 1/00 348/148 |
| 2015/0332098 | A1* | 11/2015 | Wang | G06K 9/3241 382/103 |
| 2015/0334301 | A1* | 11/2015 | He | G06T 3/4038 348/36 |
| 2015/0379689 | A1* | 12/2015 | Andreopoulos | G06T 3/4046 382/158 |
| 2016/0035110 | A1* | 2/2016 | Kiyota | B60R 1/00 348/148 |
| 2016/0080699 | A1* | 3/2016 | Scholl | G06T 15/10 348/148 |
| 2016/0086333 | A1* | 3/2016 | Scholl | B60R 1/00 701/300 |
| 2016/0148062 | A1* | 5/2016 | Fürsich | B60R 1/00 348/36 |
| 2016/0176344 | A1* | 6/2016 | Wang | G06V 10/42 348/36 |
| 2016/0180501 | A1* | 6/2016 | Mallet | H04N 5/2628 382/164 |
| 2016/0193983 | A1* | 7/2016 | Sawada | B60R 25/102 348/148 |
| 2016/0212384 | A1* | 7/2016 | Sawada | G06T 15/04 |
| 2016/0275682 | A1* | 9/2016 | Natroshvili | G06T 7/85 |
| 2016/0284087 | A1* | 9/2016 | Natroshvili | B60R 1/00 |
| 2016/0286170 | A1* | 9/2016 | Abhau | H04N 7/181 |
| 2016/0300113 | A1* | 10/2016 | Molin | H04N 17/002 |
| 2016/0301863 | A1* | 10/2016 | Petrany | H04N 5/247 |
| 2016/0301864 | A1* | 10/2016 | Petrany | H04N 5/23238 |
| 2016/0321940 | A1* | 11/2016 | Banga | G09B 9/05 |
| 2016/0343136 | A1* | 11/2016 | Heidi | G06T 7/80 |
| 2016/0349066 | A1* | 12/2016 | Chung | G01C 21/3658 |
| 2016/0360104 | A1* | 12/2016 | Zhang | H04N 5/265 |
| 2016/0368417 | A1* | 12/2016 | Bassi | H04N 5/23293 |
| 2016/0379381 | A1* | 12/2016 | Krutsch | G06T 15/04 345/426 |
| 2017/0018085 | A1* | 1/2017 | Liepelt | G06T 5/006 |
| 2017/0132476 | A1* | 5/2017 | Chien | G06K 9/00791 |
| 2017/0132764 | A1* | 5/2017 | Chan | G06T 5/002 |
| 2017/0195564 | A1* | 7/2017 | Appia | B60R 1/00 |
| 2017/0201769 | A1* | 7/2017 | Chon | H04N 19/147 |
| 2017/0203692 | A1* | 7/2017 | Friebe | G06T 15/205 |
| 2017/0277961 | A1* | 9/2017 | Kuehnle | G06T 7/80 |
| 2017/0287119 | A1* | 10/2017 | Andreopoulos | G06N 3/063 |
| 2017/0297488 | A1* | 10/2017 | Wang | B60R 1/00 |
| 2017/0323459 | A1* | 11/2017 | Ermilios | G06T 7/80 |
| 2017/0324943 | A1* | 11/2017 | Wu | G06T 11/60 |
| 2017/0330311 | A1* | 11/2017 | Suzuki | G06T 11/60 |
| 2017/0345136 | A1* | 11/2017 | Van der Auwera | H04N 5/23238 |
| 2017/0345164 | A1* | 11/2017 | Guerreiro | G06T 7/80 |
| 2017/0347030 | A1* | 11/2017 | Guerreiro | G06T 7/277 |
| 2017/0352275 | A1* | 12/2017 | Maruyama | H04N 7/181 |
| 2018/0040141 | A1* | 2/2018 | Guerreiro | G06K 9/00791 |
| 2018/0089900 | A1* | 3/2018 | Rober | B60W 10/22 |
| 2018/0150943 | A1* | 5/2018 | Gur | G06T 1/60 |
| 2018/0176533 | A1* | 6/2018 | Friebe | H04N 13/111 |
| 2018/0182261 | A1* | 6/2018 | Naouri | G09B 9/052 |
| 2018/0205889 | A1* | 7/2018 | Abbas | H04N 5/247 |
| 2018/0210442 | A1* | 7/2018 | Guo | G05D 1/0016 |
| 2018/0211394 | A1* | 7/2018 | Sergeev | G06T 7/97 |
| 2018/0232866 | A1* | 8/2018 | Weller | G09G 3/001 |
| 2018/0244199 | A1* | 8/2018 | Gyori | G06T 11/60 |
| 2018/0286012 | A1* | 10/2018 | Dolzhenko | G06T 3/0018 |
| 2018/0286109 | A1* | 10/2018 | Woo | G06F 3/011 |
| 2018/0308275 | A1* | 10/2018 | Fortmann | G06K 9/00791 |
| 2018/0315244 | A1* | 11/2018 | Thompson | H04N 5/23293 |
| 2018/0330526 | A1* | 11/2018 | Corcoran | H04N 7/181 |
| 2018/0365859 | A1* | 12/2018 | Oba | G06T 7/85 |
| 2018/0365888 | A1* | 12/2018 | Satzoda | G06N 3/0454 |
| 2018/0373030 | A1* | 12/2018 | Kusanagi | G09G 5/00 |
| 2019/0005727 | A1* | 1/2019 | Tanaka | G06K 9/00798 |
| 2019/0007669 | A1* | 1/2019 | Kim | H04N 19/70 |
| 2019/0009175 | A1* | 1/2019 | Buxton | A63F 13/26 |
| 2019/0026557 | A1* | 1/2019 | Watanabe | G06V 20/20 |
| 2019/0050000 | A1* | 2/2019 | Kennedy | G06T 7/277 |
| 2019/0057536 | A1* | 2/2019 | Fenney | G02B 27/017 |
| 2019/0100147 | A1* | 4/2019 | Fang | G03B 37/04 |
| 2019/0102868 | A1* | 4/2019 | Beric | G06T 5/006 |
| 2019/0102911 | A1* | 4/2019 | Natroshvili | B60R 1/00 |
| 2019/0104278 | A1* | 4/2019 | Ermilios | G06T 7/231 |
| 2019/0132569 | A1* | 5/2019 | Karpenko | G06F 3/04886 |
| 2019/0164333 | A1* | 5/2019 | Fukushima | B60R 1/002 |
| 2019/0221028 | A1* | 7/2019 | Watanabe | B62D 15/0295 |
| 2019/0281273 | A1* | 9/2019 | Lin | H04N 19/167 |
| 2019/0281293 | A1* | 9/2019 | Lin | H04N 19/117 |
| 2019/0286123 | A1* | 9/2019 | Bando | G06T 15/205 |
| 2019/0287255 | A1* | 9/2019 | Yamazaki | G06T 7/215 |
| 2019/0299858 | A1* | 10/2019 | Imamura | H04N 13/32 |
| 2019/0306383 | A1* | 10/2019 | Liu | H04N 5/217 |
| 2019/0311546 | A1* | 10/2019 | Tay | G06T 5/50 |
| 2019/0318178 | A1* | 10/2019 | Kauffmann | G06V 20/56 |
| 2019/0340771 | A1* | 11/2019 | Keskikangas | G08B 29/20 |
| 2019/0347760 | A1* | 11/2019 | Takahashi | H04N 5/23238 |
| 2019/0349571 | A1* | 11/2019 | Herman | H04N 5/247 |
| 2019/0355171 | A1* | 11/2019 | Ashley | B60W 30/06 |
| 2019/0376221 | A1* | 12/2019 | Lin | D05B 19/12 |
| 2019/0378251 | A1* | 12/2019 | Hsu | G06T 3/4007 |
| 2019/0379841 | A1* | 12/2019 | Hardy | G06T 7/70 |
| 2019/0392740 | A1* | 12/2019 | Funabiki | G09G 3/001 |
| 2020/0007755 | A1* | 1/2020 | Yamamoto | G06T 1/60 |
| 2020/0017025 | A1* | 1/2020 | Berkemeier | B62D 13/06 |
| 2020/0023772 | A1* | 1/2020 | Kurnaz | G06T 3/4038 |
| 2020/0034953 | A1* | 1/2020 | Friebe | H04N 5/247 |
| 2020/0066169 | A1* | 2/2020 | Li | G01C 11/025 |
| 2020/0073382 | A1* | 3/2020 | Noda | G05D 1/0088 |
| 2020/0081607 | A1* | 3/2020 | Yamamoto | G06T 3/40 |
| 2020/0081608 | A1* | 3/2020 | Yamamoto | G06T 3/40 |
| 2020/0086791 | A1* | 3/2020 | Hardy | G06T 5/005 |
| 2020/0099933 | A1* | 3/2020 | Tanner | H04N 19/14 |
| 2020/0104991 | A1* | 4/2020 | Ueda | G06K 9/036 |
| 2020/0112675 | A1* | 4/2020 | Arbeiter | G06T 15/205 |
| 2020/0128902 | A1* | 4/2020 | Brown | A42B 3/30 |
| 2020/0134777 | A1* | 4/2020 | Yamamoto | G06T 3/00 |
| 2020/0137322 | A1* | 4/2020 | Yokota | H04N 5/2628 |
| 2020/0153885 | A1* | 5/2020 | Lee | G06T 15/04 |
| 2020/0167996 | A1* | 5/2020 | Watanabe | B60R 1/00 |
| 2020/0174261 | A1* | 6/2020 | Uenohara | G02B 27/0101 |
| 2020/0195839 | A1* | 6/2020 | Sung | H04N 5/232945 |
| 2020/0202491 | A1* | 6/2020 | Lin | G06T 3/4038 |
| 2020/0218910 | A1* | 7/2020 | Herman | G06V 20/20 |
| 2020/0231091 | A1* | 7/2020 | Hayashida | H04N 7/18 |
| 2020/0238907 | A1* | 7/2020 | Watanabe | G06T 1/0007 |
| 2020/0249044 | A1* | 8/2020 | Watanabe | G01C 21/343 |

(56) References Cited

U.S. PATENT DOCUMENTS

| | | | |
|---|---|---|---|
| 2020/0253527 A1* | 8/2020 | Ellison | A61B 5/168 |
| 2020/0294194 A1* | 9/2020 | Sun | H04N 5/23238 |
| 2020/0307437 A1* | 10/2020 | Thieberger | G05D 1/0214 |
| 2020/0310126 A1* | 10/2020 | Otsuka | G02B 27/017 |
| 2020/0310127 A1* | 10/2020 | Otsuka | G02B 27/0101 |
| 2020/0324781 A1* | 10/2020 | Hayakawa | G06T 7/246 |
| 2020/0348127 A1* | 11/2020 | Heinrich | G01B 11/2513 |
| 2020/0349367 A1* | 11/2020 | Sasaki | G06T 7/251 |
| 2020/0394445 A1* | 12/2020 | Han | G06V 20/56 |
| 2020/0396394 A1* | 12/2020 | Zlokolica | G06T 5/20 |
| 2020/0406904 A1* | 12/2020 | Yan | G01S 7/52004 |
| 2021/0004610 A1* | 1/2021 | Huang | G01S 17/931 |
| 2021/0012458 A1* | 1/2021 | Stec | G06T 5/006 |
| 2021/0027522 A1* | 1/2021 | Dabral | G06T 15/20 |
| 2021/0042890 A1* | 2/2021 | Naidu | G06T 5/006 |
| 2021/0090220 A1* | 3/2021 | Manchi | G06T 3/0093 |
| 2021/0110188 A1* | 4/2021 | Otsubo | H04N 5/225 |
| 2021/0118104 A1* | 4/2021 | Kornienko | H04N 5/2628 |
| 2021/0158493 A1* | 5/2021 | Slutsky | G06T 3/4038 |
| 2021/0303898 A1* | 9/2021 | Wang | G06V 20/10 |
| 2021/0316669 A1* | 10/2021 | Wang | G01S 13/867 |
| 2021/0321038 A1* | 10/2021 | Raproeger | H04N 9/76 |
| 2021/0398301 A1* | 12/2021 | Guizilini | G06T 7/50 |
| 2022/0012529 A1* | 1/2022 | Qu | G06T 15/205 |
| 2022/0012854 A1* | 1/2022 | Bindal | G06T 5/006 |
| 2022/0051435 A1* | 2/2022 | Higashihara | G06T 7/60 |

OTHER PUBLICATIONS

Szeliski, Richard, Computer Vision: Algorithms and Applications, New York, Springer-Verlag New York, Inc. 2010. 979 pp.

Appia, Viram, et al., "Surround view camera system for ADS on TI's TDAx SoCs," Oct. 2015, Texas Instruments, 18 pp.

Liu, Y. and B. Zhang, "Photometric alignment for surround view camera system," 2014 IEEE International Conference on Image Processing (ICIP), Paris, 2014, pp. 1827-1831.

Japanese Office Action; Application No. 2021-506937; dated Apr. 26, 2022; 8 pgs.

* cited by examiner

Dual View

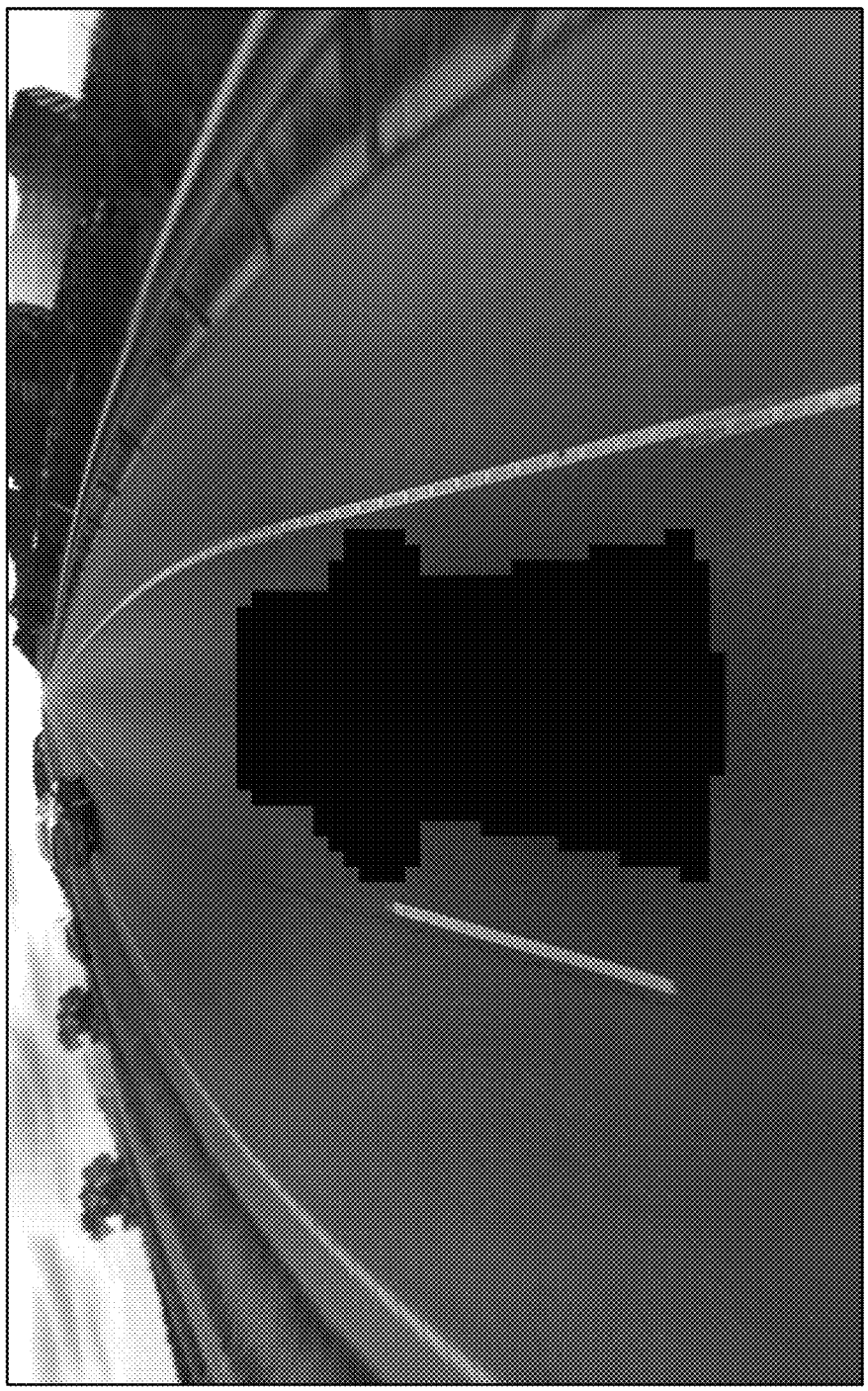
*View from Above and Behind*
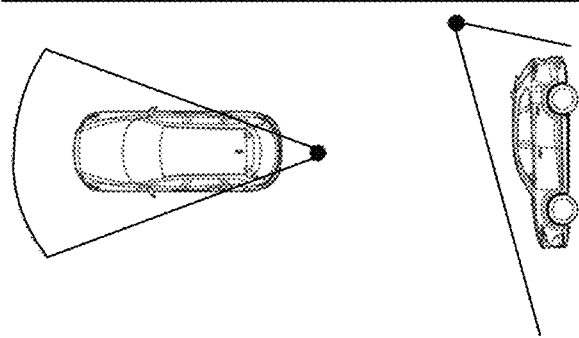
*FIG. 2C*

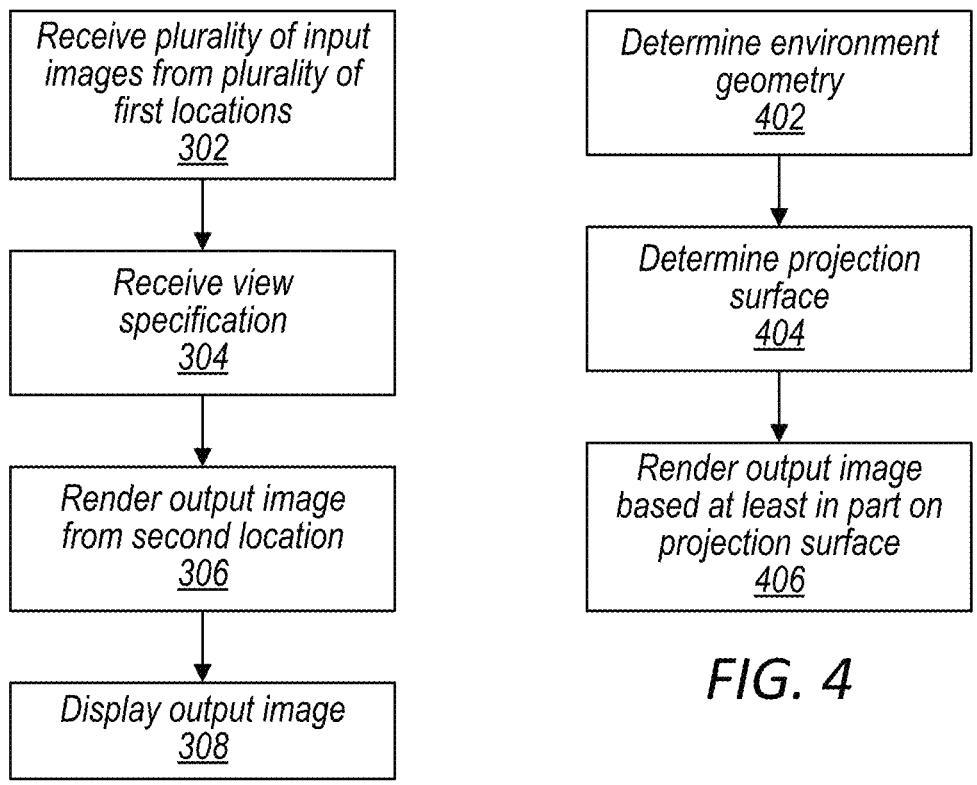
FIG. 3
FIG. 4
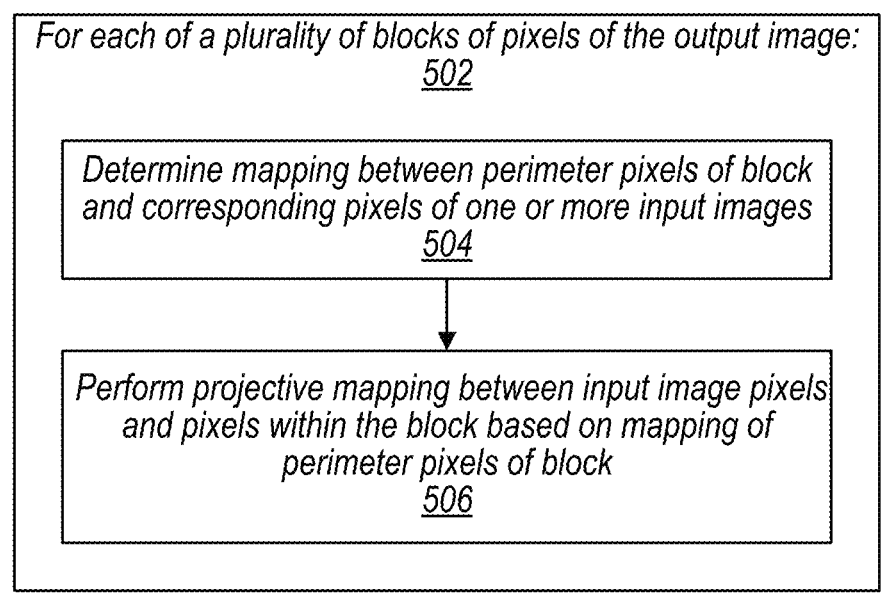
FIG. 5

```
{
    "bbTL": {
        "x": 1058,
        "y": 521
    },
    "bbBR": {
        "x": 1082,
        "y": 550
    },
    "destTL": {
        "x": 448,
        "y": 560
    },
    "destBR": {
        "x": 464,
        "y": 576
    },
    "isInSource": 1,
    "alignment": "RGGB",
    "cameraId": 2,
    "cameraIdBlend": 3,
    "blendRatio": 0.232799682033319,
    "mapInfo": [
        -0.633889991380379,
        -0.514908602648973,
        19.0903305918482,
        0.422602878130434,
        -1.31265486488085,
        21.0926994569206
    ]
},
```

FIG. 14

```
typedef struct BlockInfo
{
    int16_t bbTL[2];         // bounding box top left not including padding
    int16_t bbBR[2];         // bounding box bottom right
    int16_t destTL[2];       // dest block top left
    int16_t destBR[2];       // dest block bottom right
    int16_t isInSource;      // bounding box is contained in source
    int16_t alignment;       // demosaic alignment of bbTL
    int16_t cameraId;        // which of the 4 camera inputs to use
    int16_t cameraIdBlend;   // which camera is blended with current one
    float   blendRatio;      // blending ratio needed in overlapped regions
    float   mapInfo[6];      // map destination block to source block
} BlockInfo_t;
```

*FIG. 15*

```
{
  "calibrationImage": "front_c.png",
  "targetPosition": {
    "x": 0,
    "y": -2.79
  },
  "chessboardSize": {
    "x": 9,
    "y": 7
  },
  "squareSize": {
    "x": 0.1002,
    "y": 0.09363
  },
  "camId": 1,
  "camOrientation": "FRONT",
  "boundaryCenter": {
    "x": 700,
    "y": -2440
  },
  "boundaryRadius": 3040,
  "rvec": [
    -0.965619792215381,
    0.0275819970053851,
    0.00863153467022785
  ],
  "tvec": [
    -0.0566864535850493,
    1.69633509015168,
    -0.731965330039823
  ],
  "camPosition": {
    "x": 0.0450703350219766,
    "y": -1.56796471153181,
    "z": -0.977749796610679
  }
}
```

FIG. 16

```
{
    "altitude" : -10,
    "azimuth" : 180,
    "cameraPosition": {
        "x": 0,
        "y": -3,
        "z": -1.0
    }
    "fov": 60,
    "width": 1440,
    "height": 896,
    "surfaceDepth": 10,
    "blendWidth": 30
}
```

SURROUND VIEW GENERATION

PRIORITY CLAIM

This application claims benefit of priority to U.S. Provisional Application No. 62/737,050 titled "Surround View Generation" and filed on Sep. 26, 2018 which is hereby incorporated by reference in its entirety as if fully and completely set forth herein.

FIELD OF THE INVENTION

The field of the invention generally relates to perspective view generation and image rendering.

DESCRIPTION OF THE RELATED ART

Many types of vehicles utilize one or more cameras to capture, display, and/or record images and/or video of the surroundings of the vehicle, to assist in driving, navigation, or other tasks. Additionally, cameras are widely employed in a variety of other practical applications for surveillance, security, or entertainment, among other possibilities, to record images and/or video of a particular environment. However, for practical reasons it may be difficult or cost prohibitive to install a camera at a particular location from which it is desired to record an image or video. Accordingly, improvements in the field are desired.

SUMMARY OF THE EMBODIMENTS

Various embodiments are described of an Any World View system and methods for rendering an output image from a plurality of input images, where the output image is from a perspective corresponding to a location different from each of the plurality of locations from which the input images are taken.

In some embodiments, a plurality of input images is received, and each input image is taken from a different first location. A view specification for rendering the output image may be received, and the view specification includes at least a second location. The first location and second location may each be specified by three spatial coordinates (e.g., (x,y,z)) in a global coordinate frame, in some embodiments. The view specification may further include one or more of a pose specification including azimuthal angles and/or a polar angle, a field of view (e.g., zoom or magnification), a projection surface depth, one or more projection surface parameters, a pixel resolution, and a blending width.

The second location may be different from each of the first locations. An output image may be rendered based at least in part on the plurality of input images and the view specification, and the output image may include an image of a region as seen from the second location. For example, the second location may be a "virtual location" used for rendering the output image, even though there may not be a camera located at this location.

In some embodiments, a projection surface is determined, and rendering the output image based at least in part on the plurality of input images includes mapping pixels of the plurality of input images onto the projection surface, and mapping locations on the projection surface to pixels of the output image. The projection surface may be determined to approximate the surroundings of the cameras used to acquire the plurality of input images.

In some embodiments, rendering the output image based at least in part on the plurality of input images and the view specification includes, for each of a plurality of blocks of pixels of the output image, determining a mapping between a plurality of pixels along the perimeter of the respective block of pixels and a plurality of corresponding pixels of each of one or more of the input images. For example, the plurality of pixels along the perimeter of a respective block of pixels may be four corner pixels of a square block of pixels. For each of the one or more input images and for each of the plurality of blocks of pixels of the output image, projective mapping may be performed of pixels located within a perimeter of the corresponding pixels of the input image to respective pixels in the output image, and said projective mapping may be based at least in part on the mapping between the plurality of pixels along the perimeter of the respective block of pixels and the plurality of corresponding pixels of the one or more input images.

The output image may be displayed on a display. In some embodiments, a succession of output images is repeatedly rendered based on a succession of respective pluralities of input images, and the succession of output images is displayed on the display in real time to produce a real time video. The output image and/or output video may serve as an input to another application (e.g., for further processing), and/or the output may be stored on a storage media.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention may be obtained when the following detailed description of the preferred embodiment is considered in conjunction with the following drawings, in which:

FIG. 2C is an illustration of an output image from a viewpoint above and behind the vehicle produced from the raw camera data shown in FIG. 2A, according to some embodiments;

FIG. 3 is a flowchart diagram illustrating a method for rendering an output image from a plurality of input images, according to some embodiments;

FIG. 4 is a flowchart diagram illustrating a method for determining a projection surface, according to some embodiments;

FIG. 5 is a flowchart diagram illustrating a method for performing block-by-block output image rendering, according to some embodiments;

FIG. 14 is pseudocode illustrating a code structure for BlockInfo in a JavaScript™ Object Notification (JSON) file format, according to some embodiments;

FIG. 15 is pseudocode illustrating a code structure for BlockInfo as a C/C++ structure, according to some embodiments;

FIG. 16 is pseudocode illustrating a code structure for CamData in a JSON file format, according to some embodiments;

Figure 1:
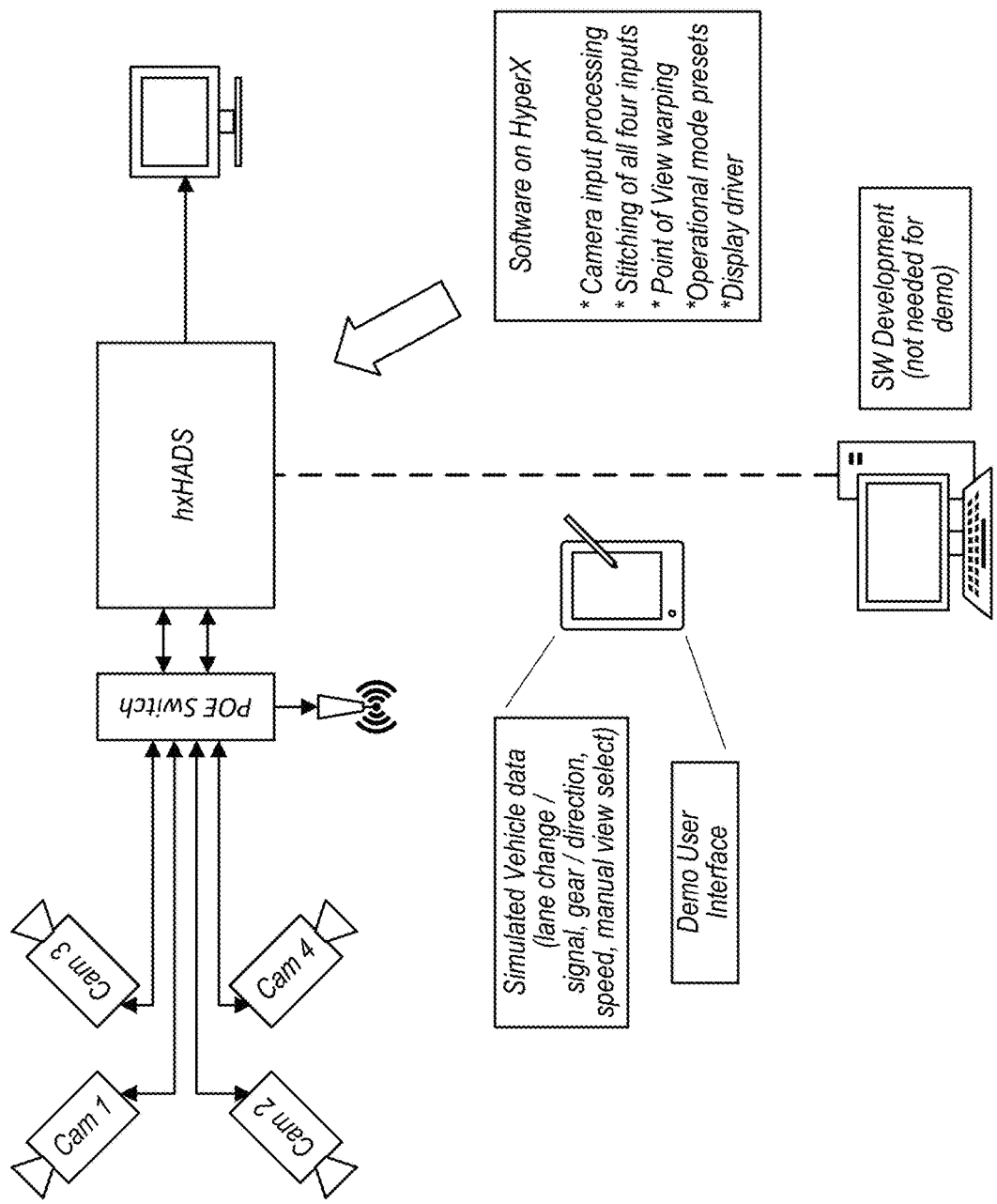
FIG. 1 is a schematic diagram of an Advanced Driver Assistance Systems (ADAS) platform, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Incorporation by Reference

The following references are hereby incorporated by reference in their entirety as though fully and completely set forth herein:

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical or optical signals.

Programmable Hardware Element—includes various hardware devices comprising multiple programmable function blocks connected via a programmable or hardwired interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Application Specific Integrated Circuit (ASIC)—this term is intended to have the full breadth of its ordinary meaning. The term ASIC is intended to include an integrated circuit customized for a particular application, rather than a general purpose programmable device, although an ASIC may contain programmable processor cores as building blocks. Cell phone processors, MP3 player chips, and many other single-function ICs are examples of ASICs. An ASIC is usually described in a hardware description language such as Verilog or VHDL.

Program—the term "program" is intended to have the full breadth of its ordinary meaning. The term "program" includes 1) a software program which may be stored in a memory and is executable by a processor or 2) a hardware configuration program useable for configuring a programmable hardware element or ASIC.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, e.g., imperative or procedural languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element or ASIC.

Computer System—any of various types of computing or processing systems, including a personal computer system (PC), mainframe computer system, workstation, network appliance, Internet appliance, personal digital assistant (PDA), grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system may update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Definition of Acronyms

| | |
|---|---|
| ADAS | Advanced Driver Assistance Systems |
| hxISDE | HyperX ™ Integrated Software Development Environment |
| hxHADS | HyperX ™ Application Development System |
| FOV | Field of View |
| DVI | Digital Video Interface |
| API | Application Programming Interface |

DETAILED DESCRIPTION

Introduction

Embodiments herein present systems and methods for producing an Any World View rendered output image and/or video that utilizes multi-view geometric transformations of frames of image and/or video from multiple cameras to synthesize a virtual rendered video of an environment as if captured by a floating virtual camera. In some embodiments, this virtual camera may have six degrees of freedom including: x, y, z position; azimuth and elevation pose, and field of view angle. Advantageously, the virtual camera may be located at a position that is different from each of the locations of the multiple cameras. In addition, the projection surface used to render the output image/video may be dynamic and may be linked to distance estimates to objects around the virtual camera. The distance estimates may be obtained with distance measuring sensors, such ultrasonic or mmWave ranging sensors, radar, lidar, or using computer vision techniques applied to the video frames. Embodiments herein may be employed in a variety of applications, such as for vehicle Advanced Driver Assistance Systems (ADAS), drone video capture, office or home environments, or other platforms with multiple cameras.

In some embodiments, multiple camera views are combined into a single perspective view that gives the operator control of the virtual viewpoint that is synthesized from the multiple cameras positioned around the perimeter of the vehicle or other object. This synthesized view may integrate the multiple individual camera streams in a seamless blending of distortion and illumination corrected images from each camera. In addition, the user may specify the perspective or virtual viewpoint to display, e.g. a top down view from above the vehicle.

In some embodiments, parallel processing architectures such as HyperX™ technology may be utilized to accommodate the high computational costs of executing the algorithms that ingest multi-modal sensor data and provide information to the driver and car systems. Advantageously, a virtual Any World View may be rendered, offering a 360° surround view with dynamic virtual camera position and a dynamic projection surface. A conceptual diagram of the functional relationships between components of an Any World View system is shown in FIG. 1, according to some embodiments. Advantageously, some embodiments herein create a system that assists a driver in operating a vehicle in a safe manner when the view around the vehicle is restricted either by the structure of the vehicle itself or by the ability to physically visualize all the directions around the driver. Methods and systems are described herein for transforming video data captured from a number of digital video cameras into a rendered video display representing a virtual point of view around a vehicle or other object. The rendered output image(s) may serve as an input to another application (e.g., for further processing), and/or may be stored in memory or on another type of storage media, in some embodiments.

FIG. 3—Rendering Output Image Flowchart

FIG. 3 is a flowchart diagram illustrating a method for rendering an output image from a plurality of input images, according to some embodiments. In some embodiments, the described methods may be performed by a computer system comprising a processor that is coupled to a multi-camera system. The processor may be coupled to one or more non-transitory computer readable memory media, which may have stored thereon program instructions for performing the described methods. In some embodiments, and as described in greater detail in Section 5, the processor may be a parallel processing hardware system, which may be utilized to reduce latency of the computational steps. In various embodiments, some of the elements of the methods shown may be performed concurrently, in a different order than shown, may be substituted for by other method elements, or may be omitted. Additional method elements may also be performed as desired. As shown, the method may operate as follows.

At 302, a plurality of input images is received, wherein each input image of the plurality of input images is taken from a different first location. In other words, each input image may be taken by a camera or another type of image acquisition device that is located at a different first location, such that the plurality of input images corresponds to a plurality of respective first locations. The cameras may be mounted on various locations of a vehicle such as a car, truck, plane, or boat; a drone; furniture; or any other type of object. The plurality of cameras may each have their own location, orientation, and/or field of view, and the fields of view of various cameras of the plurality of cameras may partially overlap.

Figure 2A:
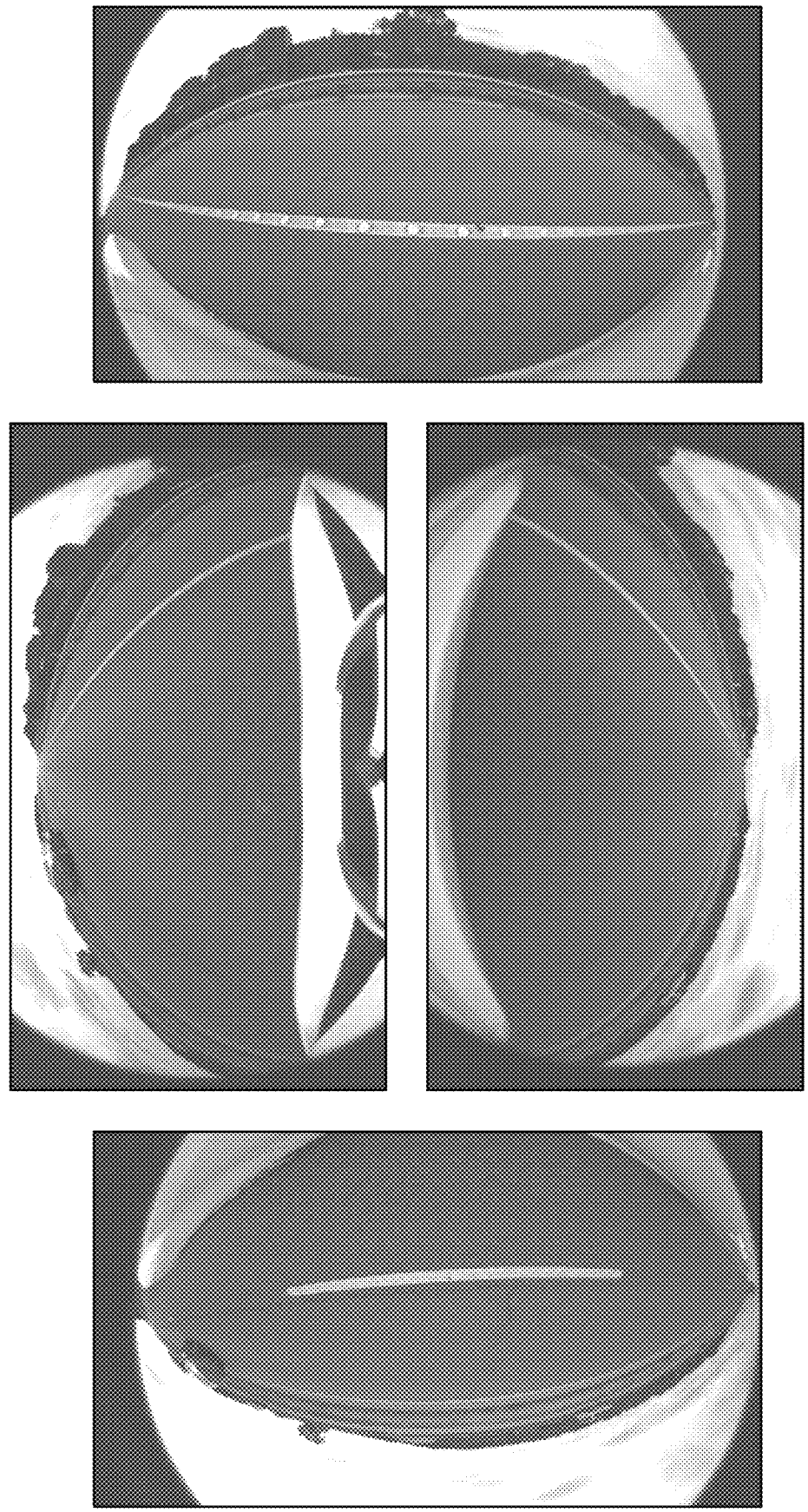
FIG. 2A is an illustration of raw camera data taken from four cameras attached to a vehicle, according to some embodiments.
Figure 2B:
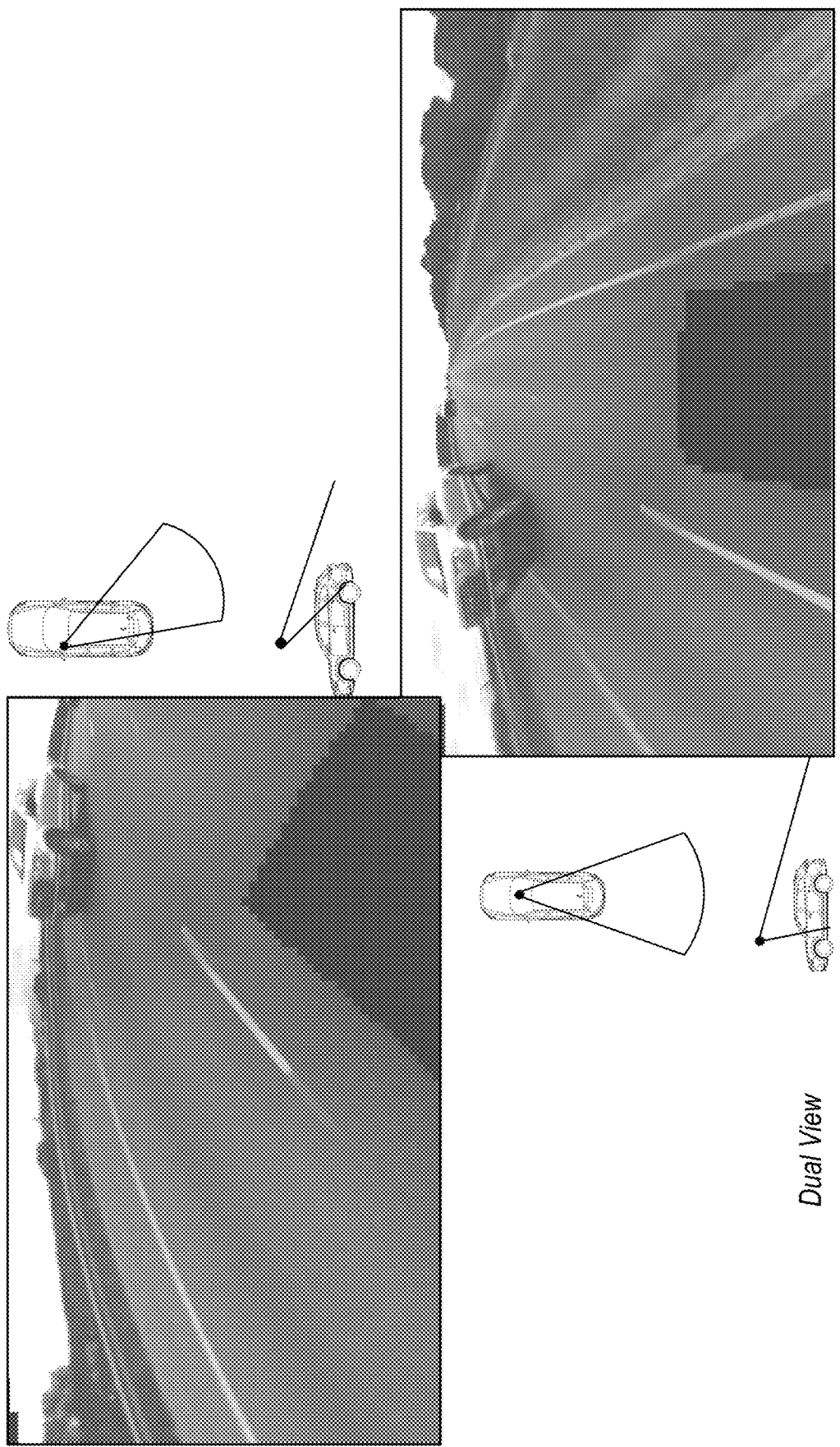
FIG. 2B is an illustration of a dual view output image produced from the raw camera data shown in FIG. 2A, according to some embodiments.

At 304, a view specification is received for rendering the output image. The view specification may be received responsive to user input. For example, a user may present input to determine one or more parameters of the view specification, which may be provided to the computing system for use in rendering the output image. The view specification may include a second location for rendering the output image, and the second location may be different from each of the first locations. As one example, if the plurality of input images include four input images taken from four different first locations on a vehicle (e.g., as illustrated in FIG. 2A), the second location may be located above the vehicle or at another location outside the vehicle. The view specification may further specify one or more additional parameters for use in rendering the output image, including but not limited to an azimuthal angle, a polar angle, a field of view, a projection surface depth, one or more projection surface parameters, a pixel resolution, and/or a blending width. It is noted that the azimuthal angle and the polar angle as intended to be measured in a spherical coordinate system whose origin is the second location. The azimuthal angle and the polar angle may thereby specify a view orientation for rendering the output image, from the perspective of the second location. The field of view may specify a solid angle and/or a degree of magnification of the output image. Furthermore, the view specification may specify a pixel resolution of the output image (e.g., 1280×720, 1920×1080, or another resolution) and/or a blending width for blending contributions to the output image from portions of different input images that overlap. The projection surface depth may specify one or more depth parameters of a projection surface used to render the output image. For example, for embodiments where the projection surface is an elliptical cylinder, the view specification may specify one or both of the major and minor axes of the elliptical cylinder. The one or more projection surface parameters may further specify different sizes, shapes, or presets for the projection surface. Alternatively, and as described in greater detail below, the projection surface may be determined automatically by the computing system.

For embodiments where a succession of output images are rendered to produce an output video based on a respective succession of a plurality of input images, the view specification may be dynamically altered by a user to change one or more parameters of the output video in real time. For example, a user may adjust one or more parameters of the view specification such as the second location and/or the viewpoint direction to smoothly alter the viewpoint of the output video in real time. This may be advantageous, as one example, in a parking scenario where a user may alter the perspective of the output video by changing one or more parameters of the view specification during a parking procedure.

In some embodiments, further user input is received specifying one or more second view specifications, and one or more second output images are rendered based at least in part on the one or more second view specifications and the plurality of input images. In other words, a single set of input image data may be used to render a plurality of different output images from different viewpoints described by the first and second view specifications. The one or more second output images may be displayed on the same display as the first output image (i.e., the output image produced from the first view specification), or they may be displayed on one or more different displays.

At 306, the output image is rendered based at least in part on the plurality of input images and the view specification. The output image is an image of a region as seen from the second location and according to one or more other parameters of the view specification. In some embodiments, the output image is rendered further based on a projection surface, as described in greater detail below in reference to FIG. 4. Additionally or alternatively, the output image may be rendered on a block-by-block basis, as described in greater detail below in reference to FIG. 5. Advantageously, the output image may be rendered from a viewpoint (i.e., a location, azimuthal angle, and/or polar angle, among other potential properties of the view specification) that is different from the viewpoints of any of the plurality of input images.

In some embodiments, at least one portion of the output image is sourced from two or more input images of the plurality of input images, and rendering the at least one portion of the output image includes blending contributions from the two or more input images of the plurality of input images. For example, two of the input images may partially overlap in their field of view, such that pixels from both of these input images within the area of overlap may contribute to a corresponding portion of the output image.

In some embodiments, the blending is weighted based at least in part on a proximity of the first locations of the two or more input images to a projected location of the at least one portion of the output image. For example, when two of the input images overlap within a portion of their respective fields of view, it may be determined how far a projected location of the area of overlap is from the first locations from which each of the two input images was taken. In this example, the contributions of the two input images to the corresponding portion of the output image may be weighted such that the input image taken from a first location that is closer to the projected location is given a larger weight than the other input image that is taken from a farther first location. Additionally or alternatively, the blending may correct for discrepancies in illumination between the two or more input images.

At 308, the output image is displayed on a display. The display may be collocated with a computing device that renders the output image, or they may be remote from each other and connected over a wireless network. In some embodiments, the display may be installed within a vehicle to offer ADAS services to a driver or operator of the vehicle. Alternatively, the display may be remotely located from the vehicle and may be comprised within a device configured to remotely drive or operate the vehicle.

In some embodiments, a succession of output images may be repeatedly rendered based a succession of respective pluralities of input images, and the succession of output images is displayed on the display in real time to produce a real time video. In other words, while the method described in reference to FIG. 3 recites a single output image rendered from a plurality of input images, it is within the scope of some embodiments to produce output video from a plurality of input video, where the method steps described herein are repeated for each frame of video.

FIG. 4—Projection Surface Flowchart

FIG. 4 is a flowchart diagram illustrating a method for determining a projection surface to assist in rendering an output image, according to some embodiments. The method steps described in FIG. 4 may be performed in conjunction with the method steps described in reference to FIGS. 3 and/or 5, as part of a method to render an output image from a plurality of input images. In some embodiments, the described methods may be performed by a computer system comprising a processor that is coupled to a multi-camera system. The processor may be coupled to one or more non-transitory computer readable memory media, which may have stored thereon program instructions for performing the described methods. In some embodiments, and as described in greater detail in Section 5, the processor may be a parallel processing hardware system, which may be utilized to reduce latency of the computational steps. In various embodiments, some of the elements of the methods shown may be performed concurrently, in a different order than shown, may be substituted for by other method elements, or may be omitted. Additional method elements may also be performed as desired. As shown, the method may operate as follows.

At 402, a geometric layout of the environment is determined. For example, the geometric layout of an environment surrounding the first locations associated with the plurality of input images may be determined. The geometric layout may be understood to represent an approximation of the surroundings of the first locations, which may be used to determine an effective projection surface for rendering the output image. It is noted that step 302 is optional, and the projection surface may be determined based on one or more other factors without determining the geometric layout of the environment. For example, the projection surface may by default be an elliptical cylinder, as described below, and the size of the elliptical cylinder (e.g., the length of the major and/or minor axes) may be determined based on a speed of the vehicle or other factors, such as distances to nearby objects, for example.

In some embodiments, determining the geometric layout of the environment includes determining ranging information related to an area surrounding the first locations, and said determining the projection surface is performed based at least in part on the ranging information. For example, one or more ranging apparatuses may be collocated with one or more of the plurality of cameras used to acquire the plurality of input images. The ranging apparatus(es) may utilize radar, sonar, lidar, computer vision processing algorithms, machine learning, and/or other techniques to estimate distances from a respective first location to various portions of the respective input image. For example, if a particular input image shows a road, another vehicle, and/or a tree or other object, the ranging apparatus may estimate distances from the first location of the particular input image to various points on the road, vehicle, tree, or other object.

At 404, a projection surface is determined. The projection surface may include a basis-spline surface approximating the environment surrounding the first locations associated with the plurality of input images. The estimated distances produced by the one or more ranging apparatuses may be used to determine the projection surface, in some embodiments. For example, a projection surface may be determined that is derived from the distances obtained by the ranging apparatus(es). In other words, a projection surface may be determined that approximates the surroundings of the vehicle or other object upon which the plurality of cameras is mounted, and the ranging information may be used to inform this approximation.

In some embodiments, the projection surface may be a piece-wise and/or a discontinuous surface that is determined based on the environment of the vehicle or other factors. In other words, the projection surface may be determined to any desired level of specificity or detail, up to and including a pixel-by-pixel depth specification of the location of the projection surface relative to an origin point for any desired solid angle (e.g., up to and including $4\pi$ steradians) surrounding the origin point.

In some embodiments, the first locations are locations on a vehicle, and the projection surface includes a horizontal portion surrounding the vehicle and a vertical portion encompassing the horizontal portion. In some embodiments, the horizontal portion of the projection surface is an elliptical disc surrounding the vehicle, the vertical portion of the projection surface is an elliptical cylinder encompassing the elliptical disc, and the projection surface further includes an intermediate region that smoothly joins the elliptical disc and the elliptical cylinder. In ADAS embodiments, where cameras used to take the input images are mounted to a first vehicle, the major axis of the elliptical disc may run from the front of the vehicle to the back of the vehicle and the minor axis of the elliptical disc may run from the left side of the vehicle to the right side of the vehicle. In some embodiments, the elliptically cylindrical shape of the projection surface may be modified to accommodate one or more objects determined to be within close proximity to the first vehicle (e.g., "close proximity" in this context may be understood to mean within the vertical portion of the elliptical cylinder). In other words, if it is determined through a ranging procedure or another mechanism that an object such as a second vehicle is in close proximity to the first vehicle, the elliptically cylindrical projection surface may be modified to include an approximation of the location and shape of the second vehicle.

In some embodiments, the size of the horizontal portion is determined based at least in part on a current speed of the vehicle, wherein a higher current speed of the vehicle determines a larger horizontal portion than a lower current speed of the vehicle. In some embodiments, the size of the horizontal portion is determined based at least part on a shortest distance to a nearby object. For example, the size of the horizontal portion may be scaled based on a proximity of another vehicle or other object to the plurality of cameras. In other words, and as one example, as a vehicle approaches closer to the vehicle that has mounted thereon the plurality of cameras that produce the input images, the size of the horizontal portion may be reduced to match the distance to the approaching vehicle.

In some embodiments, one or both of steps 402 and 404 may be performed as part of a calibration process. In other words, steps 402 and 404 may be performed during design or production of a computing system configured to render the output image.

At 406, the output image is rendered based at least in part on the projection surface. In some embodiments, rendering the output images includes mapping pixels of a plurality of input images onto the projection surface, and mapping locations on the projection surface to pixels of the output image. For example, each input image of the plurality of input images may be projected onto the projection surface to produce a rendered environment, and the output image may be rendered by determining how the rendered environment on the projection surface would appear if viewed from the perspective described by the view specification.

FIG. 5—Block-Specific Rendering Flowchart

FIG. 5 is a flowchart diagram illustrating a method for dividing the output image into a plurality of blocks of pixels to assist in rendering the output image, according to some embodiments. The method steps described in FIG. 5 may be performed in conjunction with the method steps described in reference to FIGS. 3 and/or 4, as part of a method to render an output image from a plurality of input images. In some embodiments, the described methods may be performed by a computer system comprising a processor that is coupled to a multi-camera system. The processor may be coupled to one or more non-transitory computer readable memory media, which may have stored thereon program instructions for performing the described methods. In some embodiments, and as described in greater detail in Section 5, the processor may be a parallel processing hardware system, which may be utilized to reduce latency of the computational steps. In various embodiments, some of the elements of the methods shown may be performed concurrently, in a different order than shown, may be substituted for by other method elements, or may be omitted. Additional method elements may also be performed as desired. As shown, the method may operate as follows.

At 502, in some embodiments, rendering the output image includes performing said rendering separately for each of a plurality of blocks of pixels of the output image. For example, the output image may be divided into a plurality of blocks of pixels of any desired size and/or shape, and rendering the output image may be performed on a block-by-block basis. In some embodiments, the input images may have been taken with a wide angle fish eye lens or another type of lens that introduces distortion. By separately rendering small blocks (e.g., 16×16 blocks or another size), the degree of distortion introduced in performing projective mapping from the input images to the output image may be reduced relative to rendering the entire output image as one large block. In some embodiments, the size of the blocks may be selected to balance between a threshold acceptable level of distortion and an amount of processing resources necessary to process a larger number of blocks while maintaining a desired level of throughput and latency. For example, smaller block sizes result in a larger number of blocks for the entire output image, which may thereby require a larger number of parallel processing resources to render the output image with a desired latency, and a desired balance between processing resources and distortion of the output image may be selected depending on the computational capabilities of the processor system and the use case (i.e., the desired throughput, resolution, and/or latency, among other possibilities) of the output image. For example, for embodiments where a sequence of output images are rendered to produce an output video at 30 frames per second in real time, a degree of parallel processing resources may be selected for a particular block size such that the latency of rendering the output image is less than $\frac{1}{30}^{th}$ of a second. In other words, in some embodiments, the size of each of the plurality of blocks of pixels may be selected to balance a degree of image distortion introduced by the projective mapping and a quantity of processing resources utilized to render the output image at an acceptable latency for a particular use case.

At 504, for each of the plurality of blocks of pixels of the output image, a mapping is determined between a plurality of pixels along the perimeter of the respective block of pixels and a plurality of corresponding pixels of each of one or more of the input images.

In some embodiments, the plurality of pixels along the perimeter of the respective block of pixels are four corner pixels of the respective block of pixels. For example, the block of pixels may be a 4×4, 16×16, or another size rectangular block of pixels, and the mapping between the plurality of pixels along the perimeter of the respective block of pixels and the plurality of corresponding pixels of each of one or more of the input images may be performed for the four corners of the square block of pixels of the output image. Alternatively, in other embodiments, other shapes of blocks of pixels may be used, and the perimeter pixels may be the corners of the respective shape. For example, the output image may be divided into tiled triangular blocks, and the perimeter pixels may be the three corners of each triangular block of pixels. Other tiled shapes such as pentagons, hexagons, etc., may also be used, as desired. The mapping may be performed based on the projection surface described above in reference to FIG. 4. For example, the projection surface may be used to determine a mapping between four corner pixels of a block of pixels of the output image and four corresponding pixels in one or more input images.

At 506, for each of the one or more input images, a projective mapping is performed of pixels located within a perimeter of the corresponding pixels of the input image to respective pixels in the output image. The projective mapping may be based at least in part on the mapping between the plurality of pixels along the perimeter of the respective block of pixels and the plurality of corresponding pixels of the one or more input images. For example, once the four corner pixels of a block of pixels of the output image are mapped to four corresponding pixels of one or more input pixels, mapping between pixels located within the four corners of the output image (e.g., these pixels located within the perimeter pixels may be called "interior pixels" of the block of pixels of the output image) and pixels of the one or more input images may be performed by linear extrapolation of the corner pixel mapping to the interior pixels of the block of pixels output image.

The mapping of the perimeter pixels of the output image to the one or more input images may be more computationally intensive than the projective mapping of the pixels of the interior pixels. Advantageously, the mapping of the perimeter pixels is only performed for a relatively small number of pixels (e.g., four in the specific example described here), while the much faster projective mapping of the interior pixels is performed for a larger number of pixels (e.g., 256−4=252 pixels for a 16×16 block of pixels), thus reducing the overall processing load of the rendering procedure.

Additional Description

The following numbered paragraphs provide additional detail and explanation regarding embodiments described herein. For ease of reference, the sections and subsections of the following paragraphs are numbered according to a tiered numbering system. Specifically, section headings are labelled with a single number (e.g., "2"), subsections are labeled with two numbers (e.g., 2.3), and subsubsections are labelled with three numbers (e.g., 2.3.1).

1. Summary

The following sections provide additional detail related to vehicular ADAS embodiments (Section 2); image processing algorithms (Section 3), including calibration and view generation functions (Subsection 3.1) and rendering functions (Subsection 3.2); software (Section 4), including parameter and configuration files (Subsection 4.1) and software components (Subsection 4.2); parallel processing hardware system design (Section 5); and chip designs (Section 6).

2. Vehicle ADAS Application

In some embodiments, a system including multiple cameras may be mounted on a vehicle to generate an Any World View around the vehicle. In some embodiments, four cameras with wide angle field of view (FOV) optics may be positioned on each side of the vehicle and networked into a computation platform. The computation platform may capture the images from the cameras and synthesize a single display image that is a combined view from a specified viewport (e.g., from a location around the vehicle such as above, looking down on the vehicle). A digital visual interface (DVI)-based or other type of display may present the composite view after the lens distortions has been corrected on the four images and the images have been stitched together. A final perspective transformation may be applied to specify the virtual view port and/or perspective to present in the display.

A static calibration processes may be used to generate the various spatial and intensity corrections needed to pre-process the individual camera images.

The operator may be able to control the selection of the view port using a tablet computer or other device with a simple user interface. The Any World View image may be displayed directly from a monitor connected (e.g., wired or wirelessly) to the computing platform.

3. Image Processing Algorithms

In some embodiments, an Any World View system includes four cameras with fish-eye lenses (~180 degrees FOV) to capture image samples around the car. In the horizontal plane they may be oriented every 90 degrees and each camera may have a 180 degree field of view, providing much image overlap between adjacent cameras. Along the vertical axis the cameras may be oriented at a 45 degree angle down to provide complete coverage of the ground surface around the car and a view up to the horizon in all directions.

The image processing algorithms may combine image samples from these multiple camera sources into a single output view representing a particular view perspective. The following sections describe the functional steps to render the output view in greater detail.

The image processing steps may be divided into two groups. The first group of steps are performed only once after the cameras are installed on the car. They may be utilized to calibrate the position and orientation of each camera with respect to a common world coordinate system using calibration targets with known positions. Then a block-wise description of each view may be generated based on the four cameras. This first group of functions is for calibration and view generation of the Any World View.

The second group of operations comprises a real time system to render the view perspective at video rate using the block-wise view description computed during calibration. Image samples are received from cameras, a demosaic function may be applied to restore full resolution color, and then warping may be performed to project the samples onto the focal plane of a virtual rectilinear camera that represents the perspective view. If part of the view perspective is filled with samples from more than one camera, the samples from the best two cameras may be blended. A photometric alignment algorithm may be also applied in real time to compensate for differences in exposure between cameras which may vary as the vehicle or other object moves through or experiences variable lighting conditions.

The general approach to applying functions in both categories is to use the basic principles of multiple-view geometry to achieve the desired functionality. The model may use an open source library such as OpenCV to implement many of the functions for discovering and applying projective transformations of images, in some embodiments.

Figure 6:
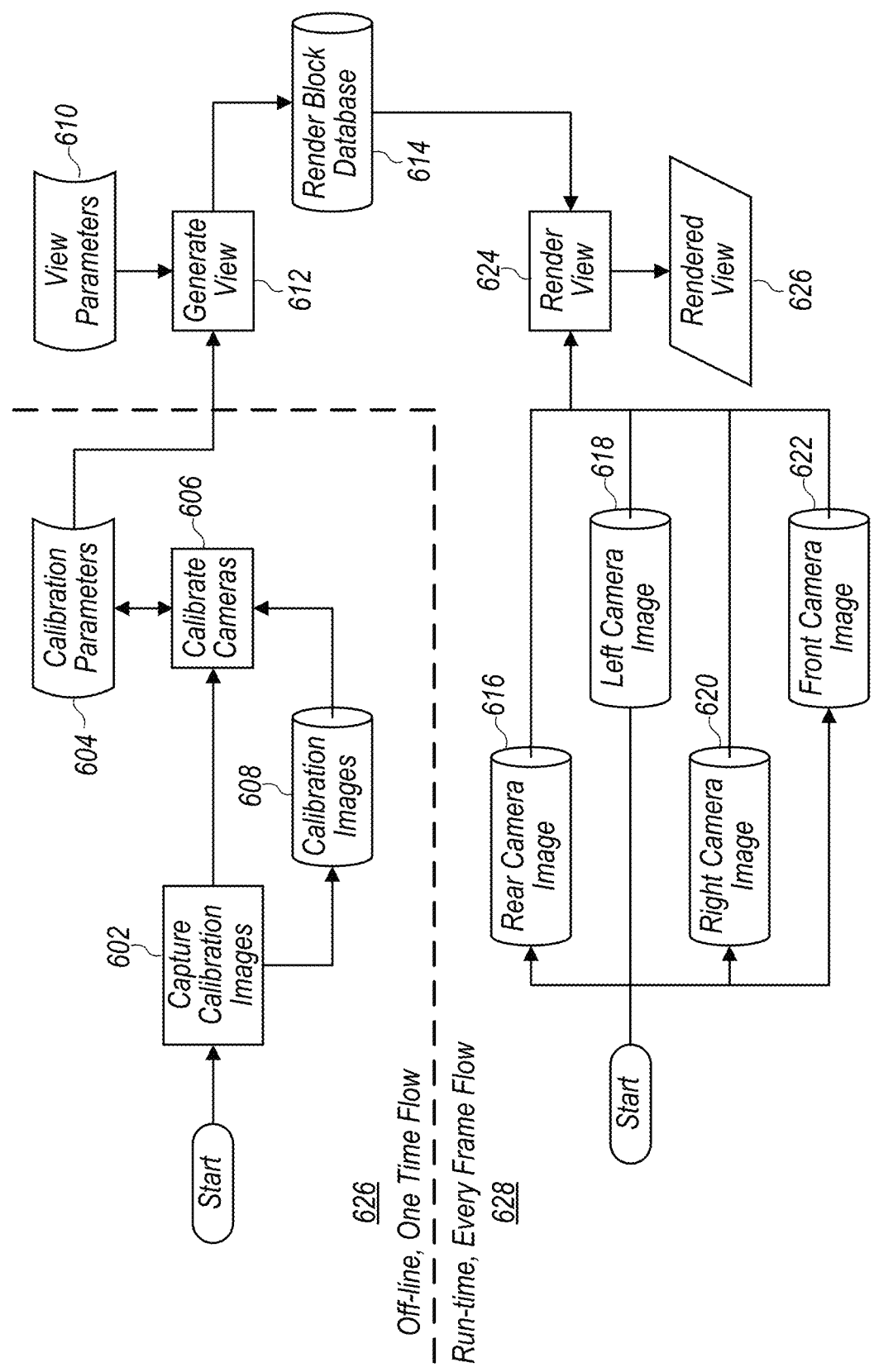
FIG. 6 is a schematic diagram illustrating a high-level data flow for calibration and rendering of an output image from a plurality of input images, according to some embodiments.

FIG. 6 illustrates a data flow diagram for the two groups of processing included in the model, according to some embodiments. The upper part of the diagram is the first group of steps that may be performed off-line, once for each calibration set and view specification. An array of rendering block parameters may be generated for each desired view specification and made available to the second group of operations that may be performed on each input set of images from the cameras.

3.1 Calibration and View Generation Functions

Calibration functions may be performed one time after installation of cameras on the car. View generation functions may be performed one time for each view specification, which may include a virtual camera position and orientation relative to the car. The output of these functions may be a set of parameters from which a defined view may be repeatedly generated to form a video output using image samples from one to four (or more) cameras. Calibration and view generation functions may be off-line processes that run on a standard computer.

3.1.1 Fish-Eye Distortion Correction

The concepts of projective transformations of images may be based on an underlying projective camera model such as the basic pinhole camera model. In this model, rays extend from a central point, through a rectilinear image plane to objects in the world. The position of the object in the world may be represented by the point where the ray intersects the image plane.

Figure 7:
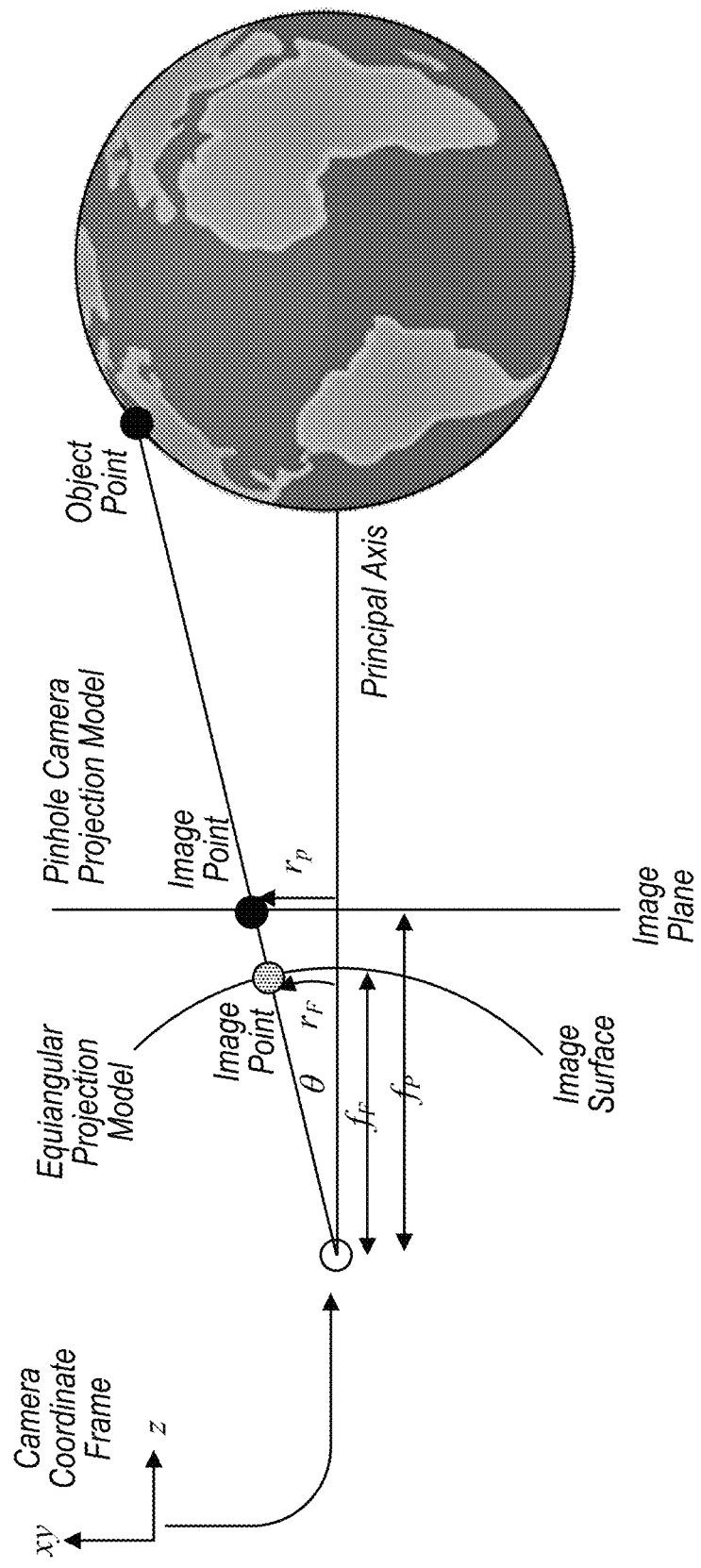
FIG. 7 is an illustration of equiangular and pinhole camera projection models, according to some embodiments.

The projective camera model provides a basis to understand the mapping between a fisheye lens image and a corresponding rectilinear representation by drawing the ray to pass through both the rectilinear image plane and the curved fisheye image surface, as shown in FIG. 7. (In the figures of this document, the image planes are drawn in one dimension, a line, representing the 2D Euclidean area of the image. The rays of the central projection camera are drawn in two dimensions representing the 3D space of homogeneous image coordinates and world objects.)

There are a number of different kinds of fisheye lens. The lenses used in some embodiments are assumed to follow an equiangular projection model, also referred to as equidistant model and represented by the following equation:

$$r_F = f_F \theta \quad (1)$$

where $r_F$ is the distance in the fish-eye image surface from the principal axis to an image point, $\theta$ is the angle between the ray and the principal axis, and $f_F$ is analogous to focal length.

Figure 8A:
FIG. 8 is an illustration of a raw equiangular (fisheye) lens image and a re-projected image using a pinhole camera model, according to some embodiments.
Figure 8B:

The corresponding equation for the pinhole camera model is:

$$r_p = f_p \tan \theta, \quad (2)$$

which provides the mapping through $\theta$ from the fisheye source image to its rectilinear representation. The model may use this mapping whenever the source image is involved in projective geometry transformations. An example of equiangular fisheye distortion correction is shown in FIG. 8. The top of FIG. 8 shows a source image with equiangular (fisheye) distortion (180° field of view), and the bottom shows a reprojection using a pinhole camera model (120° field of view). As used herein, "source image" may be understood to be synonymous with the input images described in reference to FIGS. 3-5.

3.1.2 Camera Calibration

The camera calibration function may find the camera position and orientation relative to a world coordinate system. The input to the process may be an image of a chessboard pattern as shown in FIG. 13. The following steps may be performed.

1. Identify the pixel locations of the chessboard corners in the undistorted (rectilinear) input image. This may be done using the cv::findChessboardCorners( ) function.

2. User provides an array that tells the corresponding chessboard corner locations in world coordinates.

3. Solve numerically for the rotation matrix $R_{source}$ and translation vector $T_{source}$ such that the world coordinates may be reprojected into the undistorted source image. This may be done using the cv::solvePnP( ) function.

4. Report mean reprojection error in pixels, a measure of the success of the camera calibration process.

The reprojection equations may be described as:

$$X_{source} = R_{source} X_{world} + T_{source} \quad (3)$$

$$x_{source} = K X_{source} \quad (4)$$

where:

$X_{world} = (x,y,z)_{world}^T$ is the chessboard corner position in the world coordinate frame, $X_{source}$ is the same point in the source camera coordinate frame, K is the intrinsic camera matrix that describes the focal length and principal point parameters of the source image plane, and $x_{source} = s(u, v, 1)^T$ is the source image pixel position.

Figure 9:
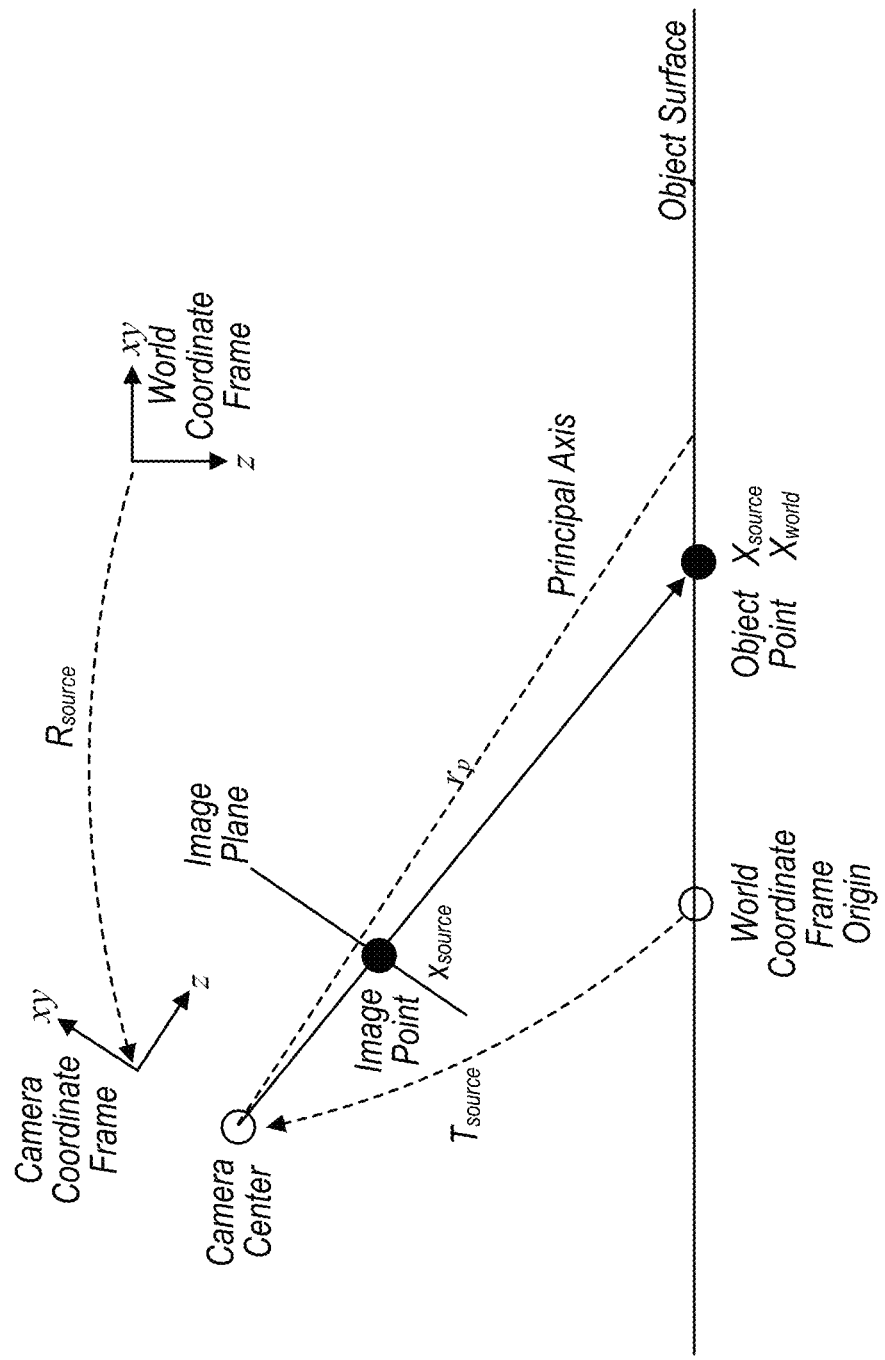
FIG. 9 is an illustration of a reprojection of an object point in a world coordinate frame to an image point, according to some embodiments.

The reprojection equations are shown graphically in FIG. 9. The rotation matrix $R_{source}$ rotates the world coordinate frame into the orientation of the camera coordinate frame, while the translation vector $T_{source}$ moves the world coordinate origin to the camera center which may be the optical center of the pinhole camera. $R_{source}$ and $T_{source}$ are sufficient to describe the camera's position and orientation in the world.

Note that the pixel position x and the intrinsic camera calibration matrix K may relate to the rectilinear representation of the source image. The fisheye lens mapping function may be then used to determine the actual pixel position in the fisheye source image that corresponds to the chessboard corner.

The camera calibration function provides the rotation matrix $R_{source}$ and translation vector $T_{source}$ which are the extrinsic calibration parameters of the camera. With these parameters it may be possible to project any point $X_{world} = (x,y,z)^T$ from the world coordinate frame into the source image. This may provide the basis to create a new image based on any virtual point of view, as described in greater detail below.

Once the camera is attached to the car these extrinsic calibration parameters may be fixed. The camera calibration process may be performed once to find the rotation matrix $R_{source}$ and translation vector $T_{source}$ for each camera. These parameters may be used to generate any number of views around the car using the same set of source cameras as long as the relative positions and orientations of the cameras do not change.

3.1.3 Projective Transformation

In some embodiments, a projective transformation is utilized between world coordinates and a calibration image in the reprojection equations, as described in section 3.1.2. The position of a world object may be known in the world coordinate frame which may have the z-axis oriented perpendicular to the ground surface. The projective transformation may include rotating the coordinate frame to the orientation of the camera coordinate frame, then adding a translation to move the origin to the camera center. The transformed 3D coordinate for the world object may be then interpreted as a homogeneous coordinate in the projective plane of the image to result in the pixel position of the world object.

Figure 10:
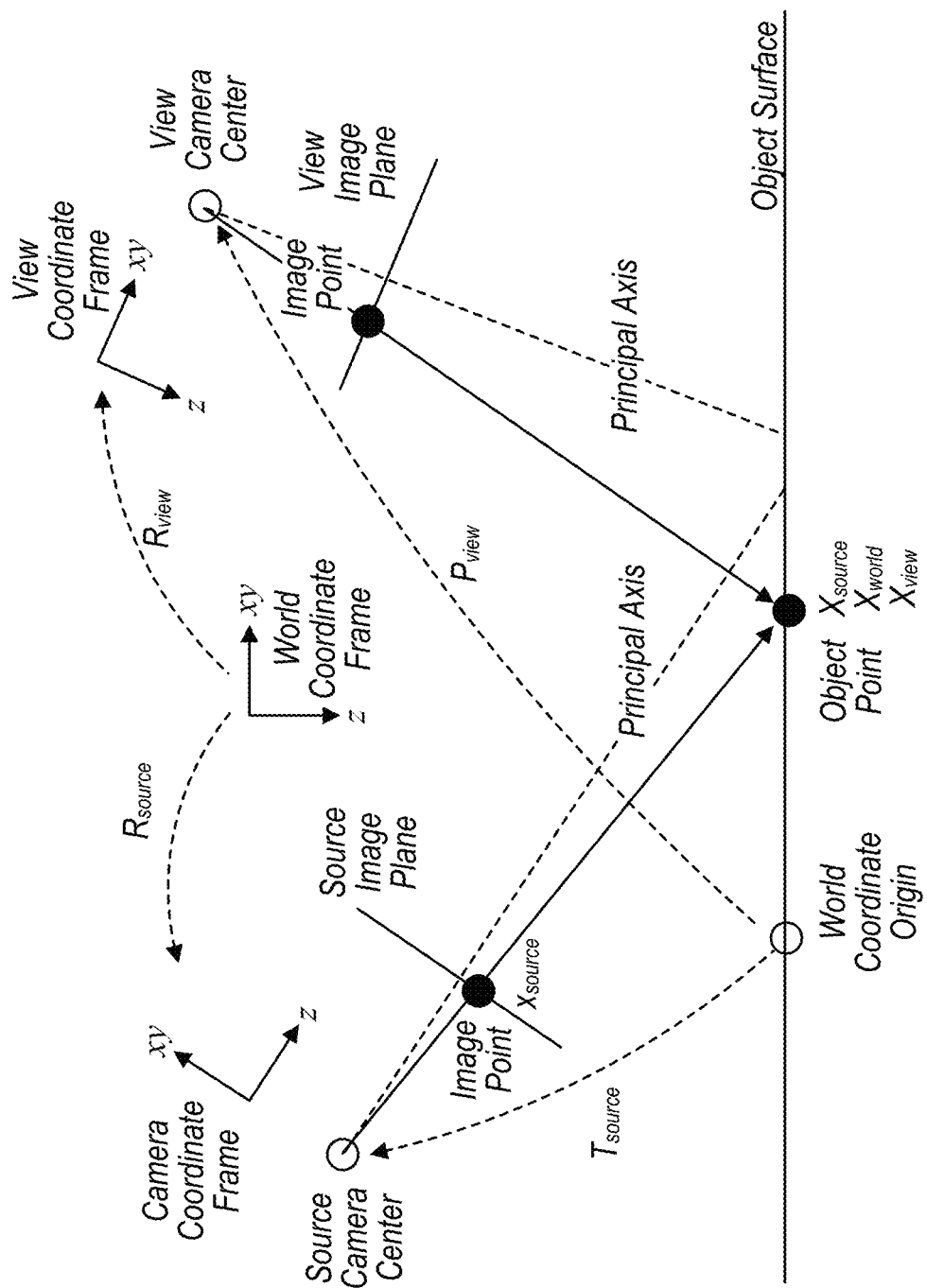
FIG. 10 is an illustration of a reprojection of a view image point to a source image, according to some embodiments.

Creating a new view for some virtual camera position using image samples from a source image may involve two projective transformations as shown in FIG. 10. First, each pixel position in the view image may be projected to the position of an object in the world coordinate frame. As used herein, the "view image" may be understood to be synonymous with the "output image" described in reference to FIGS. 3-5. Second, that world point may be re-projected back to a pixel position in the source image.

The mapping from view image to source image may be may be described by the following sequence of steps:

1. Let $X_{view} = (x,y,z)_{view}^T$ be the homogeneous representation for some pixel position in the view image coordinate frame. The particular point value may be chosen such that z is the actual depth of the world object that provides the image at that pixel.

2. Rotate axes from the view coordinate frame to the world coordinate frame.

3. Shift the origin from the view camera center to the world origin by adding $P_{view}$ (the view camera position in the world coordinate frame):

$$X_{world} = R_{view}^{-1} X_{view} + P_{view} \quad (5)$$

4. Rotate axes from the world coordinate frame to the image coordinate frame.

5. Shift the origin from the world origin to the image camera center:

$$X_{source} = R_{source} X_{world} + T_{source} \quad (6)$$

Combining equations shows where to get sample values for a pixel in the view image from the source image:

$$X_{source} = R_{source} R_{view}^{-1} X_{view} + R_{source} P_{view} + T_{source} \quad (7)$$

In projective geometry, $X_{view}$ represents a ray that extends from the camera center and impinges on a world object at $X_{view}$. The image color at the pixel position where this ray passes through the image plane is that of the world object at $X_{view}$. The depth of the object may be defined as the z-component of $X_{view}$. It may be desirable that $X_{view}$ be scaled to world coordinate units from the subsequent steps where $T_{source}$ and $P_{view}$ are added since these values are in world coordinate units. Note that the rotation matrices $R_{source}$ and $R_{view}^{-1}$ are orthogonal matrices. They are unitless and do not change the length of vectors transformed by them.

3.1.4 Surface Model for World Objects

In some embodiments, it may be nontrivial to determine the depth of an object from an arbitrary view camera center. A three-dimensional model of the objects in the world may be utilized to obtain the projection surface, which may not be practically or easily obtained from the source image(s).

The view generation algorithm may utilize a hybrid surface model with two intersecting surfaces. World objects may be assumed to be on this surface. The function for computing depth may involve computing $X_{view}$ as the point of intersection between the ray that represents the image pixel with the surface model.

As a math equation starting from a pixel position, we may first represent this position in a homogeneous representation, $$x_{view} = s \begin{bmatrix} u \\ v \\ 1 \end{bmatrix}_{view}, \quad (8)$$

and then apply the inverse intrinsic camera matrix K:

$$X_{view} = K^{-1} x_{view} = sK^{-1} \begin{bmatrix} u \\ v \\ 1 \end{bmatrix}_{view} \quad (9)$$

The scaling factor s may be found such that the z-component of $X_{view}$ is the depth of the object from the view camera so that $X_{view}$ is properly scaled for subsequent operations. In fact, the intrinsic camera matrix K for the pinhole camera model may be such that s equals the depth of the object from the view camera.

For embodiments where the world around the car is assumed to be a ground plane at z=0, the computation of depth is shown in 11. In these embodiments, the view camera specification includes a camera position $P_{view}$ at some height $P_{view}|_z$ above the ground and an altitude $\theta+\phi$, where $\theta$ is the angle between the view principal axis and the +z axis and $\phi$ is the angle between the view principal axis and an image ray.

The length of the ray to $X_{view}$ is $$\|X_{view}\| = \frac{P_{view}|_z}{\cos(\theta + \phi)} \quad (10)$$

and depth is the component of this length along the view camera principle axis $$\text{depth} = \|X_{view}\| \cos \phi \quad (11)$$

The ground plane surface model works well for views around the car from above, but it may not be desirable for views that include object points above the horizon. Vertical objects in the foreground may also be distorted in a rendered view that assumes a horizontal ground plane surface model. As the altitude of a view rises to approach horizontal, more objects in the view may represent vertical surfaces such as buildings, vegetation, other vehicles, and/or people, among other possibilities.

Figure 12:
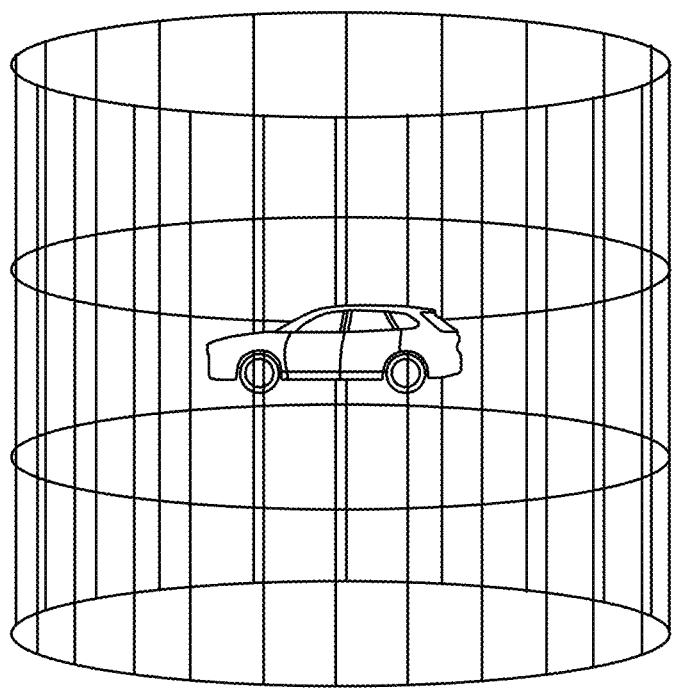
FIG. 12 is an illustration of a cylindrical projection surface model around a car, according to some embodiments.

In some embodiments, a cylindrical projection surface model is introduced to provide more realistic renderings for views with a non-vertical principle axis. This model assumes that object points are on a vertical surface that wraps the car at some distance as shown in FIG. 12. The major axis of the cylinder may run through the center of the car in the z-direction.

The Any World View system may make an assumption on how far the cylindrical surface is from the car, but in many cases the rendered view may not be strongly dependent on how closely this distance matches the actual distance to world objects. In some embodiments, the size of the cylinder may be linked to the speed that the car is moving. A stationary car may use a smaller distance to render adjacent obstructions more accurately, while rendered views in a moving car may be more realistic assuming a larger cylinder dimension.

Some embodiment operate by finding the intersection of a ray extending in the (x,y) plane from the virtual camera center toward the camera's principle axis. The ray length may be then increased to account for any vertical component, resulting in an assumed object point $X_{view}$ on the cylinder surface.

The shape of the cylinder boundary in the (x,y) plane may be elliptical, with the major axis oriented along the length of the car and minor axis along the width. As part of the view specification, the user may specify a single surface depth value that represents the distance from the edge of the car to the cylinder surface.

The view generation function may employ both ground plane and cylindrical surface models in a hybrid implementation. The depth for a given ray from the view camera center may be computed using both models and the lesser value may be chosen. If both models provide a nearly equal value for depth, a radius function may compute a diminished value. The result may be an assumed world object surface in the shape of a bowl with a flat bottom, vertical sides surrounding the car, and a smooth radiused interface between them.

If the assumed cylinder dimension is shorter than the distance to actual world objects, the hybrid model may cause an interesting effect in the rendered image. For example, objects near the car may be rendered with the expected perspective, while distant points may exhibit a fisheye lens effect. The radius function may provide that the transition between these areas in the rendered image is smooth.

3.1.5 Piecewise Linear Transformation from Source Image to View Image

The previous sections outline the projective transformation that maps source image (i.e., input image) pixels into a view image (i.e., output image) for an arbitrary point of view that may be summarized as a map function as follows:

$$X_{source} = R_{map} X_{view} T_{map} \quad (12)$$

$$x = K X_{source} \quad (13)$$

which may result in a pixel position $x=s(u, v, 1)^T$ in the source image according to the pinhole camera model. As a final step, the non-linear mapping described in section 3.1.1 may be applied to obtain the pixel position in the original fisheye source image.

While it may be possible to evaluate the map function for every pixel of the view image, this may result in a large amount of mapping information for every view. To address this and reduce rendering time and computational load, in some embodiments, the output view image may be divided into a grid of pixel blocks (e.g., 16×16 pixel blocks or another size or shape of pixel blocks), and the map function may be evaluated only for the corners of each block. FIG. 13 shows the set of blocks in two fisheye source images that correspond to a 16×16 grid in a view image. As illustrated, white blocks are mapped to the view image, grey blocks are blended with blocks from another source image and mapped to the view image, and black blocks are not used in the view image because a better source image may be used instead. A red trace indicates the centerline of the blend region between two source images. The hybrid surface model may be visible with points close to the car assumed to be on the ground and more distant points assumed to be on the surface of a cylinder surrounding the car.

The coefficients for an affine transform may be computed for each output block to warp the source image samples into the view image. While a general projective transform may be implemented as a 3×3 matrix multiply operation, the affine transform may be a specialized case with fewer degrees of freedom; the last row of the transform matrix may not need to be used. Accordingly, the mapping for pixels in each output block may be reduced to:

$$\begin{bmatrix} u \\ v \end{bmatrix}_{source} = \begin{bmatrix} a_{11} & a_{12} & a_{13} \\ a_{21} & a_{22} & a_{23} \end{bmatrix} \begin{bmatrix} u \\ v \\ 1 \end{bmatrix}_{view} \quad (14)$$

Just six values are utilized to describe the affine transform for each output block, and the source image positions of the four corners of each view image block provide sufficient information to solve for the values $a_{11} \ldots a_{23}$.

The functions that map view image positions to the source image may be non-linear when they include correction for the fisheye lens distortion. While the affine transform may be linear and may be more restrictive than a general projective transform, it may be sufficient to render the output view because it may be applied separately for each 16×16 output block. Said another way, the degree of lens distortion may increase with the size of the pixel blocks into which the output image is divided. A 16×16 pixel block size may present a desirable balance between introducing a sufficiently small degree of distortion and processing resources, since smaller pixel block sizes translate into a larger computational load. This forms a piecewise approximation to the underlying non-linear mapping. Some embodiments may balance computations for rendering and storage requirements for block mapping information in the real time rendering system.

3.1.6 Blend Ratio Calculation

The fisheye lenses on the source cameras may provide a field of view of 180°. In some embodiments, there are four cameras oriented towards the four cardinal directions so that there may be significant overlap between the images captured by adjacent cameras.

In some embodiments, a blend ratio calculation may be used for determining which source cameras contribute to each block in the view image. For a given block location in the view image, a distance metric may be computed based on the distance from the corresponding source image block and the fisheye image center. A view image block may be identified as being on the centerline between two sources if the distance metrics computed for the two sources are more equal than those of the neighboring blocks. This criterion may have the effect of favoring the source samples closest to each image center which have the highest resolution.

In some embodiments, each source image may include an exclusion boundary to disqualify source samples that should not appear in the rendered view image. If a source image block is close to the exclusion boundary, its distance metric may be adjusted to move the centerline away from the exclusion boundary.

After the centerline blocks in the view image have been identified, neighboring blocks may be assigned a blend ratio value based on their distance from the centerline. When a view block is composed of contributing blocks from two source images, the source block closest to its own image center may be assigned a blend ratio between 0.5 and 1.0, while the other source block may be assigned the smaller complementary value (e.g., the other source block may be assigned a weight value of one minus the value assigned to the closer block).

The blend ratio calculation may be the last step of the camera calibration and view generation functions. In some embodiments, the ratios for overlapping view image blocks may be included in the set of parameters that define each view for the rendering functions.

3.2 Rendering Functions

In some embodiments, the rendering functions of the Any World View demonstration system may be performed repeatedly to produce a video output for a given view specification. In some embodiments, they may be implemented through a parallel processing system such as a HyperX™ application, which may run in real time on a visual integrated display system (VIDS) platform.

A model implementation of the rendering functions may also be utilized, in some embodiments. A model implementation may run on a standard computer and may operate on single frames to provide a platform to evaluate the Any World View algorithms. The functions of the model are closely related to the real-time HyperX™ design so the model may also provide test vectors to support development of the HyperX™ application.

The inputs to the rendering functions may include a set of parameters for each 16×16 block of the output image for a given point of view. Source images from the four cameras may also serve as inputs to the rendering functions.

3.2.1 Demosaic

In some embodiments, color images from single-CCD digital cameras may be captured through a Bayer filter, which may be a color filter array that forms a mosaic of red, green, and blue samples. A demosaic function may convert the one sample value per pixel into three values per pixel representing complete red, green, and blue color planes.

Figure 11:
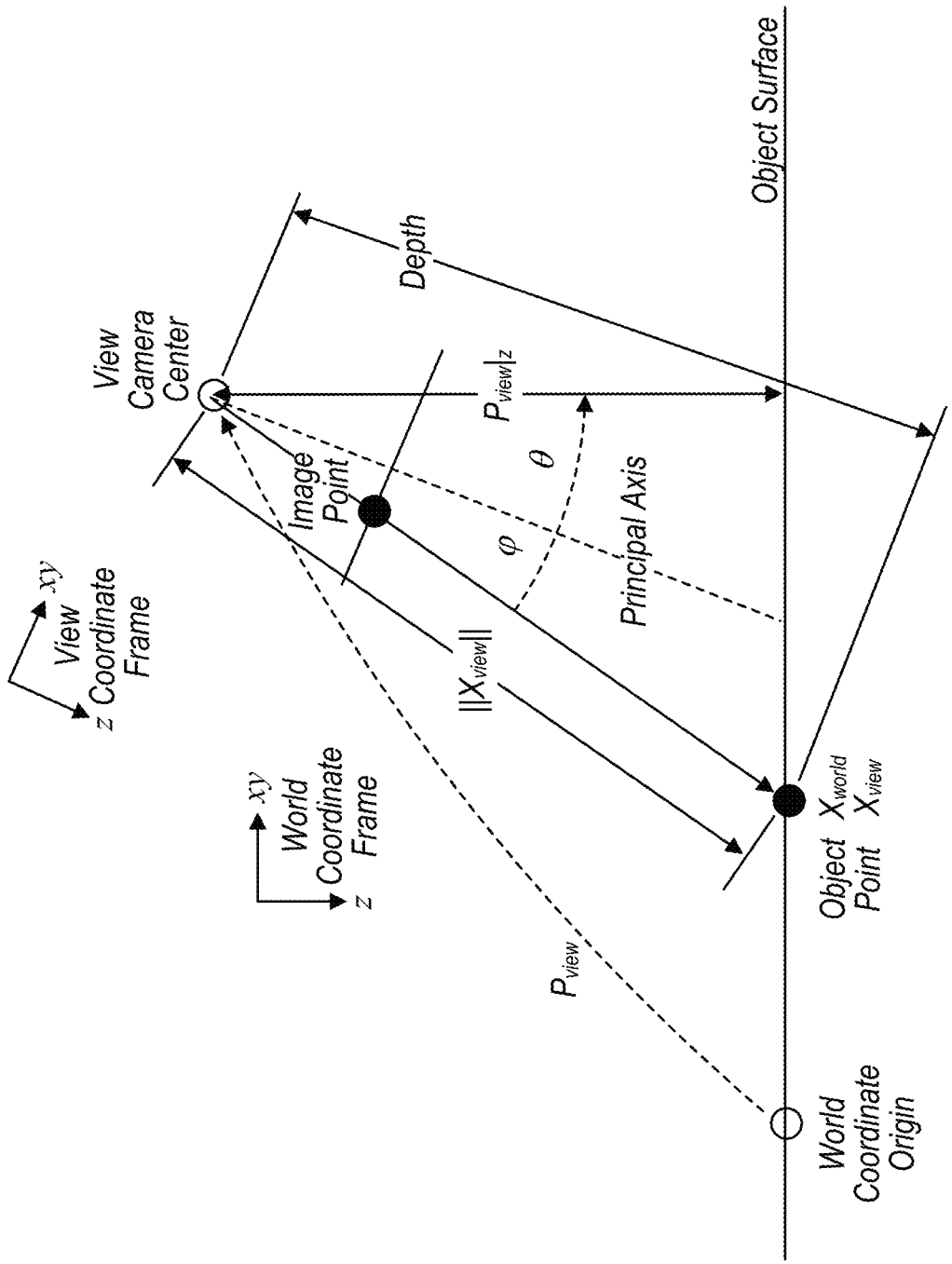
FIG. 11 is an illustration of the depth of an object point on a ground plane, according to some embodiments.

In the real time Any World View HyperX™ system, the demosaic function may be applied to the source image block that corresponds to each 16×16 pixel block in the view image. The source image block may have a rectangular shape with a size that may be smaller or larger than the view image block that results after the affine transform is applied. The rectangular input block may be called a "bounding box" because it completely contains the source image samples used for each view image block. Referring to the grid of blocks shown in FIG. 11, the bounding box may be the orthogonal rectangle that completely contains each source image block.

Different demosaic methods may be chosen, in various embodiments. A conventional demosaic algorithm may be applied if the bounding box is 1000 pixels or smaller. In some embodiments two missing color samples may be interpolated at each pixel location.

For bounding boxes between 1000 and 4000 words, a down-sampling demosaic algorithm may be used. Each pixel sample may be computed as a weighted average of neighboring samples of the corresponding color to accomplish filtering, down-sampling, and interpolation in filter operation. The output bounding box may be downscaled by a factor of two vertically and horizontally relative to the input bounding box. The affine transform coefficients may be pre-compensated to take the downscaled bounding box into account.

The down-sampling demosaic method extends the range of input block sizes that may be processed by the real-time Any World View. The output of the demosaic operation may be a block of source image samples sufficiently large to render the corresponding 16×16 view image block.

3.2.2 Warp and Block Average

In some embodiments, a warp function is employed to apply an affine transform. The input may be the source image block with 3 samples per pixel from the demosaic function and the output may be a 16×16 view image block.

For each block pixel position, the corresponding pixel position within the bounding box may be computed as:

$$\begin{bmatrix} u \\ v \end{bmatrix}_{source} = \begin{bmatrix} a_{11} & a_{12} & a_{13} \\ a_{21} & a_{22} & a_{23} \end{bmatrix} \begin{bmatrix} u \\ v \\ 1 \end{bmatrix}_{view}, \quad (15)$$

where the coefficients $a_{11} \ldots a_{23}$ may be part of the set of parameters computed by the view generation functions. The position $(u, v)_{source}^T$ may be a real valued position) not constrained to integer values of u and v, so that the red, green, and blue sample values for that position may be interpolated. Bilinear interpolation may be used.

In addition to warping the input block to the view image block, the average red, green, and blue samples values may be computed across the view image block. Block average values may be used by the photometric alignment function described in subsubsection 3.2.3, below.

3.2.3 Photometric Alignment

The photometric alignment system may be utilized to compensate for different cameras independently and automatically adjusting exposure and aperture settings in response to different lighting conditions facing the vehicle from different directions. When two source images provide overlapping blocks to a view image, the resulting blended region may appear more natural if their photometric characteristics have been adjusted to match one other.

Figure 13A:
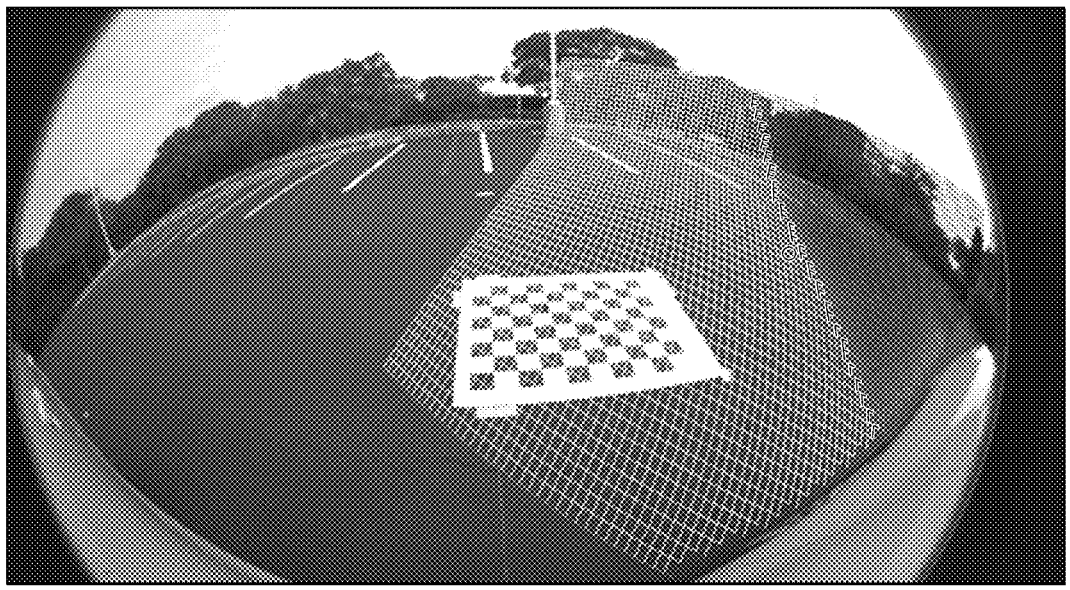
FIG. 13 illustrates a grid of view image blocks mapped to two fisheye source images, according to some embodiments.
Figure 13B:
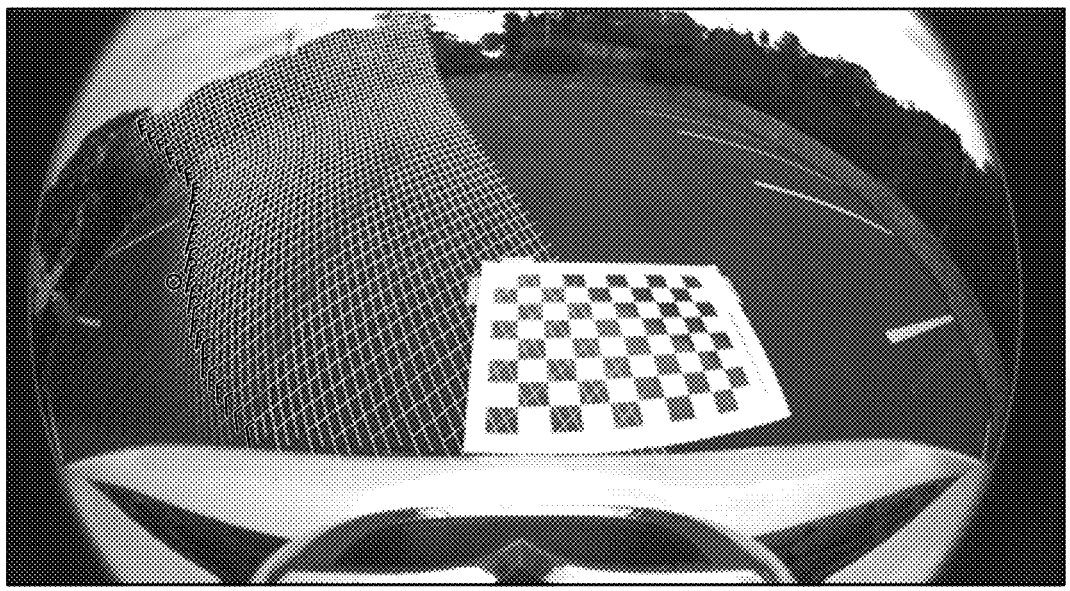

FIGS. 13A-13B demonstrate overlap from multiple input images. As illustrated, source image blocks with a mid-gray boundary are in the overlapping blend region of the view image. Photometric alignment may help to equalize the colors of the source images to make the seam disappear in the rendered view image.

In some embodiments, the block-average sample values may be compared in the overlapping region between two source images. A global gain correction value may be computed for each source image to optimally equalize sample values in co-located blocks. Separate gain values may be computed for each red, green, and blue color plane. Up to 12 gain values may be computed for the four source images using block-average values collected over a whole view image.

The gain values that were computed for the previous set of source images may be applied to all of the image samples in the current view image. Each sample value may be simply multiplied by the gain value for the corresponding color and source image.

3.2.4 Blend

In some embodiments, a final step in the rendering process is utilized to blend overlapping view image blocks from different camera sources. Most view image blocks only include samples from a single source image, and the blend function may be a passthrough function for these blocks. For the remaining view image blocks, the red, green, and blue values may be combined pixel-by-pixel as the weighted average of two co-located rendered blocks from two image sources.

The weight values used for blend were computed in the view generation process as described in section 3.1.6. The two weight values that contribute to a single view image block may sum to 1.

The output of the blend function may be a set of 16×16 view image blocks for those block positions for which a source image sample exists from the set of source cameras. Some block positions in the view image may not map to any source camera and these blocks may not be rendered.

The output blocks may be composited into a frame image in external memory. A separate task may be responsible for reading the view image from the external memory line by line for presentation through the DVI output of the VIDS platform.

4. Software

In some embodiments, the Any World View system may be provided in the form of four software programs that work together to render single images for a given point of view based on image samples from one to four source images. Each program may be built and run independently, but they may share a common set of configuration and parameter files that enable them to work together.

4.1 Parameter and Configuration Files

The programs in the model software application suite may utilize many parameters to describe information about the source cameras, the desired views, and each 16×16 block or tile in the rendered view image. All of the programs may take in these parameters from parameter files; command-line options are generally not used, in some embodiments.

4.1.1 BlockInfo

The block level parameters are called BlockInfo and are the bridge between the view generation operations described in section 3.1 and the rendering operations described in section 3.2. These parameters may be contained in a JavaScript™ Object Notification (JSON) format file. JSON may be a lightweight data exchange format borrowed from common web application programming practice that may be readable by humans but may also be easily ingested by software.

An example BlockInfo structure is shown in FIG. 14, and the parameters are explained below in Table 1.

TABLE 1

BlockInfo parameters

| Parameter | Description |
| --- | --- |
| bbTL, bbBR | Top left and bottom right corners of bounding box for source samples of this block |
| destTL, destBR | Top left and bottom right corners of this block in the view image |
| isInSource | Flag indicates whether the bounding box is completely contained within the source image |

TABLE 1-continued

BlockInfo parameters

| Parameter | Description |
| --- | --- |
| alignment | Bayer filter alignment of the bounding box; used by demosiac function |
| cameraId | Source camera identification |
| cameraIdBlend | If this is a blended block in the view image, tells which camera provides the other source block |
| blendRatio | For blended blocks, the fraction provided from this source |
| mapInfo | The six affine transformation parameters; see section 3.2.2 |

The BlockInfo structure may be used in a file that contains all of the block parameter sets describing every block in the view image for a given view specification.

The Demosaic model and the real time Any World View HyperX™ system may use BlockInfo parameters formatted as a C or C++ construct as shown in FIG. 15. This may be a binary format that may be not human-readable but may be efficient to handle in software.

4.1.2 CamData

In some embodiments, a CamData configuration file may be utilized in JSON format. It may be used by the view generation functions and may be not needed for rendering. The camera_calibrate program may use the CamData file as both input and output, while the view_generate program may use it as input. An example CamData file is shown in FIG. 16 and includes three sections, as shown in Table 2. As illustrated, the first section contains the minimum set of parameters that are needed for camera calibration. The second section adds parameters needed for view generation that are the result of the camera calibration process. The third section may be information just for human readers and may be not used by any program. Note that the function used by software to read a CamData file may read as much of the file that exists, so any unknown parameters in the second and third sections may simply be omitted from the file.

TABLE 2

Parameters of the CamData file

| Parameter | Description |
| --- | --- |
| Section 1: Input parameters filled in by user | |
| calibrationImage | Filename of calibration image containing a chessboard calibration target |
| targetPosition | World coordinates of upper left corner of chessboard target (note: z = 0) |
| chessboardSize | Number of corners in chessboard |
| squareSize | Size of each chessboard square in world coordinate units |
| camId | Identification number for camera |
| camOrientation | Which camera is it: FRONT, LEFT, REAR, RIGHT |
| boundaryCenter | Center of circular exclusion boundary in pixel units relating to calibration image |
| boundaryRadius | Radius of exclusion boundary in pixel units; use 0 to disable exclusion boundary; see explanation of exclusion boundary in section 3.1.6 |
| Section 2: Solved parameters generated by camera_calibrate application | |
| rvec | Rotation vector, a 3-element vector that represents the 3x3 rotation matrix |
| tvec | Translation vector, see section 3.1.2 |

TABLE 2-continued

Parameters of the CamData file

| Parameter | Description |
| --- | --- |
| Section 3: Informational parameters not used by any model software application | |
| camPosition | Computed position of this camera |

Figure 17:
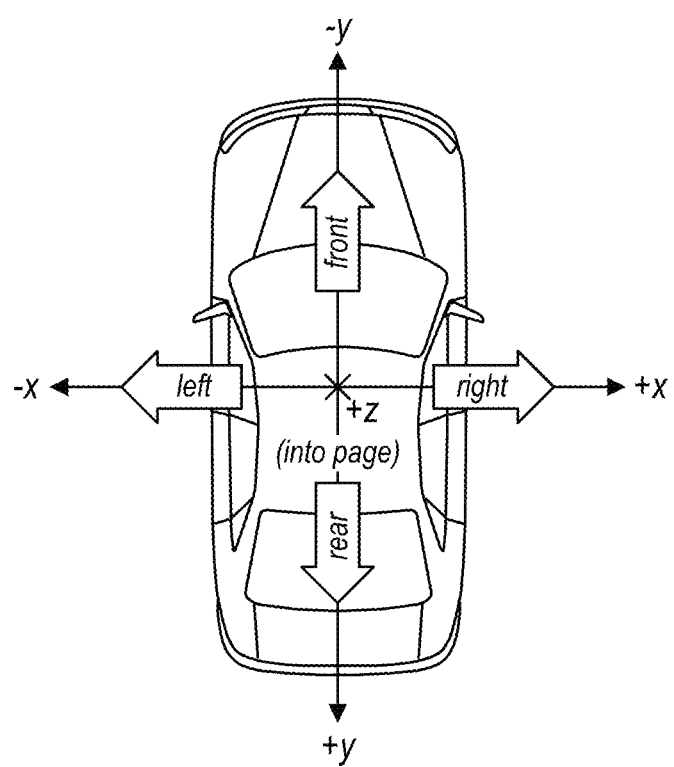
FIG. 17 is a top-down illustration of nominal orientation of a world coordinate frame, according to some embodiments.

In some embodiments, the targetPosition parameter may be based on the world coordinate frame which is illustrated in FIG. 17. The center of the car may not necessarily be at the origin of the x-y axes, but the camera calibration operations may assume the axis directions are as shown. Specifically, in some embodiments the −y axis direction may extend forward from the front of the car.

4.1.3 ViewSpec

The ViewSpec describes the desired point of view for a virtual camera. "Generating" this view may involve producing the file of BlockInfo structures used to render the view specified in the ViewSpec. In some embodiments, the ViewSpec file may be used only in the view generation process and it may be not needed by the real-time rendering system.

Figures 18, 19:
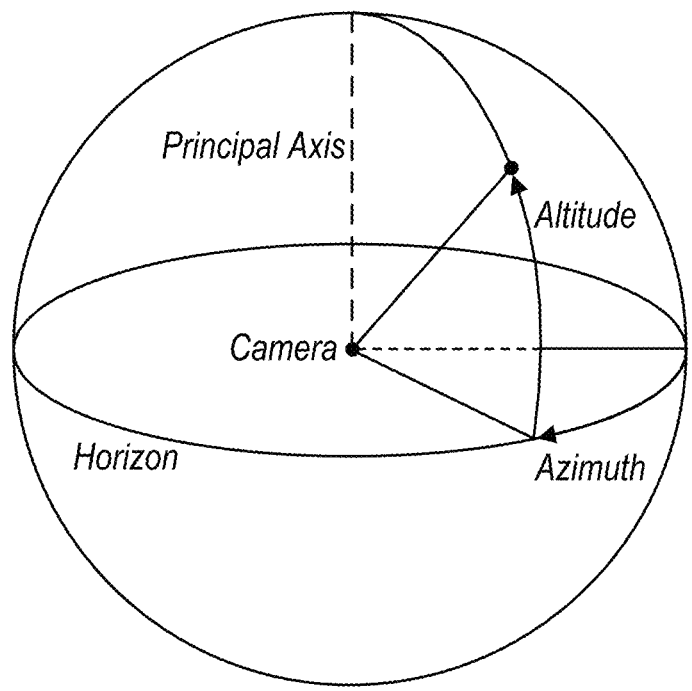
FIG. 18 is pseudocode illustrating a code structure for ViewSpec in a JSON file format, according to some embodiments.
FIG. 19 is an illustration of the azimuth and altitude angles relative to a camera on a car, according to some embodiments.

An example ViewSpec file is shown in FIG. 18 and includes the parameters described in Table 1. The angle parameters that describe the view orientation reference the forward axis of the car, as shown in FIG. 19.

TABLE 3

Parameters of the ViewSpec file

| Parameter | Description |
| --- | --- |
| altitude | Vertical angle of the view principle axis with respect to the horizon, in degrees |
| azimuth | Horizontal angle of the view principle axis, see FIG. 18 |
| cameraPosition | View camera center (e.g., in (x, y, z) coordinates) in the world coordinate frame |
| fov | Field of view assuming a pinhole camera model |
| width, height | Dimensions of the view image |
| surfaceDepth | Distance of assumes cylindrical object surface from the car in world units, see section 3.1.4.2 |
| blendWidth | Width of blended seam between source images in rendered view, in pixels |

4.2 Software Components

Model software for the Any World View system may include two libraries and a number of command-line applications. The libraries may implement many of the functions of the view generation and rendering algorithms. The applications may call the functions of the libraries and add code to handle the high level sequence of operations and file I/O.

4.2.1 OpenCV™ Library

OpenCV™ is an open source library functions to support computer vision applications. It is available in packaged form for all standard platforms and provides a set of core primitive data types and functions. For example, all of the operations involving projective geometry are expressed in C++ as simple math operations, even though they represent linear algebra equations involving vectors and matrices. Some functions, such as the singular value decomposition (SVD) algorithm used to find the affine transform for each view block, are quite complex and the use of OpenCV™ may be a benefit for efficient implementation of the model. In some embodiments, the Any World View model uses the OpenCV™'s C++ API, version 2.4.

4.2.2 ArthroCV Library

In some embodiments, the ArthroCV library contains many of the functions of the model algorithms. It presents a C++ application programming interface (API) for applications to access common functions that are more specific to the Any World View applications than the more primitive functions from OpenCV™. For example, the mapping of source image samples between the equiangular (fisheye) camera model and the pinhole camera model (section 3.1.1) may be a C++ class that may be part of the ArthroCV™ API.

The ArthroCV™ library may be provided as a single shared object library, arthrocv.dll for Windows™ or libarthrocv.so for Linux™

4.2.3 Demosaic

In some embodiments, the demosaic program may be a standalone program to convert images captured by single-CCD cameras. The input to the function may be a raw binary image with a Bayer mosaic of color samples. As one example, if the raw binary image contains 10 bits per pixel, the output may be a 32 bit per pixel file with 10 bit red, green, and blue samples for every pixel position.

In some embodiments, to convert raw image files, the demosaic program may be invoked with:

demosaic-image blockinfo_image_alignment.bin bayer-InputFile.raw outfile.raw where "blockinfo_image_alignment.bin" contains a single binary BlockInfo parameter set describing the source image including the Bayer pattern alignment.

A shell script may be provided that wraps the demosaic program with additional open source utilities to convert to and from other standard image formats such as portable gray map (.pgm) and portable graphics format (.png).

4.2.4 Camera Calibrate

The camera calibration function is described above in section 3.1.2, according to some embodiments. The result of camera calibration may be a rotation matrix and translation vector that tell the camera's position and orientation in the world coordinate frame.

Camera calibration may be performed once for each camera after it is installed on the car. An image may be captured by the camera that contains a chessboard calibration target. The parameters of the camera and target may be specified in the Section 1 of the CamData configuration file, as described in section 4.1.2 and Table 2.

Figure 20:
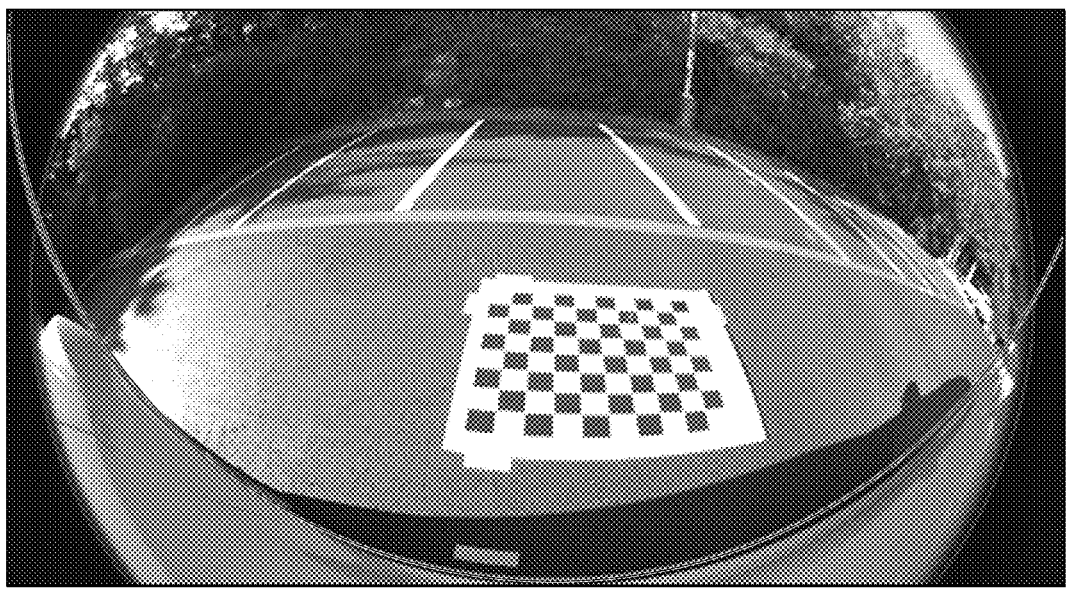
FIG. 20 illustrates a first verification image from a camera calibration process, according to some embodiments.

Subsequently, camera calibration may be invoked with:
camera_calibrate cam0.json The program may rewrite the camera configuration file with updated parameters in section 2 and section 3, according to some embodiments. It may also display two images to verify correct operation, in some embodiments. An example of the first image is shown in FIG. 20, and may be the original source image with identification of the circular boundary of the fisheye lens field of view. The software may automatically discover the center and radius of the circular image which may be used to create an accurate mapping between the equiangular (fisheye) camera model and the ideal pinhole camera model representations of the image data. The first verification image may also show the exclusion boundary that was specified in the CamData configuration file.

Figure 21:
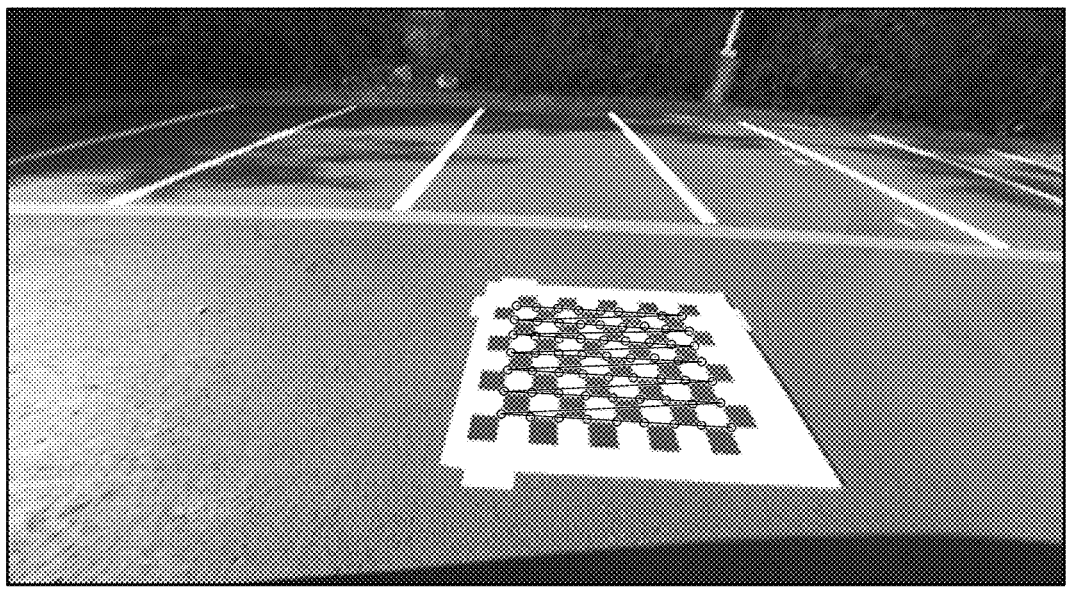
FIG. 21 illustrates a second verification image from a camera calibration process, according to some embodiments.

An example of the second verification image is illustrated in FIG. 21, and shows the calibration target after the fisheye lens distortion has been corrected. As illustrated, the corners of the chessboard image are automatically detected in the image. These corners are used by the calibration program to solve for the cameras position and orientation.

The camera_calibrate program may report a reprojection error which is the average error of the chessboard corner locations in the world coordinate frame reprojected back to the source image. The units of reprojection error may be pixels in the pinhole camera representation of the source image. A reprojection error of around 1 pixel or smaller may be desirable, in some embodiments.

Multiple cameras may be used to form blended view images for an arbitrary view. The view generation algorithm may depend on the cameras maintaining a fixed relative position and orientation with each other after calibration. Accordingly, it may be desirable for the calibration images for all cameras to be captured while the car is parked in one location on the ground.

4.2.5 View Generate

In some embodiments, a single program encompasses all of the view generation operations described in sections 3.1.3-3.1.6. The input may be a ViewSpec configuration file (e.g., see 4.1.3) that provides the virtual camera's position, orientation, size, and field of view. The output may be a file containing a BlockInfo parameter set for every 16×16 tile in the rendered image. This file may be the input to the real-time view render system.

The BlockInfo parameter sets may reference source image data from as many cameras as are provided on the command line, e.g., up to four. For example, to create a file of BlockInfo parameters for a given view, the following command may be used:

view_generate top_down_view.json cam1_front.json cam2_rear.json cam3_left.json cam4_right.json where view0.json is a ViewSpec configuration file and the other files on the command line are CamData configuration files. Any number of CamData configuration files may be specified (up to four in this embodiment) and they may be in any order on the command line.

In some embodiments, when view_generate runs it shows the source image corresponding to each CamData configuration file with an overlay of the blocks that are used in the output view image. FIGS. 13A-B show an example of these annotated source images. As illustrated, light colored blocks are mapped to the view image, grey blocks are blended with blocks from another source image and mapped to the view image, and the faded black blocks are not used in the view image because a better source image may be used instead. A series of marks indicates the blend region between the two source images of FIGS. 13A and 13B.

4.2.6 View Render

In some embodiments, a view render program is utilized as a model implementation of the whole rendering process described in section 3.2.

The BlockInfo parameter file produced by view_generate may be a complete block-by-block description of how to render a given view from multiple camera sources. The only additional data utilized on the command line may be the filenames of the source images themselves along with their cameraId value.

An example command line is:
view_render blockinfo.json 1 front_c.png 2 rear_c.png 3 left_c.png 4 right_c.png where the first argument may be the BlockInfo parameter file produced by view_generate. The next arguments are pairs of {cameraId, sourceImage} for all of the cameras used in that generated view.

The image filenames may not need to be the same as the files provided for calibration, as this functional model may be for a system where up to four source images are provided by live capture from cameras running at video rate. However, it may be desirable for each image file to be associated with the same cameraId as the calibration image that was captured by the same camera.

Figure 22:
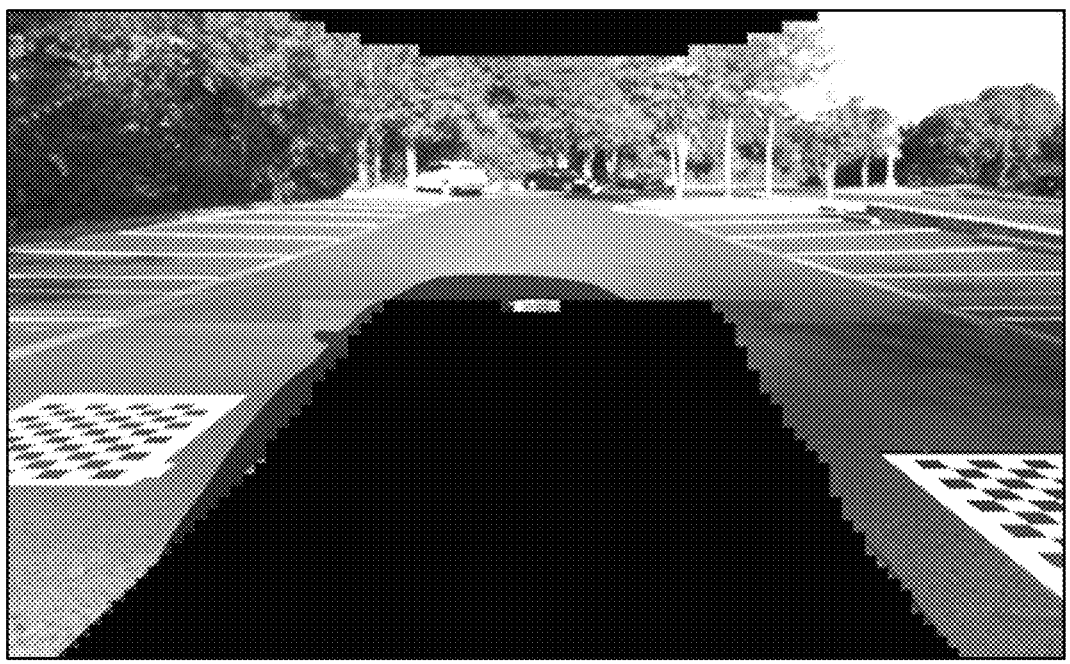
FIG. 22 is a rear-view output image rendered from three source cameras, according to some embodiments.

FIG. 22 is an example of a rendered view. The missing blocks in the center of the image are caused by the car itself blocking the view of the ground from the four cameras. The rest of the image may be composed of data from three cameras with blended transitions between them. Even though a fourth camera may have been specified on the command line, its image samples may not be used in the rendered image if they are not within the field of view described by the ViewSpec configuration.

5. Parallel Processor System Design

The following sections outline a design for the view rendering portion of the Any World View system and methods, according to some embodiments. The design may be based on the HyperX™ hx3100 processor in a HyperX™ development system including four GigE Vision camera inputs and a direct output for DVI display, or it may be based on another type of parallel processing hardware system.

5.1 Functional Analysis

Functional analysis may account for the computation operations of the view rendering algorithm, as described in section 3.2 above. The number of elementary operations may be estimated for each function, which then may provide an estimate for how many processor cycles may be utilized to perform the function. By understanding the cycle count for each function to handle one block of the view image, it may be possible to tell how many processor elements may be utilized for the system to run in real time to produce a view image of a particular resolution (e.g., 1440×900 or another resolution) at the a particular frame rate (e.g., 30 or 60 frames per second).

The major computational steps of the Any World View rendering function are described in the following sections, according to some embodiments. The block throughput requirement for each step in the process may be based on the target view image size and frame rate according to the following example set of specifications.

5.1.1 Demosaic

In some embodiments, two function kernels may be utilized for the demosaic algorithm (e.g., as described in section 3.2.1): one for interpolating red and blue pixels at a green location in the Bayer mosaic pattern, and the second for interpolating green and red/blue pixels at a blue/red location.

Next, an assumption may be made on the block size for demosaic processing. This may be the bounding box of the source image data used to render a single output 16×16 block. The analysis assumed a worst case size of 1000 samples for each block. Recall that if the bounding box is between 1000 and 4000 samples in size, an alternate, down-sampling demosaic algorithm may be used.

5.1.2 Warper

The warper function may compute the 256 pixels of a 16×16 view block from a rectangular block of source image samples as described in section 3.2.2. Two parts of the function may include applying the affine transform to obtain the (non-integer) position in the input sample block, and interpolating the input samples based on that position. Block average red, green, and blue values may also be computed in warper for use by the photometric alignment algorithm.

5.1.3 Photometric Alignment

The photometric alignment algorithm (section 3.2.3) may be implemented in two cells, one for gain estimation and the other may be gain correction which may apply the gain values to adjust color sample values. The gain estimation cell computes a sum of squared differences and applies a threshold function to disqualify blocks that match poorly. At the end of each frame, the gain estimation cell also solves a system of equations involving the stored sum of squared difference values.

5.1.4 Blend

A blended view block may be one that has two source images contributing sample values. In this example embodiment, 20% of the view image blocks are assumed to be blended and the remaining 80% are not blended. The blend computations may only be applied to blended view blocks. Other blocks may simply be copied from a single input to output.

5.2 Architectural Considerations

This section lists various architectural considerations that may impose constraints on the system design, including details of the hardware platform and high level functional specifications. The Any World View system may perform its function and meet the requirements described by these considerations, in some embodiments. These considerations along with the functional analysis from the previous section may be important factors that determine the performance of the system design.

5.2.1 High Level Functional Specifications

The high level functional specifications that are architectural considerations may be those that determine the target input/output and computational throughput of the system. The following specifications may be established in the Any World View System Requirements Document, in some embodiments.

The demonstration system may provide a video monitor that displays the user selected view of the vehicle. The display may have a nominal resolution of 1440×900 and may use a DVI signaling interface.

The demonstration system may capture images from the cameras at a rate of at least 30 fps and process the frames to the display at the same rate. The actual refresh rate of the display may be higher, but the update rate of content processed by the system may be at least 30 fps.

5.2.2 Hardware Platform

Figure 23:
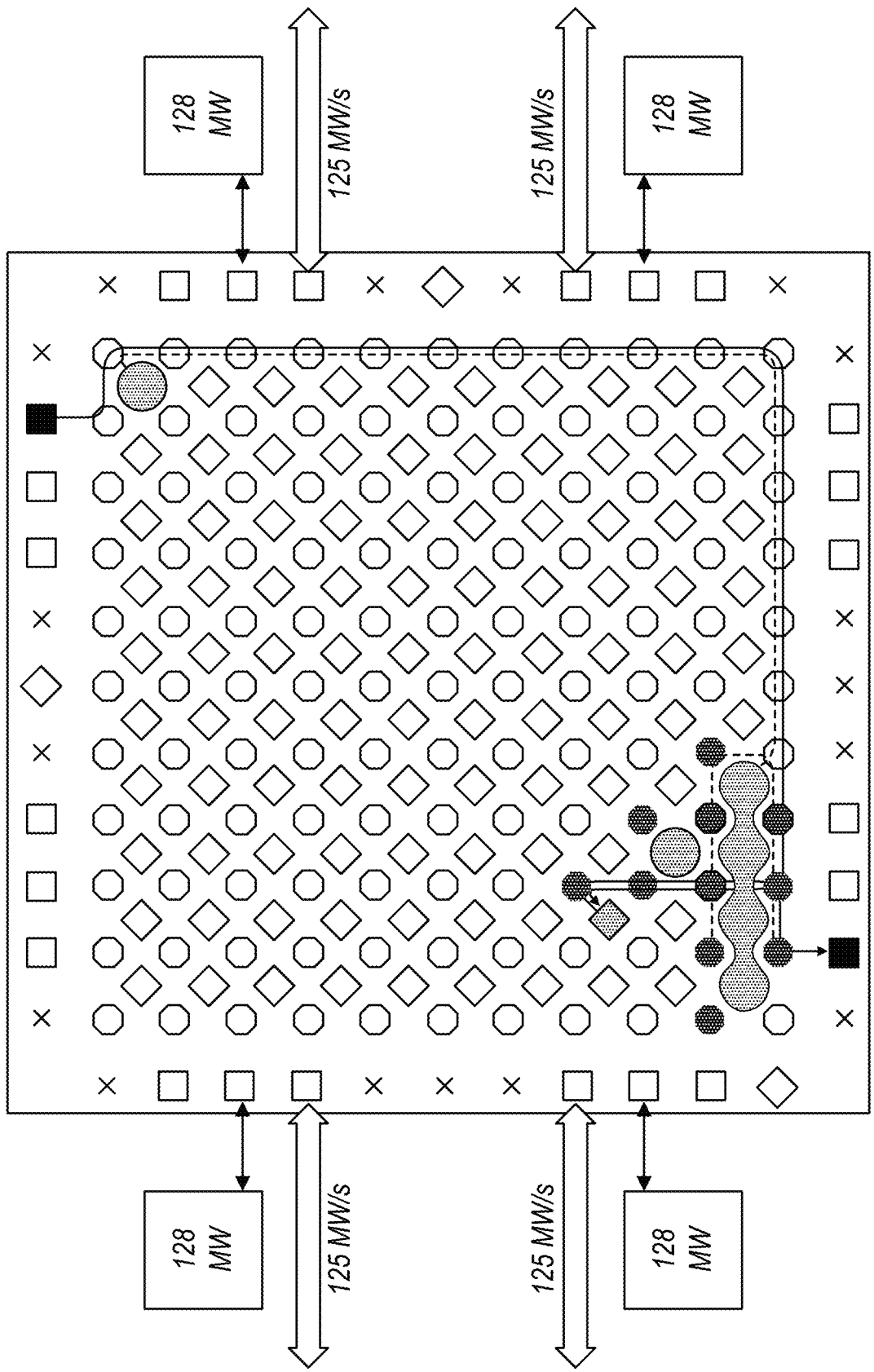
FIG. 23 is a parallel processing hardware diagram illustrating resource allocation for a two-chip design, according to some embodiments.

In some embodiments, the computational platform for the Any World View application may be a HyperX™ development system outfitted with three HyperX™ processor, labeled chip 1, chip 2, and chip 3. Chips 1 and 2 may each be provided on a board with a Gigabit Ethernet interface including a software driver in the form of a HyperX™ cell to send and receive UDP/IP packets, as shown in FIG. 23. The software I/O driver cell may support the GigE Vision picture transmission protocol, and each chip may receive video from two cameras at the same time.

FIG. 19. Chips 1 and 2 Resources

In some embodiments, chips 1 and 2 may each have these additional capabilities and resources:

1. Four external memories, each at least 128 MB in size
2. Two LVDS I/O interfaces to left neighbor, 125 MW/s raw bandwidth
3. Two LVDS I/O interfaces to the right neighbor, 125 MW/s raw bandwidth
4. Core clock set to 500 MHz
5. 100 processor elements and 121 data-memory routers, less those used for the Gigabit Ethernet driver cell.

Figure 24:
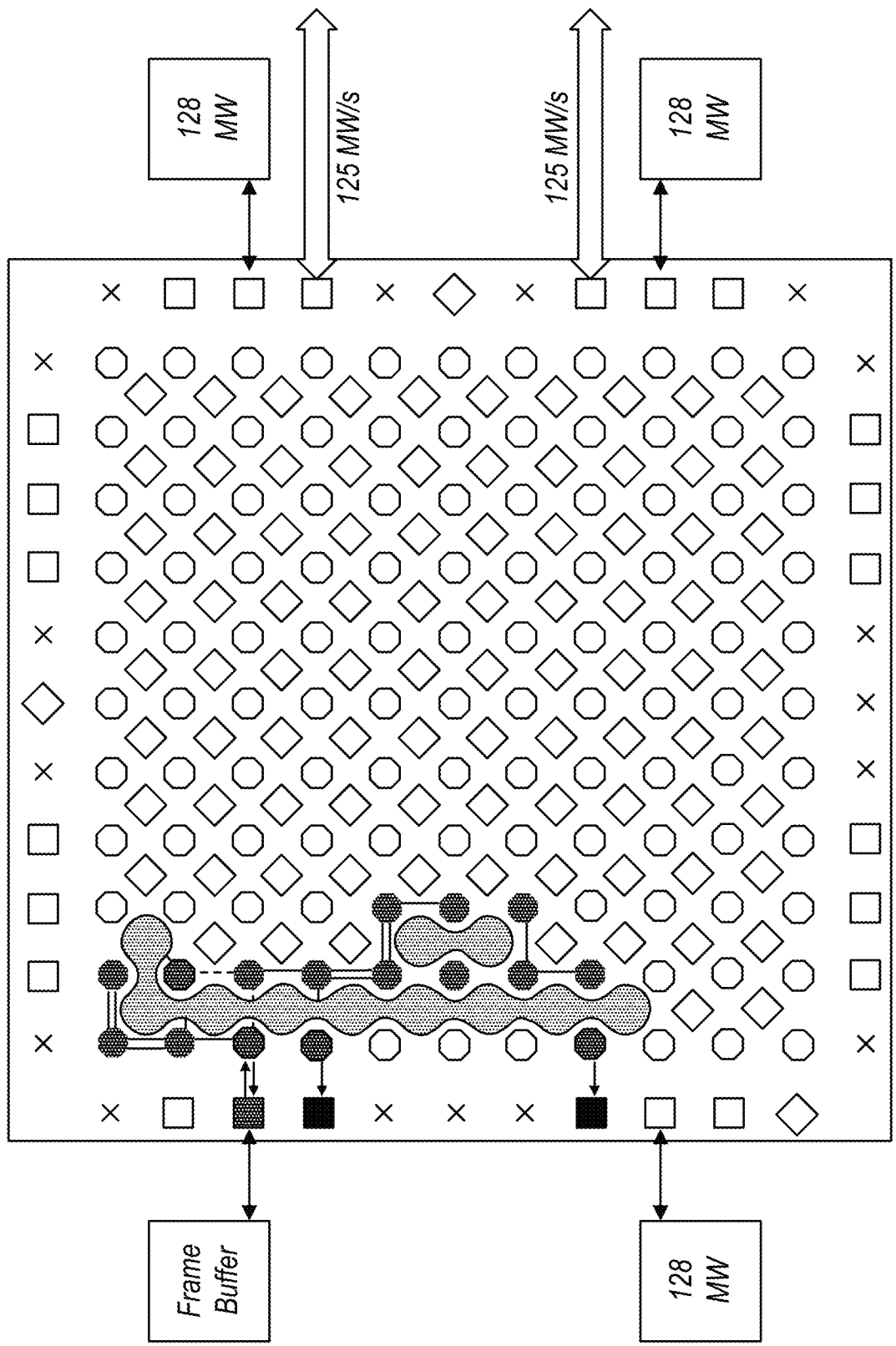
FIG. 24 is a parallel processing hardware diagram illustrating resource allocation for chip three, according to some embodiments.

The third chip, shown in FIG. 24 is provided on a board with a DVI interface for video output. A software video output driver cell may be provided to allow direct connection from the HyperX™ application running on chip 3, through hardware line drivers on the board, to a standard DVI computer monitor.

In some embodiments, chip 3 may have the following additional capabilities and resources:

1. Three available external memories, each at least 128 MB in size
2. Two LVDS I/O interfaces to the right neighbor, 125 MW/s raw bandwidth
3. Core clock set to 425 MHz (this rate used for 1440×900×60 fps DVI output)
4. 100 processor elements and 121 data-memory routers, less those used for the DVI output driver cell

6. Chip Design

The previous sections describe a system design for the Any World View system for real-time rendering of a view image at a video rate. Section 3.2 describes an algorithm the rendering system may perform and section 4.2.6 provides a software model for it. The high-level performance specifications are described in section 5.2.1 and the target platform in section 5.2.2.

In various embodiments, there may be more than one solution to the system design for this application, and different solutions may vary in the details of implementation. The particular solution described in this section was designed to meet the specifications and also support general engineering objectives of cell reuse and maintainability of the design.

6.1 Three Chip Design

Figure 25:
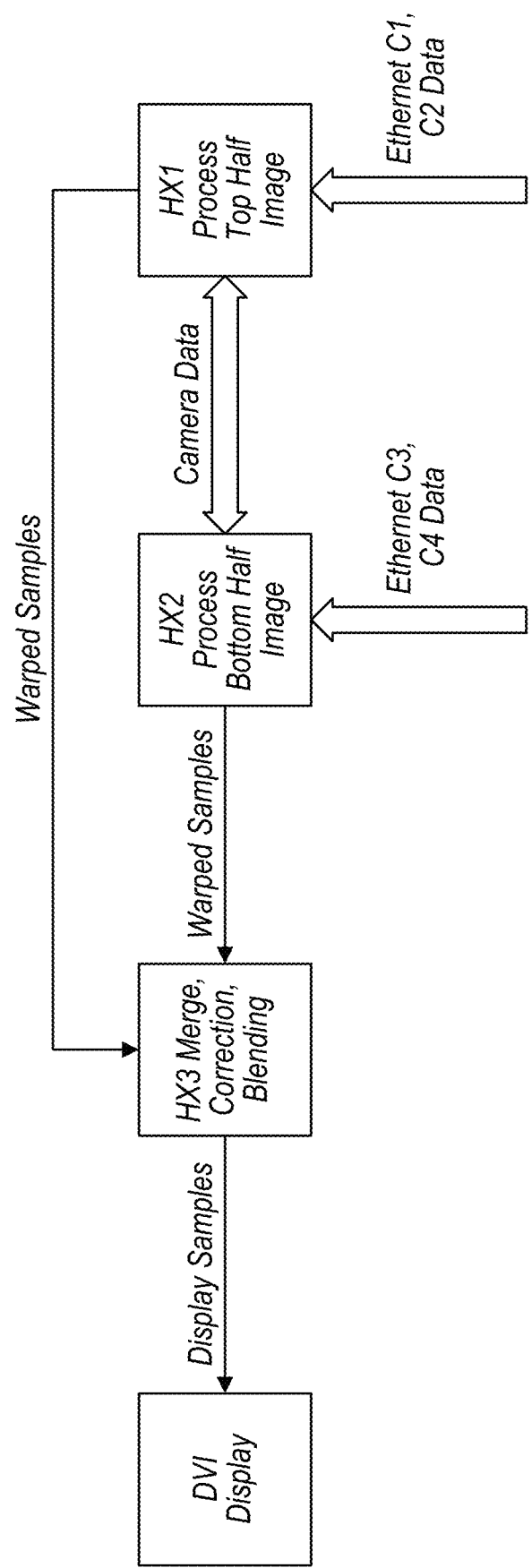
FIG. 25 is a schematic data-flow diagram for a three chip design, according to some embodiments.

In some embodiments, an architectural constraint imposed by the development platform may be receiving video from two cameras on each of two different chips. This may make it convenient to also divide the major computational work of the rendering process equally between the two chips. In some embodiments, this may be accomplished through a high-level workload partitioning, as shown in FIG. 25. As illustrated, from right to left, video may be received and processed in chip 1 and chip 2, labeled HX1 and HX2. The processing on each chip may utilize access to the video samples from all four cameras, so the two chips may exchange the video data that they did not receive directly.

The third chip, labeled HX3, may receive partially processed view blocks from the first two chips and may complete the rendering process and send the video frames to the DVI display.

The internal designs of the three chips are described in more detail in the following sections.

6.2 Chip 1 and 2 Design

Figure 26:
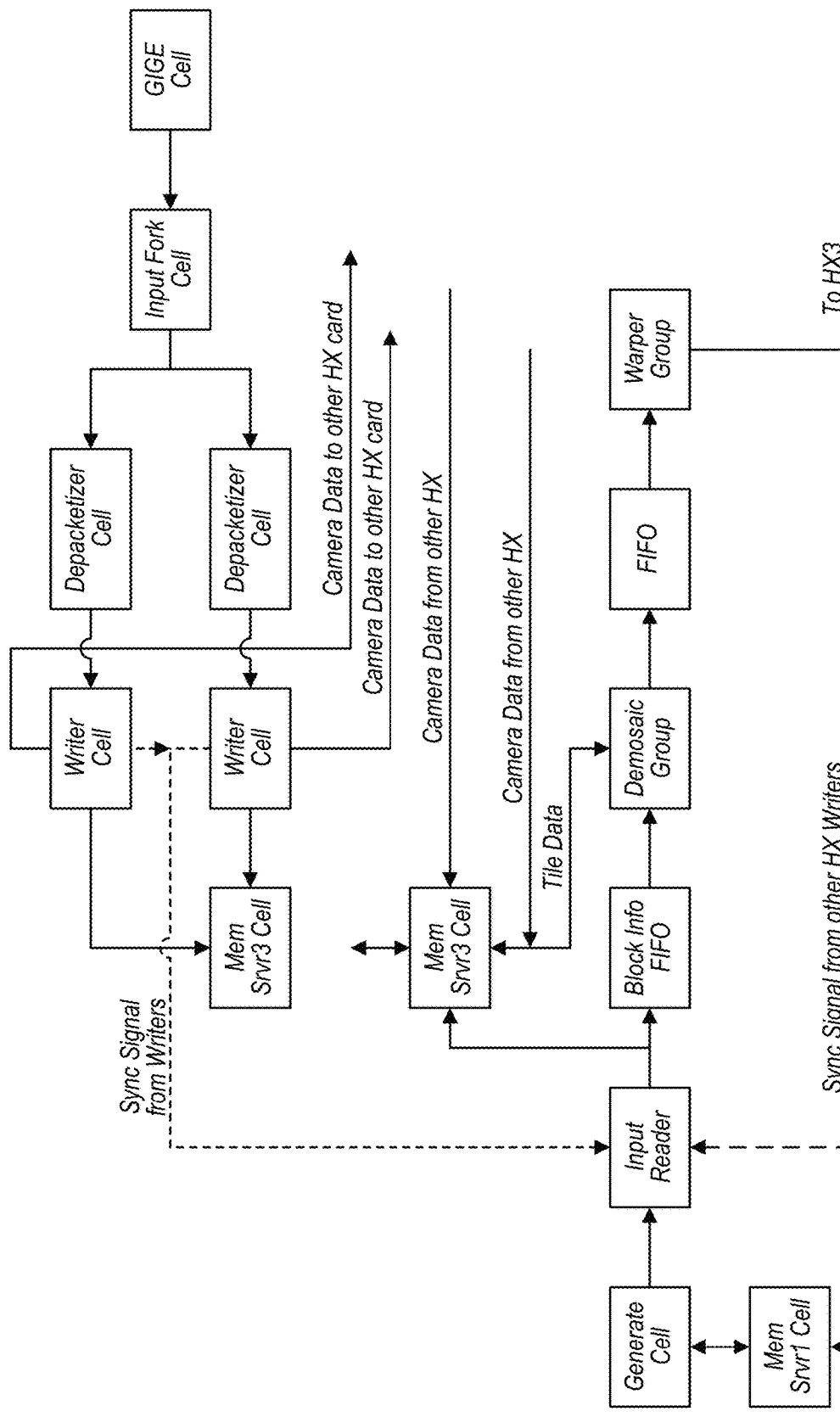
FIG. 26 is a schematic data-flow diagram for chip 1 and chip 2, according to some embodiments.

FIG. 26 shows the dataflow design for chip 1 and 2, according to some embodiments. As illustrated, the GigE Vision input for camera data is at the upper right of the diagram. The process network may include one or more of the following elements:

1. Two parallel paths for depacketizing and writing input images to DDR external memory
2. The MemSvr3 and MemSvrExt3 cells allow four camera streams to be stored in external memory, two from the local Ethernet interface and two from the other chip
3. BlockInfo parameters are stored in a different DDR external memory and read by the Generate cell
4. InputReader reads the bounding boxes as specified in each BlockInfo parameters for each block
5. Demosaic group includes a number of Demosaic cells
6. Warper group includes a number of Warper cells
7. FIFOs are included on some communication channels to absorb variations in block processing rate due to different sizes of BlockInfo
8. The output from chip 1 and chip 2 may be a stream of view image blocks, sent to chip 3.

6.2.1 Demosaic Group

Figure 27:
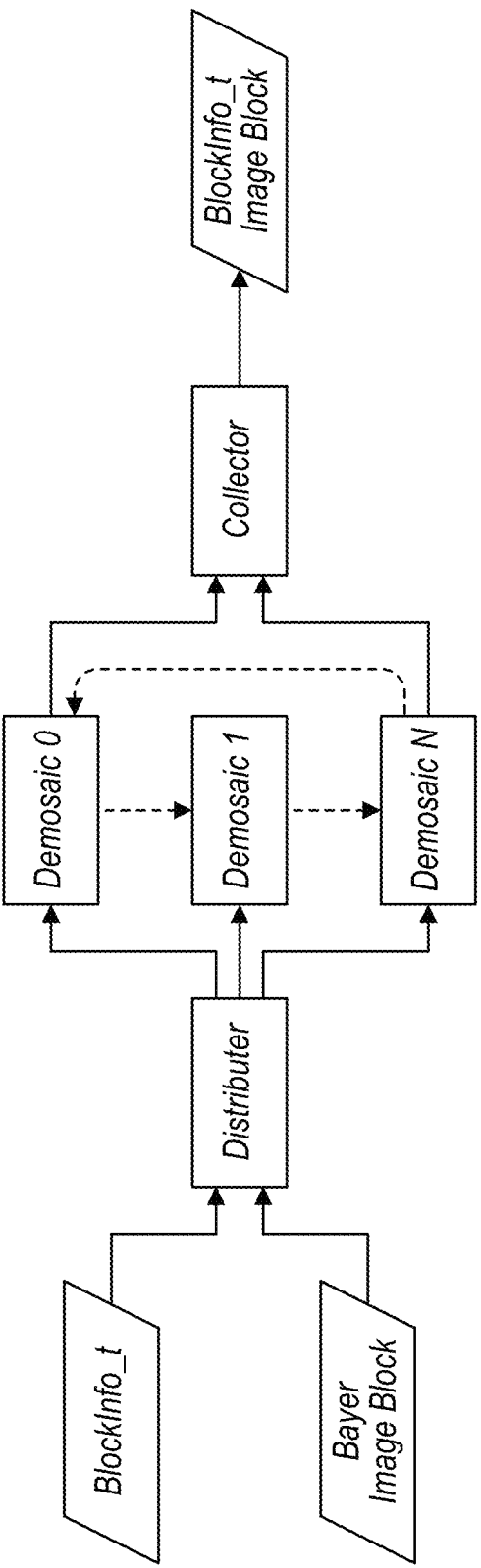
FIG. 27 is a schematic illustration of the internal structure of a demosaic group cell, according to some embodiments.

The demosaic group cell may be a single cell with two inputs and one output. Within the demosaic group there are a number of demosaic cells and other PEs dedicated to workload distribution. The internal structure of the demosaic group cell is shown in FIG. 27, according to some embodiments. The warper group may have a similar structure except with just a single input.

6.3 Chip 3 Design

Figure 28:
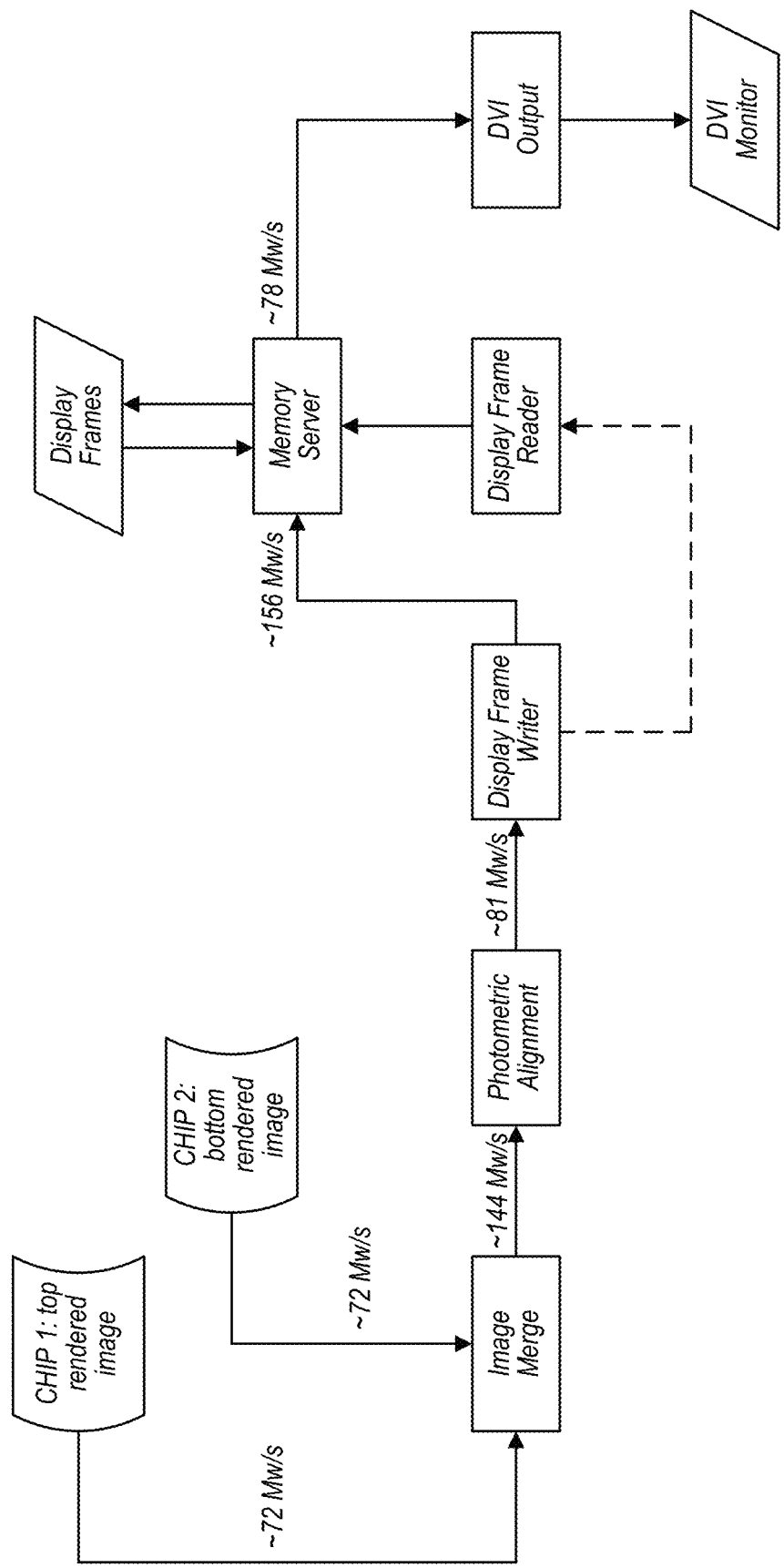
FIG. 28 is a schematic data-flow diagram for chip 3, according to some embodiments.

Chip 3 receives streams of view blocks from chip 1 and chip 2 as shown in FIG. 28. They may be merged into a single stream so that all view blocks in the output image may be considered together for photometric alignment. The functional analysis for the cells on chip 3 indicates that they may not require more than one or two PEs per function (see sections 5.1.3 and 5.1.4).

The output of the photometric alignment composite cell may be a stream of view blocks in their final form. The blocks may be written to a frame buffer in external memory. The completed rendered frames may then be read from external memory line by line for display through the DVI Output cell.

6.3.1 Photometric Alignment Composite Cell

Figure 29:
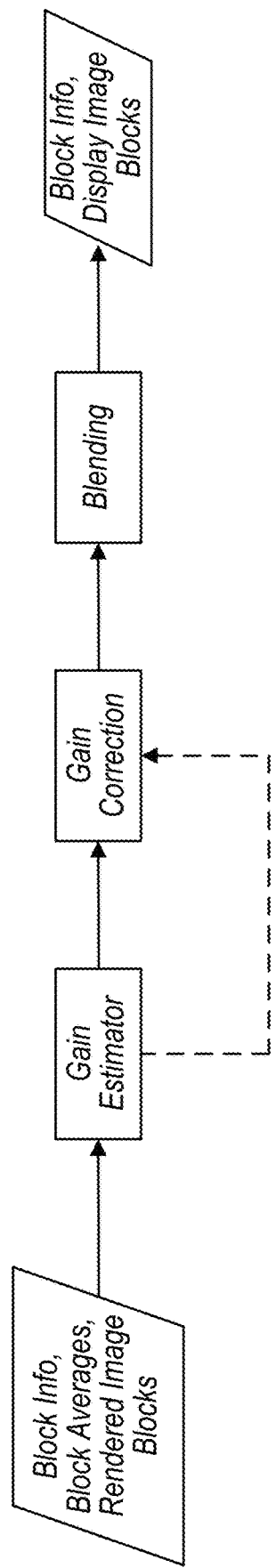
FIG. 29 is a schematic data-flow diagram for photometric alignment, according to some embodiments.

In some embodiments, all of the image processing functions in chip 3 may be encompassed by the photometric alignment composite cell, shown in FIG. 29. The functions may include gain estimation, gain correction, and blending as described in sections 3.2.3, 3.2.4, 5.1.3, and 5.1.4.

6.4 System Design Objectives

There may be more than one system design that may produce rendered view images for the Any World View system. The particular design described in the preceding diagrams and paragraphs was chosen to satisfy a number of general design objectives that are common to most highly parallel implementations based on HyperX™ technology. However, these specific design parameters are intended for illustration only, and it is understood to be within the scope of the present disclosure to utilize other design parameters and systems for implementing embodiments described herein.

6.4.1 Localization

The different functions performed in the preceding sections may be divided into different cells. Some cells, such as the external memory interface cells, may primarily be for data movement, not computation. Localization may be an important objective of the chosen design decomposition (e.g., the division of the algorithm among many cells). Localization may be taken to mean that each cell may do its function without knowledge of the functions being performed by the other cells in the design. The only information a cell may utilize to perform its task may be received on its input, and a cell may only send the work product to be utilized for the downstream cell to do its task.

An example of localization in the Any World View system may be observed in that many cells in the design do not know which frame their workload belongs to when they are processing a view block. Their function may be the same for every block. It may be the responsibility of other cells to track frame boundaries and update frame pointers in external memory as needed.

The interfaces of cells in a system may demonstrate if there is good localization in the design. If the interface for each cell is as simple as it may be then localization may be good. A simple interface may have a small number of input and output ports, with minimum input and output data size per workload, compared to some other design decompositions.

A design emphasis on localization may result in simple cells that tend to be reusable within the design and in other designs. The demosaic and warper groups are examples of cell reuse within the design, and the external memory interface is an example of a cell that may be reused in many designs, according to various embodiments.

6.4.2 Feed Forward

In some embodiments, feed forward design may be utilized, which may be taken to mean that each cell in the design receives data from an upstream cell, performs its function on the data, and then sends the result to a downstream cell. This design may not have explicit feedback communication such as a cell sending data back to an upstream cell in the design.

A design that is purely feed forward may have a simple model for flow control and performance. The desired throughput of the Any World View system may be 30 frames per second, and this may translate to a particular block processing rate. If every cell in the design is able to perform its function at the desired rate, then the overall design may also achieve the performance goal as long as there is no feedback path in the design. The flow control model may be localized within each individual cell; each cell may simply depend on its upstream neighbor to feed workloads to it at the desired rate, and on the downstream neighbor to accept its product at the desired rate.

6.4.3 Distributed Control

In some embodiments, the principle of distributed control may be advantageous for parallel processing applications based on HyperX™ technology to scale to arbitrarily large computations. Distributed control may be taken to mean that a cell only receives its instructions from an upstream neighbor, and only sends instructions to a downstream neighbor. In some embodiments, it may be an aspect of localization.

The opposite of distributed control is global control, where there may be a controller cell on the side that is sending instructions to various other cells in the design over a star-shaped or other type of communication topology. A problem with distributed control may be synchronization. For example, when should a global control cell send the instructions? One part of a design may be processing a different position in a video frame than another due to the pipeline of processes between them. With distributed control, temporal offsets within a design may not be as important and may not need to be considered.

An example of distributed control in the Any World View system may be seen in the two sets of frame buffers, one for source images and the other for display images. The decision to advance from one frame to the next may be handled locally in the writer and reader cells. Advantageously, this may be accomplished without coordination of frame synchronization between the source image buffers and the display image buffers, in some embodiments.

MPS System Overview

The following paragraphs supply additional detail regarding hardware configurations for a multi-processor system (MPS) such as a HyperX™ architecture or another type of MPS, according to some embodiments.

Various embodiments of a multi-processor system (MPS) and an associated method are described. A multi-processor system (MPS) may be defined as a system that includes a plurality of processing elements (PEs). An MPS may have a plurality of memories interspersed among the PEs, or alternatively may have a single shared memory. As used herein, the term "processing element" refers to a processor or CPU (central processing unit), microprocessor, or a processor core. Although an MPS may include any number of two or more PEs, it is noted that some MPSs may include significantly more PEs than a traditional computer system which typically includes only one general purpose processor (GPP), or a few GPPs. For example, some MPSs may include 4, 8, 16, 32, or 64 PEs (other examples include, e.g., dozens, hundreds, or even thousands of PEs). In some embodiments, PEs suitable for large MPSs may be more energy efficient than general purpose processors used by traditional computer systems because of their special construction for the purpose of low power consumption.

MPS may also include an interconnection network (IN) that interconnects the PEs and/or memories. The PEs and memories may be interconnected in one, two, three, or more dimensions, including circular dimensions (e.g., loops or rings). A higher-dimensioned MPS can be mapped onto fabrication media with fewer dimensions. For example, an MPS with the shape of a four dimensional (4D) hypercube can be mapped onto a 3D stack of silicon integrated circuit (IC) chips, or onto a single 2D chip, or even a 1D line of computational units. Also, low-dimensional MPSs can be mapped to higher dimensional media. For example, a 1D line of computation units can be laid out in a serpentine shape onto the 2D plane of an IC chip, or coiled into a 3D stack of chips. An MPS may include multiple types of computational units and interspersed arrangements of processors and memory. Also included in the broad sense of an MPS is a hierarchy or nested arrangement of MPSs, especially an MPS composed of interconnected IC chips where the IC chips contain one or more MPSs which may also have deeper hierarchal structure.

As used herein, the term MPS covers both relatively homogeneous sets of processors, as well as heterogeneous collections of general purpose, and specialized processors that are integrated on so-called "platform IC" chips. Platform IC chips may contain from a few to many processors, typically interconnected with shared memory and perhaps an on-chip network. There may or may not be a difference between an MPS and a "platform IC" chip. However, a "platform IC" chip may be marketed to address specific technical requirements in a specific vertical market.

In general, the memory for an MPS may be organized in a hierarchy with fast memory at the top and slower but higher capacity memory at each step down the hierarchy. In an MPS, supporting memories (SM) at the top of the hierarchy may be located nearby each PE. Each supporting memory may be specialized to hold only instructions or only data. A supporting memory for a particular PE may be private to that PE or shared with other PEs.

Further down the memory hierarchy there may be a larger shared memory, such as a semiconductor synchronous dynamic random access memory (SDRAM) with a bit capacity many times larger than that of the supporting memory adjacent to each PE. SDRAM may be located on a separate IC chip or chips from the PE and supporting memory, to specialize its fabrication. Further down the memory hierarchy there may be other types of memory, such as flash memory, magnetic disks, and optical disks.

The MPS may be programmed with software programs to accomplish specific functions. Each of the functions may be executed by one or more of the PEs in the MPS. Oftentimes, multiple programs may execute concurrently with each other on the MPS. The programs may execute together and communicate with each other to perform a more complex function or to perform a simpler function faster by employing parallel processing techniques. Such coordination between PE is referred to herein as cooperative processing.

An MPS may execute an application or program fast enough that it can accept input data and commands faster than the associated sources of data and commands can provide them and can provide results with a latency that is low enough to be ignored. Such an application is referred to as operating without delays in real time or as a "real-time application". The associated input data (or commands) may be referred to as "real-time data" (or "real-time" commands. For example, the MPS may receive real-time data via an input signal. One or more of the applications, programs, or functions, may process the input signal, and possibly produce an output signal with modified or additional real-time data based on the program or programs.

Figure 30:
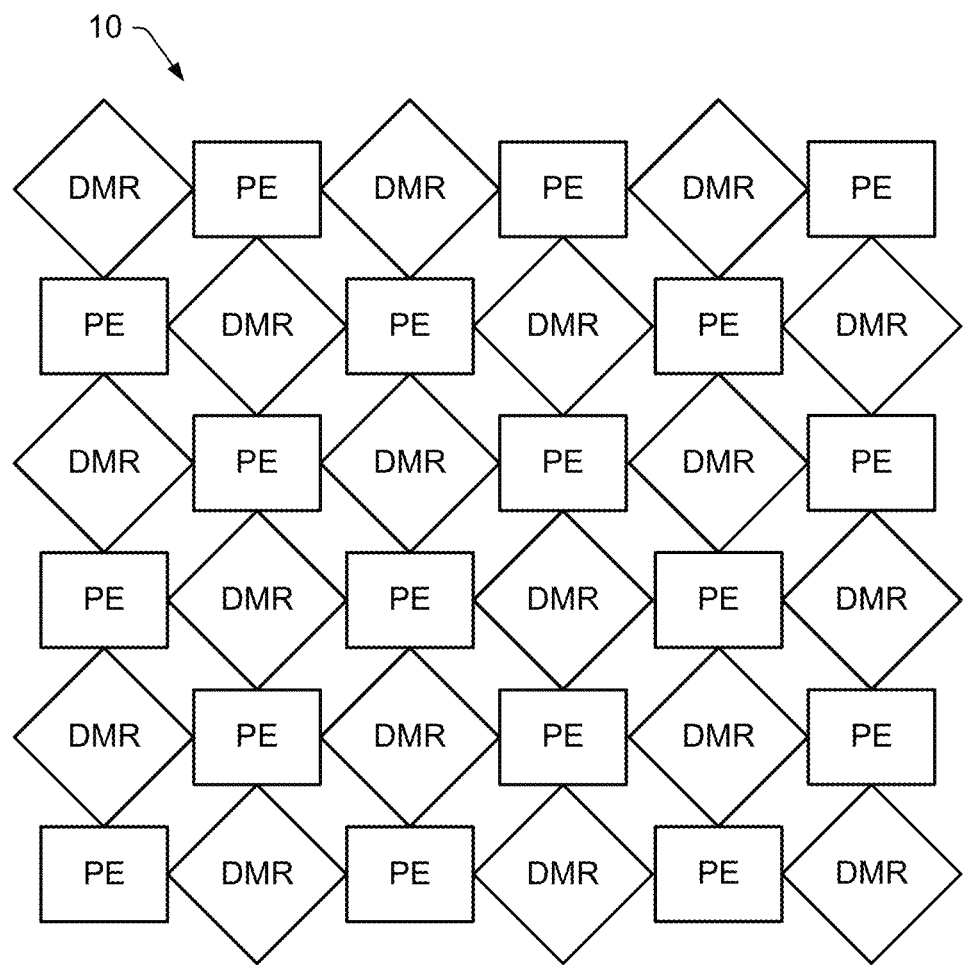
FIG. 30 is a block diagram illustrating one embodiment of a multi-processor system (MPS), according to some embodiments.

FIG. 30—MPS Block Diagram and Overview

FIG. 30 is a block diagram illustrating one embodiment of a multi-processor system (MPS). In the illustrated embodiment, MPS 10 includes a plurality of processor elements (PEs) and a plurality of data memory routers (DMRs), which may also be referred to as dynamically configurable communicators, or dynamically configurable communication elements, coupled to communicate data and instructions with each other. As used herein, a PE may also be referred to as a PE node, and a DMR may also be referred to as a DMR node.

The processing system (MPS) 10 may be used in any of various systems and applications where GPMCs, DSPs, FPGAs, or ASICs are currently used. Thus, for example, the processing system 10 may be used in any of various types of computer systems or other devices that require computation. In one contemplated embodiment, the processing system 10 is used as a signal processing device in a digital video display system.

In one embodiment, a PE may include one or more arithmetic-logic units (ALUs) configured for manipulating data, one or more instruction processing units (IPUs) configured for controlling the ALUs, one or more memories configured to hold instructions or data, and multiplexers and decoders of various sorts. Such an embodiment may include a number of ports ("processor ports"), some of which may be configured for connection to DMRs and others that may be configured for connection to other PEs.

In one embodiment, a DMR may include one or more random access memories (RAMS) configured to hold data and instructions, a configurable controller, a network switch such as a crossbar switch, registers, and multiplexers. Such an embodiment may include a plurality of ports, some of which may be configured for connection to PEs (referred to herein as PE-type ports) and others that may be configured to connect to DMRs (referred to herein as DMR-type ports). It is noted that for any given port, whether configured for connection to or from a DMR or PE, the amount of data transferable through such a given port in a particular clock cycle may vary in various embodiments. For example, in one embodiment, a given port may be configured to transfer one word of data per clock cycle, whereas in another embodiment a given port may be configured to transfer multiple words of data per clock cycle. In yet another embodiment, a given port may employ a technique such as time-division multiplexing to transfer one word of data over multiple clock cycles, thereby reducing the number of physical connections comprising the port.

In one embodiment of MPS 10, each PE may include a small local memory reserved for instructions and may include very little local data storage. In such an embodiment, DMRs neighboring each PE may be configured to provide operands to a given PE. In a particular embodiment, for many PE instructions a given PE may read operands from neighboring DMRs, execute an ALU operation, and store an ALU result to a given neighboring DMR in one clock cycle. An ALU result from one PE may thereby be made available to several other PEs in the clock cycle immediately following execution. Producing results in this fashion may enable the execution of neighboring PEs to be closely coordinated or "tightly coupled."

As used herein, from the perspective of a given DMR or PE, a neighboring DMR or PE refers to a DMR or PE that can be accessed from the given DMR or PE within a particular latency. In some embodiments, the latency defining the extent of a neighboring relationship may vary depending on factors such as clock speed, for example. Further, in some embodiments, multiple degrees of neighboring may be defined, which degrees may correspond to different access latencies. For example, in one embodiment, a "nearest neighbor" may be defined as a device that can supply data during the same clock cycle during which it is requested, a "next-nearest neighbor" may be defined as a device that can supply data within one clock cycle after it is requested, and so forth. In other embodiments, it is contemplated that other metrics may be used to quantify a neighboring relation.

In a given MPS embodiment, some DMRs and PEs may be logically adjacent to other DMRs and PEs. As used herein, "logically adjacent" refers to a relation between two devices, such as one DMR and another DMR, or one DMR and one PE, such that one or more ports of one device are directly connected to respective ports of the other device without passing through an intervening DMR or PE. Further, in a given MPS embodiment, some DMRs and PEs may be physically adjacent to other DMRs and PEs. As used herein, "physically adjacent" refers to a relation between two devices, such as one DMR and another DMR, or one DMR and one PE, such that no other DMR or PE is physically located between the two devices.

In some MPS embodiments, devices such as DMRs and PEs that are logically and/or physically adjacent are also neighboring or neighbor devices. However, it is noted that in some embodiments, logical and/or physical adjacency between given devices does not entail a neighboring relation, or a particular degree of neighboring relation, between the given devices. For example, in one embodiment one DMR may be directly connected to another DMR that is located a considerable distance away. Such a pair may be logically adjacent but not physically adjacent, and the signal propagation time from the one DMR to the other may be too great to satisfy the latency requirement of neighbors. Similarly, in one embodiment one DMR may be physically adjacent to another DMR but not directly connected to it, and therefore not logically adjacent to it. Access from the one DMR to the other DMR may traverse one or more intermediate nodes, and the resulting transit delay may be too great to satisfy the latency requirement of neighbors.

Depending on the technology and implementation of a given embodiment of MPS 10, the specific number of the DMR's plurality of ports as well as the size of the DMR memory may be balanced against the overall desired execution speed and size of the DMR. For example, one DMR embodiment may include 4 PE-type ports, 4 DMR-type ports, and 4K words of memory. Such a DMR embodiment may be configured to provide a direct memory access (DMA) mechanism. A DMA mechanism may allow a given DMR to copy data efficiently to or from other DMRs, or to or from locations external to MPS 10, while PEs are computing results.

In one embodiment of MPS 10, data and instructions may be transferred among the DMRs in one of several different ways. A serial bus may be provided to all memories in MPS 10; such a bus may be used to initialize MPS 10 from external memory or to support testing of MPS data structures. For short-distance transfers, a given PE may be programmed to directly move data to or from its neighbor DMRs. To transfer data or instructions over longer distances, communication pathways may be dynamically created and destroyed in the network of DMRs.

For the purpose of such longer-distance data transfer, a network of interconnected DMRs within MPS 10 may constitute a switched routing fabric (SRF) for communication pathways. In such an embodiment, there may be at least two methods for managing communication pathways in the SRF. A first method is by global programming, wherein paths may be selected by software control (for example, either by a human programmer or by a compiler with a routing capability) and instructions may be coded into DMR configuration controllers to program the crossbar appropriately. To create a pathway, every DMR along the pathway may be explicitly programmed with a particular routing function. In a dynamic environment where pathways are frequently created and destroyed, a large number of crossbar configuration codes may be required, storage of which may in turn consume potentially limited DMR RAM resources.

A second method for managing communication pathways is referred to as "wormhole routing". To implement wormhole routing, each DMR may include a set of steering functions and a mechanism to stop and restart the progress of a sequence of words, referred to as a message, through the SRF. Because the steering functions may be commonly used and re-used by all communication pathways, the amount of configuration code that may occupy DMR RAM may be much smaller than for the global programming method described above. For the wormhole routing method, software control may still be used to select the particular links to be used by a pathway, but the processes of pathway creation (also referred to herein as set up) and destruction/link release (also referred to herein as teardown) may be implemented in hardware with minimal software intervention.

To prevent potential loss of data words on a pathway, an embodiment of MPS 10 may implement flow control between receivers and transmitters along the pathway. Flow control refers to a mechanism that may stop a transmitter if its corresponding receiver can no longer receive data, and may restart a transmitter when its corresponding receiver becomes ready to receive data. Because stopping and restarting the flow of data on a pathway has many similarities to stopping and restarting the progress of a message in wormhole routing, the two may be combined in an integrated scheme.

In one embodiment, MPS 10 may include pluralities of PEs and DMRs, which PEs may be identical and which DMRs may be identical, connected together in a uniform array. In a uniform array, the majority of PEs may be identical and each of a majority of PEs may have the same number of connections to DMRs. Also, in a uniform array, the majority of DMRs may be identical and each of a majority of DMRs may have the same number of connections to other DMRs and to PEs. The PEs and DMRs in one MPS embodiment may be interspersed in a substantially homogeneous fashion. As used herein, a substantially homogeneous interspersion refers to an arrangement in which the ratio of PEs to DMRs is consistent across a majority of sub-regions of an array.

A uniform array arranged in a substantially homogeneous fashion may have certain advantageous characteristics, such as providing a predictable interconnection pattern and enabling software modules to be re-used across the array. In one embodiment, a uniform array may enable a small number of instances of PEs and DMRs to be designed and tested. A system may then be assembled by fabricating a unit comprising a DMR and a PE and then repeating or "tiling" such a unit multiple times. Such an approach may lower design and test costs through reuse of common system elements.

It is also noted that the configurable nature of the PE and DMR may allow a great variety of non-uniform behavior to be programmed to occur on a physically uniform array. However, in an alternative embodiment, MPS 10 may also be formed with non-uniform DMR and PE units, which may be connected in a regular or irregular array, or even in a random way. In one embodiment, PE and DMR interconnections may be implemented as circuit traces, for example on an integrated circuit (IC), ceramic substrate, or printed circuit board (PCB). However, in alternative embodiments, such interconnections may be any of a variety of miniature communication links, such as waveguides for electromagnetic energy (i.e., radio or optical energy), wireless (i.e., unguided) energy, particles (such as electron beams), or potentials on molecules, for example.

The MPS 10 may be implemented on a single integrated circuit. In one embodiment, a plurality of MPS integrated circuits may be combined to produce a larger system. A given embodiment of MPS 10 may be implemented using silicon integrated circuit (Si-ICs) technology, and may employ various features to account for specific characteristics of such a technology. For example, the circuits on a Si-IC chip may be confined to a thin plane. Correspondingly, a given embodiment of MPS 10 may employ a two-dimensional array of PEs and DMRs such as that illustrated in FIG. 30. However, alternative MPS embodiments are contemplated that include different arrangements of PEs and DMRs.

Further, the available wiring density on a Si-IC chip may be much higher than between such chips, and each chip may have a perimeter of special Input/Output (I/O) circuits to interface on-chip signals and off-chip signals. Correspondingly, a given embodiment of MPS 10 may employ a slightly non-uniform array composed of a uniform array of PEs and DMRs in core of the chip, and modified PE/DMR units along the perimeter of the chip. However, alternative MPS embodiments are contemplated that include different arrangements and combinations of uniform and modified PE/DMR units.

Also, computational operations performed by Si-IC circuits may produce heat, which may be removed by IC packaging. Increased IC packaging may require additional space, and interconnections through and around IC packaging may incur delays that are proportional to path length. Therefore, as noted above, very large MPSs may be constructed by interconnecting multiple chips. Programming of such multiple-chip MPS embodiments may take into account that inter-chip signal delays are much longer than intra-chip delays.

In a given Si-IC MPS 10 embodiment, the maximum number of PEs and DMRs that may be implemented on a single chip may be determined by the miniaturization possible with a given Si-IC technology and the complexity of each PE and DMR. In such an MPS embodiment, the circuit complexity of PEs and DMRs may be minimized subject to achieving a target level of computational throughput. Such minimized PEs and DMRs may be referred to herein as being streamlined. In one MPS 10 embodiment, the target level of throughput for a PE may be comparable to that of the arithmetic execution units of the best digital signal processors (DSPs) made in the same Si-IC technology. However, other MPS embodiments are contemplated in which alternative references for target PE throughput may be used.

In some embodiments, MPS 10 may employ the best features of DSP and FPGA architectures. Like a DSP, MPS 10 may be a programmable chip with multiple processing units and on-chip memory. However, relative to a DSP, the MPS processing units may be streamlined, there may be more of them, and they may be interconnected in a novel way to maximize the bandwidth of data movement between them as well as data movement on and off the chip. Having more processing units than a DSP may allow MPS 10 to do more multiplications per unit time, and streamlined processing units may minimize energy use. Many DSPs with internal parallelism may be bus-oriented architectures. In some embodiments, MPS 10 may not include a bus, but rather may include neighboring shared local memories, such as in a DMR, embedded in an SRF that may provide significantly higher total bandwidth than a bus-oriented architecture.

Compared to the FPGA approach, some MPS embodiments may be more coarsely grained. For example, in one MPS embodiment, operations may have a natural word length (e.g., 16-bits) and computation may be most efficient if performed using data that is a multiple of the natural word length. In some MPS embodiments, PEs and DMRs may be denser than the equivalent structures realized in FPGA, which may result in shorter average wiring length, lower wiring capacitance and less energy use. In contrast to an FPGA implementation, in some MPS embodiments, every ALU in the MPS may be part of a processor (i.e., a PE), which may facilitate the fetch of operands and the write back of results to surrounding fast memory in the DMRs. Timing and clock skew issues for ALU, fetch, and write back operations may be solved once during the design of the IC chip and need not be re-solved with each new application as is typical of FPGA implementations.

MPS Topology and Communication

MPS 10 illustrated in FIG. 30 may supply the PEs with ample connections to fast memory by interspersing DMRs between the PEs, as shown. Such an arrangement may reduce the time required for a given PE to access memory in a DMR relative to a segregated (i.e., non-interspersed) arrangement, and may be referred to herein as an interspersed grid arrangement. In the embodiment of FIG. 3, the ratio of PEs to DMRs is roughly 1:1. However, other MPS embodiments are contemplated that may include different ratios of PEs to DMRs.

Connections between DMRs and PEs are not explicitly shown in FIG. 3, because there may be many possible connection schemes using different types and numbers of connections.

Figure 31:
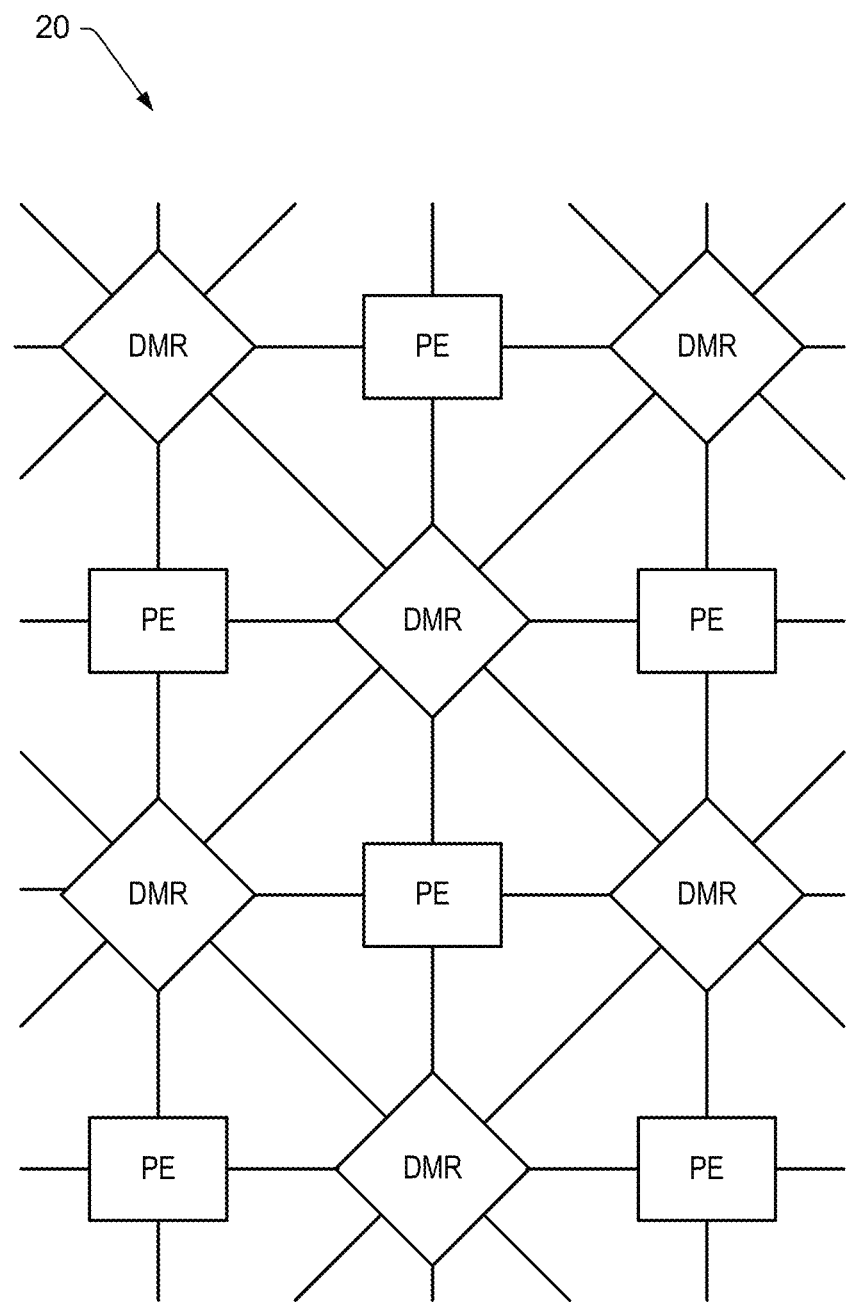
FIG. 31 is a block diagram illustrating one embodiment of an MPS connection scheme, according to some embodiments.

FIG. 31—MPS Connection Scheme

FIG. 31 is a block diagram illustrating one embodiment of an MPS connection scheme. MPS connection scheme 20 includes a plurality of DMRs and PEs and may be illustrative of a portion of the MPS of FIG. 30. In the MPS connection scheme 20, each PE is connected to four neighbor DMRs, while each DMR is connected to four neighbor PEs as well as four neighbor DMRs. MPS connection scheme 20 may therefore be illustrative of the PlanarA connection scheme discussed above.

To support high-bandwidth ports in MPS connection scheme 20, the connections between ports (PE-to-DMR, or DMR-to-DMR) may be short (i.e., limited to neighbors) and word-wide, meaning the number of electrical conductors (lines) in the data part of the connection may be the same as the number of bits used in the ALU operands. The PE-to-DMR connections may include address lines. The DMR-to-DMR connections may not necessarily have address lines but may have lines for flow control.

By keeping the PE nodes simple, large arrays (for example, in one MPS embodiment, 16 rows times 16 columns=256 PEs) may be put on a single VLSI IC at modest cost. Suitable VLSI technologies may include but are not restricted to complementary metal-oxide semiconductor (CMOS) field effect transistors with or without bipolar transistors in silicon or other semiconductors.

In some MPS embodiments, communication between nodes may be under programmer control. In an MPS each PE may communicate data/instructions with neighboring DMRs, and optionally on through those DMRs to other DMRs and PEs. This is highly effective for transfer of small amounts of data over short distances. However, for larger blocks of data, or longer distances, it is more efficient to use a DMA engine to move the data, thus freeing a PE to perform ALU operations.

For longer distance block moves, some MPS embodiments may provide means for memory-to-memory transfers between DMRs without involving the PEs. A PE may indirectly access a DMR-type port in a neighbor DMR through special SM addresses associated with such ports. This may permit a PE to create a new pathway for sending a message and later to tear such a pathway down, or alternatively to receive a message. A PE may also save a block of data to be transferred in an SM buffer in a neighbor DMR and then direct the neighbor DMR to begin a DMA operation through special SM addresses associated with such operations. This may permit the PE to proceed with other tasks while the neighbor DMR coordinates the DMA transfer of the data.

Various embodiments of the MPS may offer an advantageous environment for executing useful algorithms. Algorithms of interest (e.g., for analyzing image data) may be broken up into flow diagrams of ALUs. Each flow diagram may be mapped onto the MPS array as a tree, a lattice, or any arbitrary network, including multiple feedback/feed-forward paths. The finite precision of one ALU may be expanded to obtain multi-word precise results by combining several PEs and DMRs. When mapping a flow diagram to the MPS, communication delays between PE/DMR nodes that are proportional to the distances between nodes may arise. Also, a mapping may require more memory at each node if communication queues are large or if reconfiguration is frequent. These factors may be compensated for by careful programming, which may take communication delays, queuing, and reconfiguration into account.

Systolic algorithms represent a class of algorithms that may map particularly efficiently to various embodiments of the MPS. Systolic algorithms have been developed for a variety of applications in matrix arithmetic, image processing, and signal processing. In a systolic algorithm many processors may cooperate in a synchronized way to perform a difficult computation. In an ideal algorithm implementation, each processor may perform the same operation (or small loop of operations) over and over for as long as the algorithm is needed, and data may flow through the network of processors by neighboring connections with balanced production and consumption of data-words. If each intermediate result data word produced is then immediately consumed by a subsequent calculation, then the amount of memory required may be minimized. The advantages of a systolic algorithm may include the ability to use streamlined processors, to minimize memory requirements, and to achieve a high arithmetic operation rate using standard, low cost VLSI technology.

An MPS embodiment may have many processors per chip and an overall MIMD architecture, which may be configured to emulate the operation of other classes of systems, such as SIMD systems and distributed MIMD systems. In some embodiments, an MPS may run different algorithms in different areas of the chip at the same time. Also, to save power, in some embodiments a programmer can selectively enable and disable the clock to at least some PEs and DMRs. Thus unused PEs and DMRs may be disabled.

PE/DMR Fabric

Figure 32:
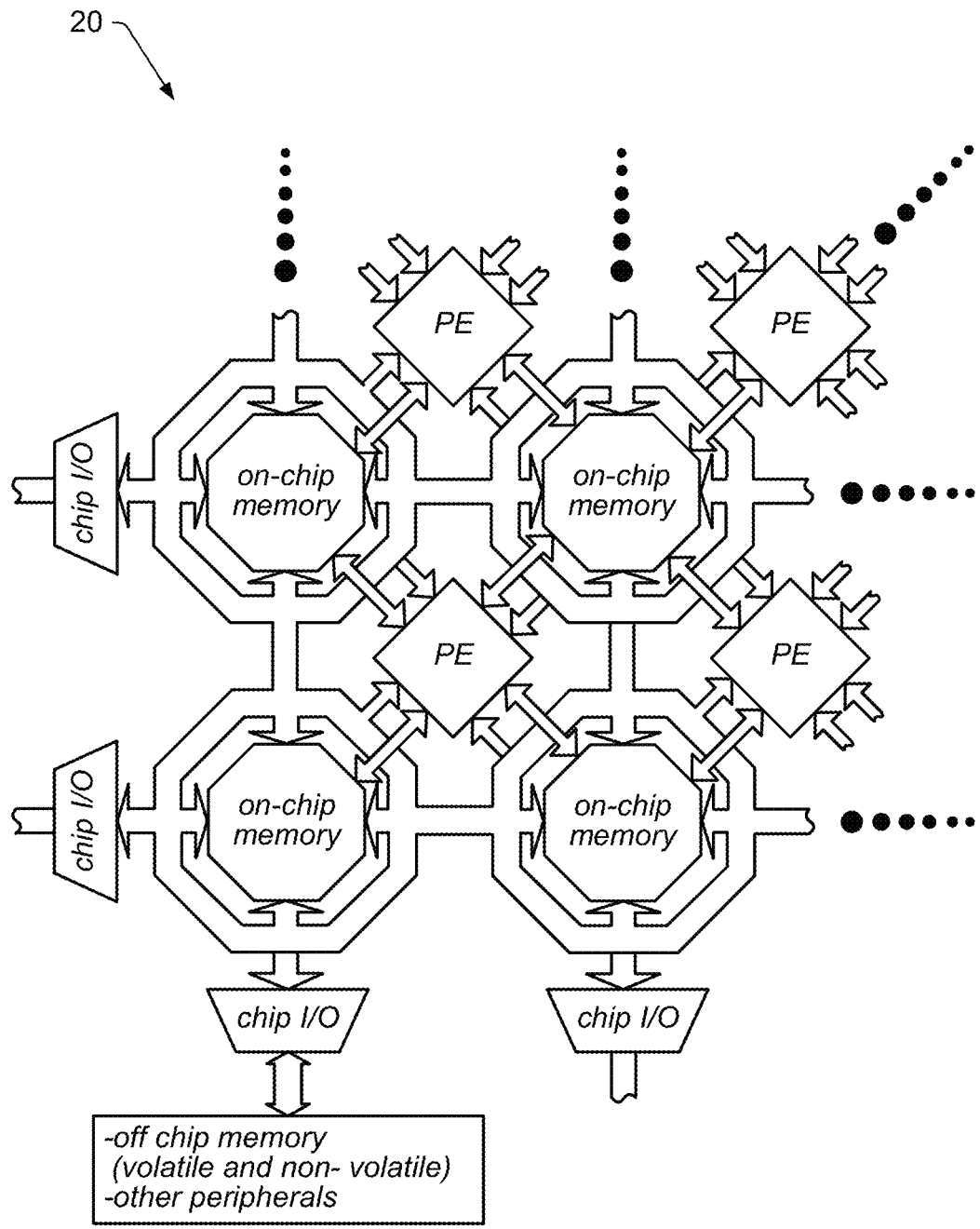
FIG. 32 is a more detailed diagram illustrating one embodiment of the MPS fabric, according to some embodiments.

FIG. 32 is a more detailed diagram illustrating one embodiment of the MPS fabric. In FIG. 32 each PE is surrounded by four DMR with which it may communicate memory requests and messages. Each DMR is surrounded by four other DMR except where it is near the edge of the fabric where it may be adjacent to a chip I/O port. Each DMR may communicate with neighboring DMR or chip I/O ports to setup communication pathways and send/receive messages on said pathways.

MPS Operation

Figure 33:
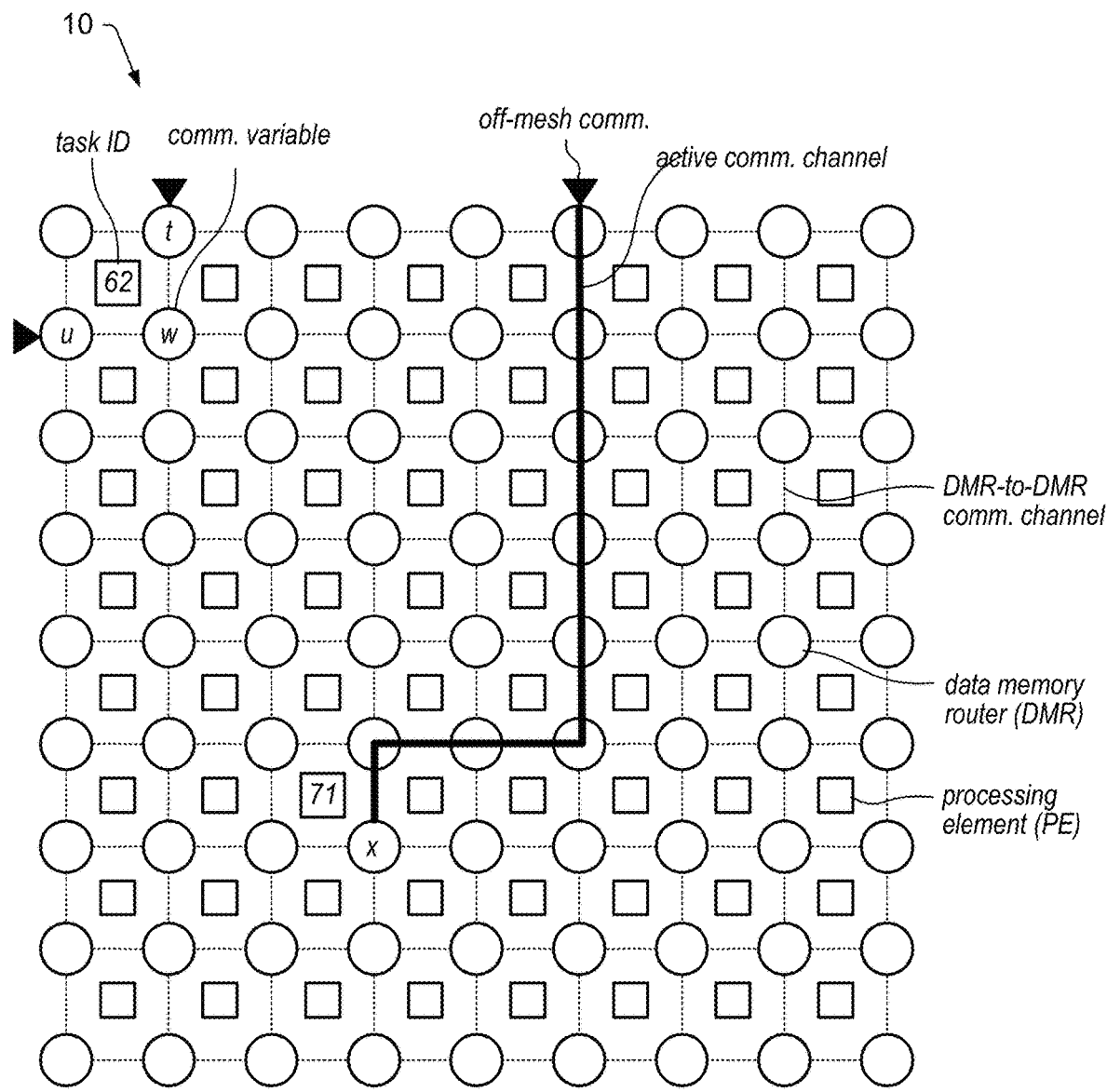
FIG. 33 illustrates an example MPS composed of PE (squares) uniformly interspersed with DMR (circles) in accord with the architecture example of FIG. 32, according to some embodiments.

FIG. 33 illustrates an example MPS composed of an 8×8 array of PE (squares) uniformly interspersed with a 9×9 array of DMR (circles) in accord with the architecture example of FIG. 32. Programs may be compiled into tasks that are assigned to PE. The first example program has been compiled with taskID=62, and assigned to a specific PE in the upper left corner of the array. The variables (u, v, w) are declared communication variables in the program source code, and assigned to specific memory addresses in the adjacent DMRs; u and v are buffers for the I/O ports, and w is a buffer for on-chip network communications with its associated DMR. The second example program has been compiled with taskID=71, and assigned to a specific PE in the interior of the array. The variable x is a declared communication variable and assigned to the DMR shown. A communication pathway associated with variable x runs from its assigned DMR via other DMR to an I/O port at the top row. As shown, the two example programs do not communicate with each other, but they can easily be made to communicate by addition of another communication variable to the task 71, and a pathway between its DMR and variable w in the DMR adjacent to task 62.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for rendering an output image, the method comprising:
  receiving a plurality of input images, wherein each input image of the plurality of input images is taken from a different respective first location, wherein each respective first location is a respective location on a vehicle;
  receiving first user input specifying a view specification for rendering the output image, wherein the view specification comprises a second location;
  determining a projection surface, wherein the projection surface comprises:
    a horizontal portion comprising an elliptical disc surrounding the vehicle;
    a vertical portion comprising an elliptical cylinder encompassing the elliptical disc; and
    an intermediate region that smoothly joins the elliptical disc and the elliptical cylinder;
  rendering the output image based at least in part on the plurality of input images and the view specification, wherein the output image comprises an image of a region as seen from the second location, wherein the second location is different from each of the first locations, wherein rendering the output image based at least in part on the plurality of input images comprises mapping pixels of the plurality of input images onto the projection surface, and mapping locations on the projection surface to pixels of the output image, wherein rendering the output image comprises:
dividing the output image into a plurality of blocks of pixels; and
for each of the plurality of blocks of pixels of the output image:
determining a mapping between a plurality of pixels along the perimeter of the respective block of pixels and a plurality of corresponding pixels of each of one or more of the plurality of input images; and
for each of the one or more input images:
performing a projective mapping of pixels located within the perimeter of the corresponding pixels of the respective input image to respective pixels in the output image, wherein said projective mapping comprises a linear extrapolation of the mapping between the plurality of pixels along the perimeter of the respective block of pixels and the plurality of corresponding pixels of the respective input image, wherein a size of each of the plurality of blocks of pixels is selected to balance a degree of image distortion introduced by said projective mapping and computational resources associated with rendering the output image to render the output image within a first latency, and wherein smaller block sizes of pixels reduce the degree of image distortion while utilizing a larger number of parallel computational resources to render the output image within the first latency; and
displaying the output image on a display.

2. The method of claim 1, the method further comprising:
repeatedly rendering a succession of output images based a succession of respective pluralities of input images, wherein the succession of output images is displayed on the display in real time to produce a real time video.

3. The method of claim 1, the method further comprising:
wherein said determining the mapping between the plurality of pixels along the perimeter of the respective block of pixels and the plurality of corresponding pixels of each of the one or more of the plurality of input images and said performing the projective mapping of pixels located within the perimeter of the corresponding pixels of the respective input images comprises mapping pixels of the plurality of input images onto the projection surface, and mapping locations on the projection surface to pixels of the output image.

4. The method of claim 3, the method further comprising:
determining ranging information related to an area surrounding the first locations, wherein said determining the projection surface is performed based at least in part on the ranging information.

5. The method of claim 1, the method further comprising:
determining a size of the horizontal portion based at least in part on a current speed of the vehicle,
wherein a higher current speed of the vehicle determines a larger horizontal portion than a lower current speed of the vehicle.

6. The method of claim 1, the method further comprising:
for each of the first locations, determining a distance from the first location to a respective object,
wherein the projection surface is determined based at least in part on the determined distances from the first locations to the respective objects.

7. The method of claim 1,
wherein the major axis of the elliptical disc runs from the front of the vehicle to the back of the vehicle, and
wherein the minor axis of the elliptical disc runs from the left side of the vehicle to the right side of the vehicle.

8. The method of claim 1, the method further comprising:
determining a geometric layout of an environment surrounding the first locations,
wherein the projection surface comprises a basis-spline surface approximating the environment surrounding the first locations.

9. The method of claim 1,
wherein the plurality of pixels along the perimeter of the respective block of pixels comprise four corner pixels of the respective block of pixels.

10. The method of claim 1,
wherein the size of each of the plurality of blocks of pixels is selected to balance a degree of image distortion introduced by said projective mapping and computational resources associated with rendering the output image.

11. The method of claim 1, the method further comprising:
receiving second user input specifying a one or more second view specification, wherein the second view specification comprises a third location that is different from the second location specifications;
rendering one or more a second output image images based at least in part on the one or more second view specification specifications and the plurality of input images, wherein the second output image comprises an image of the region as seen from the third location; and
displaying the one or more second output images on the display.

12. The method of claim 1,
wherein at least one portion of the output image is sourced from two or more input images of the plurality of input images; and
wherein rendering the at least one portion of the output image comprises blending contributions from the two or more input images of the plurality of input images.

13. The method of claim 12, wherein said blending is weighted based at least in part on a proximity of the first locations of the two or more input images to a projected location of the at least one portion of the output image.

14. The method of claim 12,
wherein said blending corrects for discrepancies in illumination between the two or more input images.

15. The method of claim 1, wherein the view specification further comprises one or more of:
an azimuthal angle measured from an origin at the second location;
a polar angle measured from the origin at the second location;
a field of view;
a projection surface depth;
one or more projection surface parameters;
a pixel resolution; and
a blending width.

16. A non-transitory computer-readable memory medium comprising program instructions which, when executed by one or more processors, cause a computing system to:
receive a plurality of input images, wherein each input image of the plurality of input images is taken from a different respective first location, wherein each respective first location is a respective location on a vehicle;

receive user input specifying a view specification for rendering an output image, wherein the view specification comprises a second location;

determine a projection surface; and render the output image based at least in part on the plurality of input images, the view specification, and the projection surface, wherein the output image comprises an image of a region as seen from the second location, wherein the second location is different from each of the first locations, wherein rendering the output image comprises mapping pixels of the plurality of input images onto the projection surface, and mapping locations on the projection surface to pixels of the output image;

wherein, to render the output image, the program instructions are executable to cause the computing system to:

divide the output image into a plurality of blocks of pixels; and for each of the plurality of blocks of pixels of the output image:

determine a mapping between a plurality of pixels along the perimeter of the respective block of pixels and a plurality of corresponding pixels of each of one or more of the plurality of input images; and for each of the one or more input images:

perform a projective mapping of pixels located within the perimeter of the corresponding pixels of the respective input image to respective pixels in the output image, wherein said projective mapping comprises a linear extrapolation of the mapping between the plurality of pixels along the perimeter of the respective block of pixels and the plurality of corresponding pixels of the respective input image, wherein a size of each of the plurality of blocks of pixels is selected to balance a degree of image distortion introduced by said projective mapping and computational resources associated with rendering the output image to render the output image within a first latency, and wherein smaller block sizes of pixels reduce the degree of image distortion while utilizing a larger number of parallel computational resources to render the output image within the first latency.

17. The non-transitory computer-readable memory medium of claim 16, wherein the program instructions are further executable by the one or more processors to cause the computing system to:

determine a geometric layout of an environment surrounding the first locations, wherein the projection surface comprises a basis-spline surface approximating the environment surrounding the first locations.

18. A computing system comprising:

one or more memories; and one or more processors coupled to the one or more memories, wherein the one or more memories store program instructions that, when executed by the one or more processors, cause the computing system to:

receive a plurality of input images, wherein each input image of the plurality of input images is taken from a different respective first location;

receive user input specifying a view specification for rendering an output image, wherein the view specification comprises a second location;

render the output image based at least in part on the plurality of input images and the view specification, wherein the output image comprises an image of a region as seen from the second location, wherein the second location is different from each of the first locations wherein, to render the output image, the computing system is configured to:

divide the output image into a plurality of blocks of pixels; and for each of the plurality of blocks of pixels of the output image:

determine a mapping between a plurality of pixels along the perimeter of the respective block of pixels and a plurality of corresponding pixels of each of one or more of the plurality of input images; and for each of the one or more input images:

perform a projective mapping of pixels located within the perimeter of the corresponding pixels of the respective input image to respective pixels in the output image, wherein said projective mapping comprises a linear extrapolation of the mapping between the plurality of pixels along the perimeter of the respective block of pixels and the plurality of corresponding pixels of the respective input image, wherein a size of each of the plurality of blocks of pixels is selected to balance a degree of image distortion introduced by said projective mapping and computational resources associated with rendering the output image, and wherein smaller block sizes of pixels reduce the degree of image distortion while utilizing a larger number of parallel computational resources to render the output image within a first latency.

19. The method of claim 1, wherein said blending is weighted such that input images associated with first locations that are closer to the projected location have a larger weight than input images associated with first locations that are farther from the projected location.

20. The non-transitory computer-readable memory medium of claim 16, wherein the plurality of pixels along the perimeter of the respective block of pixels comprise four corner pixels of the respective block of pixels.

* * * * *